(12) United States Patent
Insanic et al.

(10) Patent No.: US 8,525,724 B2
(45) Date of Patent: Sep. 3, 2013

(54) SYSTEM AND METHOD FOR GENERATING DERIVED PRODUCTS IN A RADAR NETWORK

(75) Inventors: Edin Insanic, Belmont, MA (US); Paul Siqueira, Amherst, MA (US)

(73) Assignee: University of Massachusetts, Boston, MA (US)

( * ) Notice: Subject to any disclaimer, the term of this patent is extended or adjusted under 35 U.S.C. 154(b) by 156 days.

(21) Appl. No.: 12/900,620

(22) Filed: Oct. 8, 2010

(65) Prior Publication Data

US 2012/0086596 A1    Apr. 12, 2012

(51) Int. Cl.
    *G01S 13/95* (2006.01)
(52) U.S. Cl.
    USPC ............................ 342/26 D; 342/59
(58) Field of Classification Search
    USPC ............... 342/26 R, 26 A–26 D, 59, 460
    See application file for complete search history.

(56) References Cited

U.S. PATENT DOCUMENTS

| | | | |
|---|---|---|---|
| 5,027,122 A | 6/1991 | Wieler | |
| 5,302,955 A | 4/1994 | Schutte et al. | |
| 5,434,570 A | 7/1995 | Wurman | |
| 5,469,169 A * | 11/1995 | Frush | 342/26 D |
| 5,471,211 A * | 11/1995 | Randall et al. | 342/26 D |
| 5,534,868 A | 7/1996 | Gjessing et al. | |
| 5,544,525 A | 8/1996 | Peterman et al. | |
| 5,568,385 A | 10/1996 | Shelton | |
| 5,583,972 A | 12/1996 | Miller | |
| 5,623,267 A * | 4/1997 | Wurman | 342/26 D |
| 5,689,444 A | 11/1997 | Jordan et al. | |
| 5,717,589 A | 2/1998 | Thompson et al. | |
| 6,018,699 A | 1/2000 | Baron, Sr. et al. | |
| 6,125,328 A | 9/2000 | Baron et al. | |
| 6,266,063 B1 | 7/2001 | Baron et al. | |
| 6,272,433 B2 | 8/2001 | Baron et al. | |
| 6,298,307 B1 | 10/2001 | Murphy et al. | |
| 6,339,747 B1 | 1/2002 | Daly et al. | |
| 6,366,236 B1 * | 4/2002 | Farmer et al. | 342/195 |
| 6,400,313 B1 | 6/2002 | Morici et al. | |
| 6,493,633 B2 | 12/2002 | Baron, Sr. et al. | |
| 6,829,536 B2 | 12/2004 | Moore | |
| 7,365,675 B2 * | 4/2008 | Pearlman et al. | 342/26 B |
| 7,834,754 B2 * | 11/2010 | Kulesz et al. | 340/506 |
| 8,077,074 B2 * | 12/2011 | Venkatachalam et al. | 342/59 |

(Continued)

FOREIGN PATENT DOCUMENTS

| | | |
|---|---|---|
| DE | 10313653 A1 | 10/2004 |
| WO | WO 2008/079441 | 7/2008 |

(Continued)

OTHER PUBLICATIONS

Insanic et al., "A maximum likelihood approach to estimation of vector velocity in Doppler radar networks," Paper in Progress, 2010.

(Continued)

*Primary Examiner* — John B Sotomayor
(74) *Attorney, Agent, or Firm* — McCarter & English, LLP

(57) ABSTRACT

The present invention relates to systems and methods of measuring atmospheric conditions using networked radar systems. A processor receives sensed data from the radar nodes of the network to determine weather conditions within the atmospheric region measured by network. Preferred embodiments use a velocity processor to determine the velocity of the atmosphere in real time for display.

20 Claims, 33 Drawing Sheets

(56) References Cited

U.S. PATENT DOCUMENTS

| | | | |
|---|---|---|---|
| 8,334,799 B2* | 12/2012 | Barbaresco | 342/26 R |
| 8,368,581 B2* | 2/2013 | Hannesen et al. | 342/26 R |
| 8,416,119 B2* | 4/2013 | Mizutani et al. | 342/26 R |
| 2001/0049584 A1 | 12/2001 | Jones et al. | |
| 2003/0025627 A1 | 2/2003 | Wilson et al. | |
| 2005/0206506 A1* | 9/2005 | Kulesz et al. | 340/286.02 |
| 2006/0238411 A1 | 10/2006 | Fullerton et al. | |
| 2006/0290561 A1 | 12/2006 | Praskovsky et al. | |
| 2007/0069941 A1 | 3/2007 | Pearlman et al. | |
| 2007/0073486 A1 | 3/2007 | Tillotson et al. | |
| 2007/0164899 A1 | 7/2007 | Makkapati et al. | |
| 2007/0280507 A1 | 12/2007 | Murali | |
| 2008/0001808 A1 | 1/2008 | Passarelli et al. | |
| 2008/0007445 A1* | 1/2008 | Leach et al. | 342/21 |
| 2008/0140318 A1 | 6/2008 | Breed | |
| 2008/0148839 A1 | 6/2008 | Tillotson et al. | |
| 2008/0169975 A1 | 7/2008 | Yee | |
| 2008/0258880 A1* | 10/2008 | Smith et al. | 340/286.02 |
| 2009/0160700 A1 | 6/2009 | Messer-Yaron et al. | |
| 2009/0182507 A1 | 7/2009 | Havin et al. | |
| 2009/0243918 A1 | 10/2009 | Kelly et al. | |
| 2010/0079330 A1* | 4/2010 | Venkatachalam et al. | 342/59 |
| 2011/0004513 A1* | 1/2011 | Hoffberg | 705/14.1 |
| 2011/0102249 A1* | 5/2011 | Venkatachalam et al. | 342/26 R |
| 2011/0102250 A1* | 5/2011 | Venkatachalam et al. | 342/26 R |
| 2012/0086596 A1* | 4/2012 | Insanic et al. | 342/26 D |

FOREIGN PATENT DOCUMENTS

| | | |
|---|---|---|
| WO | WO-2009/045618 A2 | 4/2009 |
| WO | WO-2009/111523 A1 | 9/2009 |
| WO | WO-2009/114864 A1 | 9/2009 |
| WO | WO-2009/137702 A1 | 11/2009 |
| WO | WO-2009/140143 A1 | 11/2009 |
| WO | WO-2009/158458 A1 | 12/2009 |

OTHER PUBLICATIONS

Insanic et al., "Real-time vector velocity estimation in Doppler radar networks," Paper in Progress, 2010.

Insanic et al., "Vector velocity and vector velocity error estimates in a networked radar system," Nov. 12, 2006.

McLaughlin et al, "Short-wavelength technology and the potential for distributed networks of small radar systems," American Meteorological Society, BAMS, Dec. 2009.

Shapiro et al., "Single-doppler velocity retrieval with rapid-scan radar data," Journal of Atmospheric and Oceanic Technology, American Meteorological Society, 2003.

Gao et al., "A variational method for the analysis of three-dimensional wind fields from two Doppler radars," Monthly Weather Review, American Meteorological Society, 1999.

Friedrich et al., "Wind synthesis and quality control of multiple-doppler-derived horizontal wind fields," Journal of applied meteorology, American Meteorological Society, 2004.

Xue et al., "Variational analysis of oversampled dual-doppler radial velocity data and application to the analysis of tornado circulations," Journal of Atmospheric and Oceanic Technology, American Meteorological Society, 2007.

Lakshmanan et al., "A real-time, three-dimensional, rapidly updating, heterogeneous radar merger technique for reflectivity, velocity, and derived products," Weather and Forecasting, American Meteorological Society, 2006.

Nguyen et al., "A parametric time domain method for spectral moment estimation and clutter mitigation for weather radars," Journal of Atmospheric and Oceanic Technology, American Meteorological Society, 2008.

McLaughlin et al., "Distributed collaborative adaptive sensing (DCAS) for improved detection, understanding, and predicting of atmospheric hazards," Center for Collaborative Adaptive Sensing of the Atmosphere (CASA), College of Engineering, University of Massachusetts, 2005.

Chandrasekar et al., "Principles of networked weather radar operation at attenuating frequencies," Proceedings of ERAD (2004): 109-114, Copernicus GmbH 2004.

Liu et al, "Real-time three-dimensional radar mosaic in CASA IP1 testbed," IGARDD, IEEE Int, pp. 2754-2757, 2007.

Given et al., "Response of a two-dimensional dual-doppler radar wind synthesis," American Meteorological Society, Department of Meteorology, The Florida State University, Apr. 1994.

Boyer et al., "Stochastic maximum likelihood (SML) parametric estimation of overlapped doppler echoes," Annales Geophysicae, European Geoscience Union (2004) 22: 3983-3993.

Caskey, James "An operational objective analysis system," U.S. Weather Bureau, vol. 87, No. 10, Oct. 1959.

Insanic et al., "Velocity unfolding in networked radar system," University of Massachusetts, Amherst, Department of Electrical and Computer Engineering, Microwave Remote Sensning Laboratory, IEEE, IGARSS 2008.

Cheng et al., "Multiagent meta-level control for a network of weather radars," IEEE/WIC/ACM, International conference on web intelligence and intelligent agent technology, 2010.

McLaughlin et al, "Short wavelength technology and the potential for distributed networks of small radar systems," Engineering research center for collaborative adaptive sensing of the atmosphere (CASA), IEEE 2009.

Insanic et al., "Use of vector velocity estimate accuracy for improved resource allocation in a network of doppler radars," IEEE, IGARSS, 2008.

Junyent et al., "Weather radar network design," IEEE, IGARSS, 2008.

International Search Report for PCT/US2011/055415 completed Jan. 25, 2012.

* cited by examiner

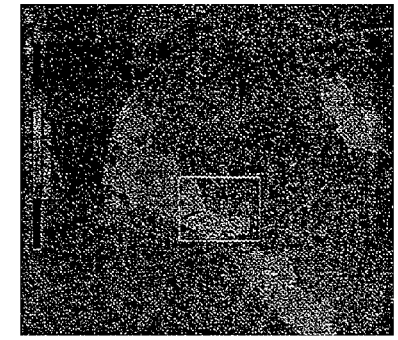
FIG. 6C
Directional Shear
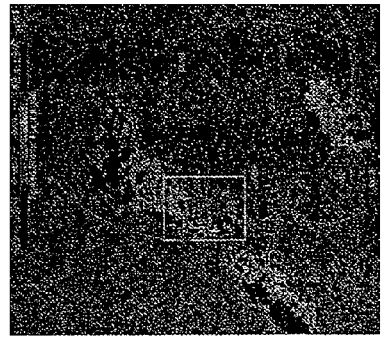
FIG. 6F
Speed Shear
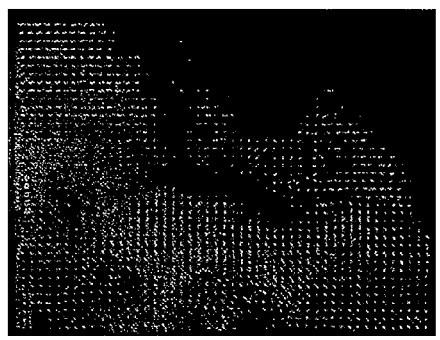
FIG. 6B
Velocity vector field with shaded reflectivity in background.
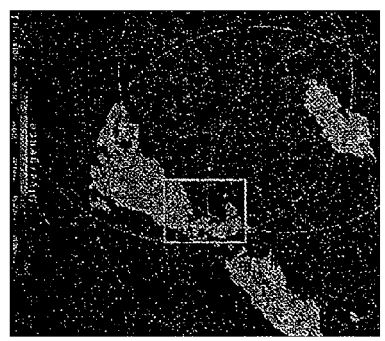
FIG. 6E
Divergence
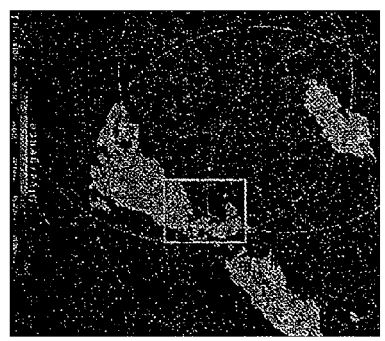
FIG. 6A
Reflectivity field with overlaid velocity vectors.
FIG. 6D
Vorticity 0-600m AGL in GSCS 600-1200m AGL in GSCS Estimated Reflectivity Distance [km]

Estimated Reflectivity

Distance [km]

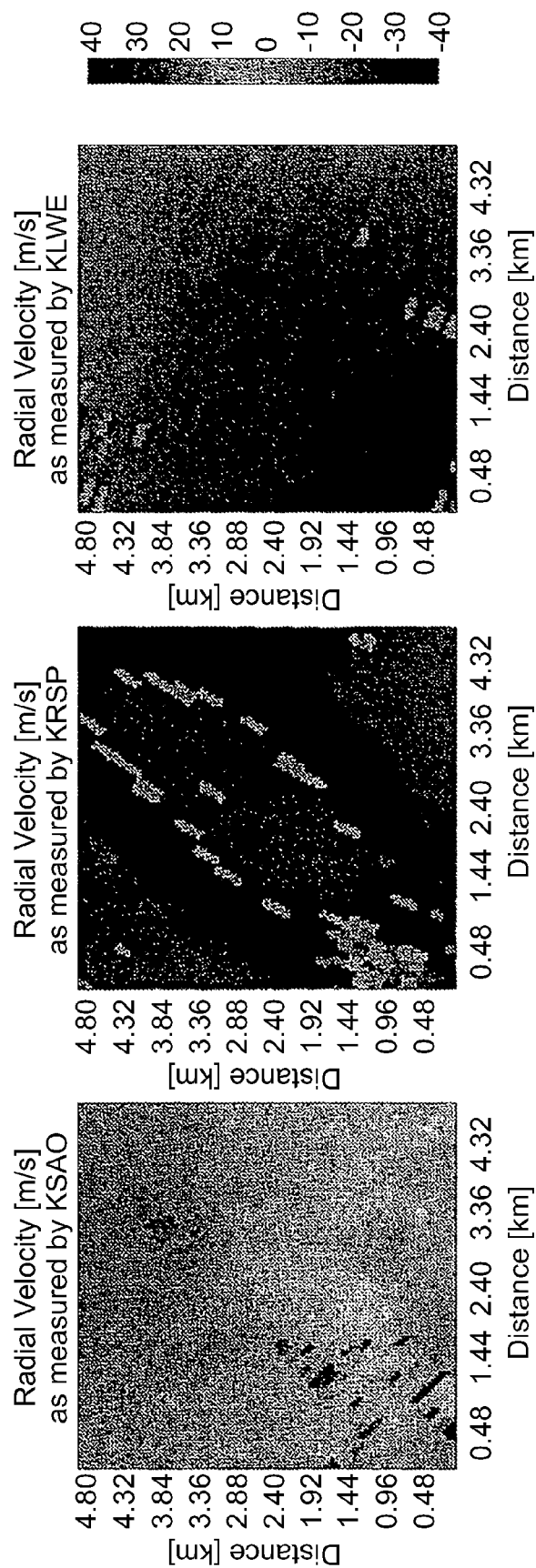

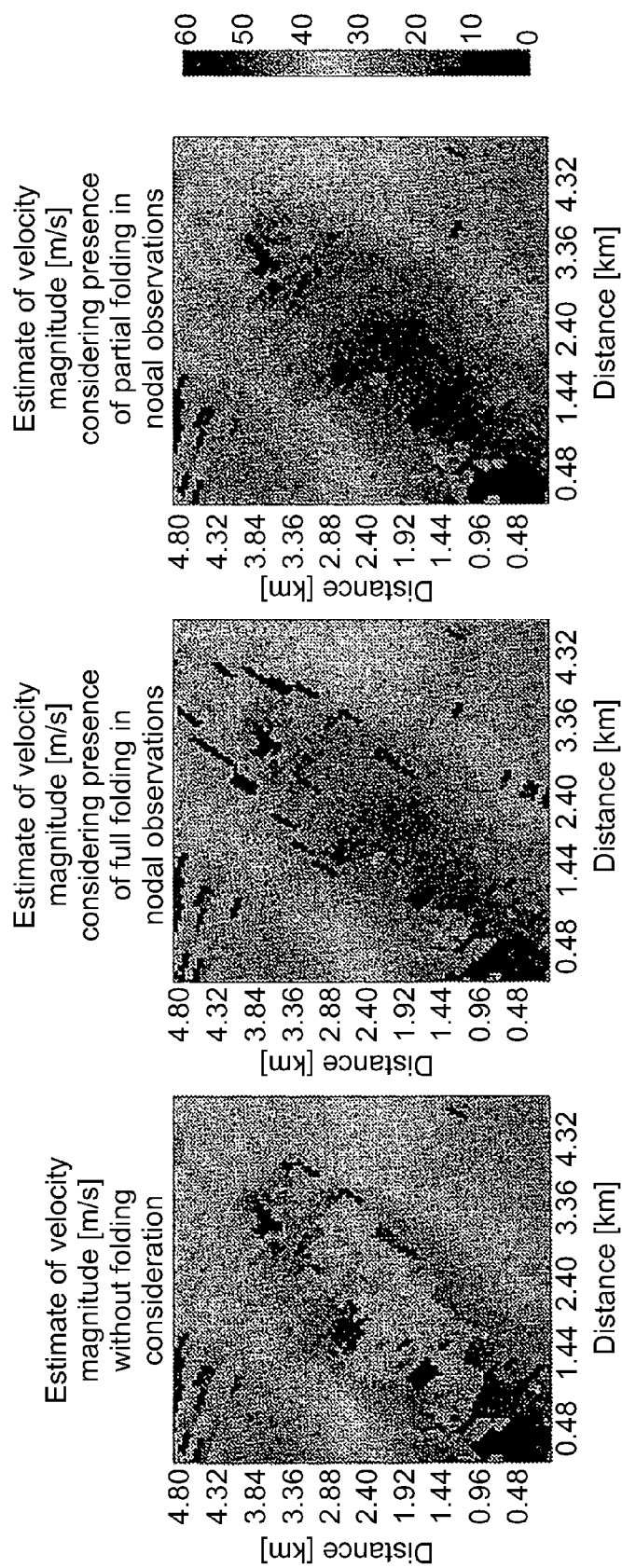

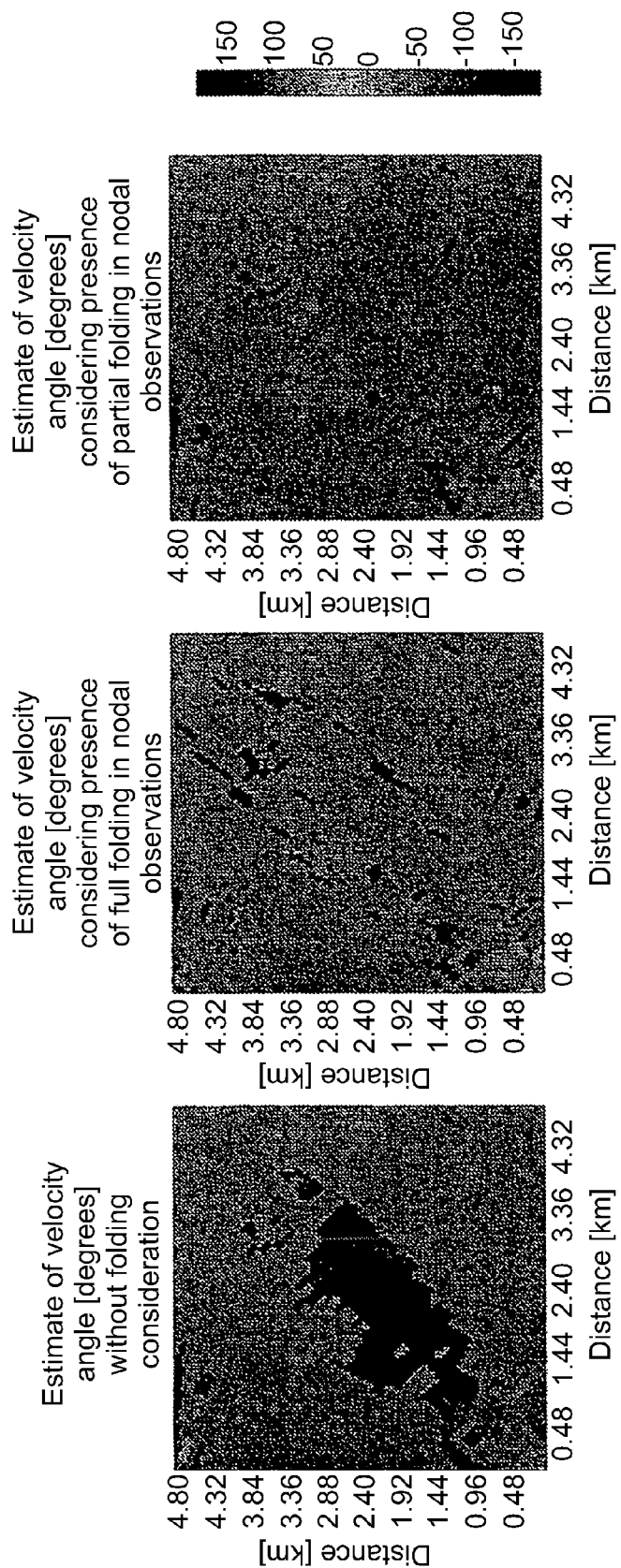

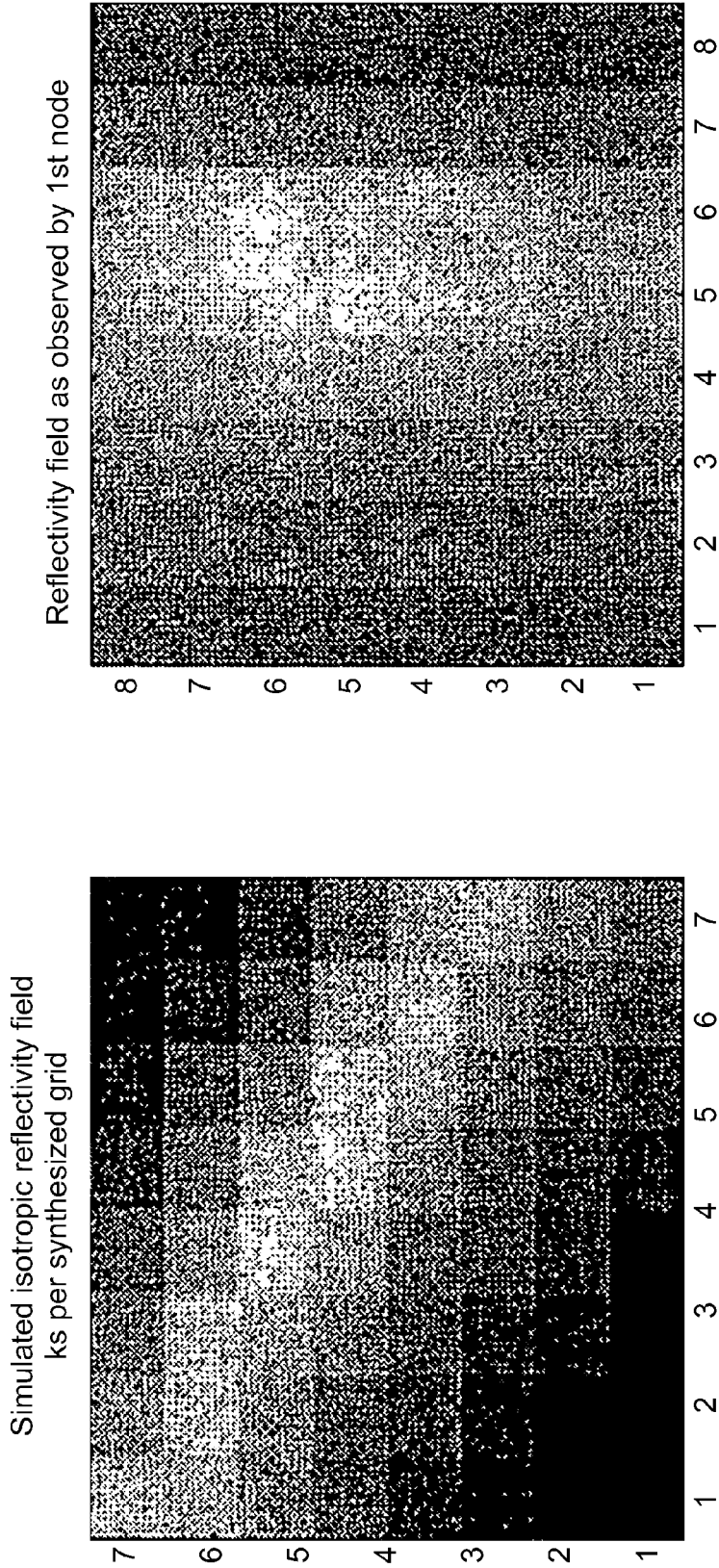

FIG. 17D
Synthesized reflectivity from two nodal observations using LS approach
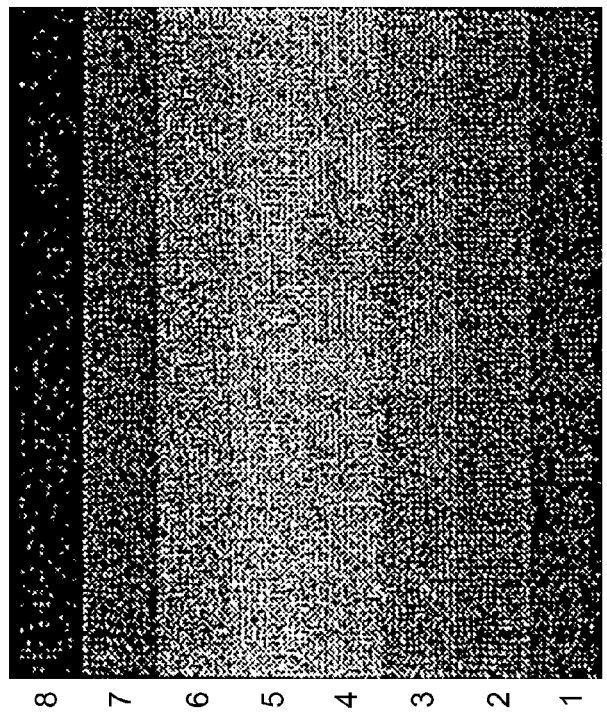
FIG. 17C
Reflectivity field as observed by 2nd node
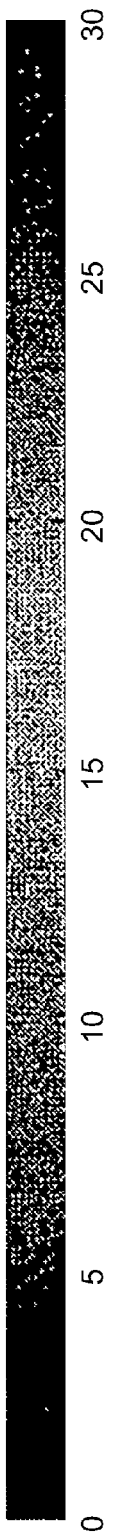
Reflectivity [dBZ]

SYSTEM AND METHOD FOR GENERATING DERIVED PRODUCTS IN A RADAR NETWORK

STATEMENT REGARDING FEDERALLY SPONSORED RESEARCH OR DEVELOPMENT

This invention was supported, in whole or in part, by the Engineering Research Centers Program of the National Science Foundation under grant number EEC-0313747. The government has certain rights in this invention.

BACKGROUND OF THE INVENTION

The center for Collaborative Adaptive Sensing of the Atmosphere (CASA), an NSF Engineering Research Center, was established in 2003 to develop low-cost, high spatial density networks of weather Doppler X-band radars for sensing the lower atmosphere. This radar network system is formed on a Distributed Collaborative Adaptive Sensing (DCAS) paradigm based on a large number of small radars operating collaboratively within an information technology infrastructure to measure changing atmospheric conditions. The allocation and configuration of radar system resources within the DCAS network is based on a balance between the priority and type of user requests and the desired quality of the measurement for the given user task.

For one such measurement type, the vector velocity and vector velocity variance of observed events are both potential indicators of turbulence and hazardous weather conditions. Understanding the trade-off between the allocation of limited network resources, such as dwell time, the number of observing nodes utilized and measurement accuracy, is important for optimizing the deployed network geometry and generating observations for changing weather conditions and user priorities. In addition, timely provision of vector velocity estimates along with their confidence bounds can aid detection, visualization, and quality control.

SUMMARY OF THE INVENTION

The present invention relates to systems and methods for networked radar operations. Preferred embodiments provide for the measurement of velocity of weather phenomena using a plurality of networked weather radar stations or nodes. Velocity information that is sensed at the individual nodes are processed to provide a measured velocity value at each voxel of the atmospheric volume of space being measured. Preferred embodiments of the invention can also be used to track the velocity of objects, such as aircraft, operating within a networked radar system. A preferred embodiment uses a velocity processor that can perform a velocity measurement of one or more events occurring within an operating region of the networked radar system. The nodes within the system can be selected to participate in the velocity measurement of a particular event using a network control system. The control system can issue periodic commands to each participating node to scan a selected region for a particular scan interval using a plurality of scan parameters.

To provide velocity estimation in a radar network in a real-time sensing environment, such as the CASA IP1 system, there are several aspects to be considered. Under the constraint of the real-time requirement, there is a finite fidelity (balance between resolution and accuracy) of the measurements that can be delivered. This fidelity mainly depends on the methodology used in velocity estimation computation. Constraining the velocity estimation to overlapping regions only, dual- and multi-Doppler techniques can provide velocity estimation in a real-time environment to varying degrees of fidelity. For overlapping networks similar in size to the CASA IPI system, in comparison to other existing techniques, dual- and multi-Doppler techniques present a practical solution to operational velocity estimation.

Prior studies demonstrate the added value and importance of high-quality and high-resolution vector velocity field data for making improvements in the skill of numerical weather models to predict severe weather phenomena. In addition to provision of velocity estimates, it is desired to have a metric to gauge the quality of the estimates. This metric can be used to classify data, so that numerical weather prediction class of CASA end-users can be informed about the derived velocity data's quality. Further, estimates of the velocity data quality can aid in the planning of radar scanning strategies for the next observing period or scan interval. CASA's scanning strategy is to scan when and where end-user needs are greatest. The current design deployed in the IP1 system allows end-users to define their needs in terms of what to scan and how to scan it. Feature detection algorithms, continuously running on streamed data, report what weather objects are detected. Based on this information, end-user rules define the frequency and the regions for future scans.

Thus, the present invention is utilized in the process of selecting the observing radars performing the observation, which is largely determined by a function maximizing the number of objects that the system is able to scan during a predetermined heartbeat interval, currently set to one minute for many scanning operations. In the case of velocity retrievals, in addition to the previous steps, two or more radars are chosen in such a way as to provide a geometrically efficient dual-Doppler retrieval and scan coordination to satisfy sufficient coincident temporal sampling. However, a geometrically efficient dual-Doppler retrieval does not necessarily provide the most accurate network based velocity measurements. Use of quality metrics from previous scans can be used to compare the quality of competing scans; hence, increasing the utilization of system resources.

One of the CASA user groups are the emergency managers whose responsibility is to issue public warnings about the weather related emergencies and hazards. Some of CASA's data outputs, such as reflectivity and radial velocity, are streamed directly to emergency managers to assist in their decision making process. Currently, emergency managers foremost desire is the output of base reflectivity, valuing its utility to be 68% of the whole. The composite reflectivity was valued at 20% and then radial velocity at 5%. Because weather related emergencies and hazards are usually manifested with strong velocity signatures, a low appreciation of velocity fields by end-users is surprising. One possible explanation for the underutilization of velocity data is that it is one-dimensional and presented in polar coordinates, which requires additional skills to interpret. If true, improvements in the display of vector velocity fields to emergency managers will be better utilized, and the use of CASA velocity data will be increased.

Thus the present invention provides real-time vector velocity measurement and display, which delivered along with quality metrics, assist in a better understanding of the radar network performance and help maximize the utilization of limited network resources. While existing techniques can be used to provide vector velocity, they are limited in that they do not provide velocity measurements in real time, i.e. within the short scan interval time needed to quickly adjust to changing conditions, nor do they provide quality metrics or are not configured or scalable for distributed networks of small radar systems. The present invention provides a operational realtime solution for the estimation of vector velocity and other related products in radar network (e.g. CASA's Integrative Project One system—IP1) which is flexible and scalable to address other radar network configurations, not yet in existence.

A preferred embodiment includes a network of velocity processors, each processor associated with a different plurality of radar nodes to provide for the selection of different networked processing combinations for improved resolution and scaling. A network control system allocates the use of this velocity processor network to provide networked three dimensional (3D) velocity measurements. The velocity processors operate in real time, i.e. they compute velocity values within the scan intervals or heartbeat at which the radar nodes operate and quantitatively characterize the resulting velocity data using metrics to indicate for the end user the quality of the measurement being made. The system uses a geocentric spherical coordinate system to improve computational efficiency and speed. The quality metric can be defined in terms of the signal to noise ratio (SNR) and spectral width.

Generally the scan intervals occur at time periods of 5 minutes or less. For high wind velocity events where significant changes in velocity can occur in shorter periods of time, scan intervals of 2 minutes or less are typically used. Frequently, scan intervals of 1 minute or less are used for rapidly changing events. Thus, the present invention provides the ability to computer 3D velocity data from a plurality of three or more radar nodes scanning the same event within the required scan interval.

BRIEF DESCRIPTION OF THE DRAWINGS

Other features and advantages of the present invention will be apparent from the following detailed description of the invention, taken in conjunction with the accompanying drawings of which:

FIG. 6A is a plot of reflectivity field with overlaid velocity vectors generated by a processor of the invention;

FIG. 6B shows a portion of the vector velocity field of FIG. 6A in higher resolution with shaded reflectivity in background;

FIG. 6C is a plot of the directional shear generated by a processor of the invention;

FIG. 6D is a plot of the vorticity generated by a processor of the invention;

FIG. 6E is a plot of the divergence generated by a processor of the invention;

FIG. 6F is a plot of the speed shear generated by a processor of the invention;

FIGS. 13A-13I illustrate measure radial velocities and network velocity processor velocity fields including no folding, full folding and partial folding;

FIG. 17A illustrates a simulated isotropic reflectivity field for a synthesized grid;

FIGS. 17B and 17C illustrate reflectivity fields observed by first and second nodes, respectively;

FIG. 17D illustrates the synthesized reflectivity from two nodal observations using LS;

DETAILED DESCRIPTION OF THE INVENTION

FIGS. 1A-1D illustrate a system 100 according to a preferred embodiment of the invention. In a preferred embodiment, the methods and systems of the invention operate in conjunction with a radar network that includes a plurality of nodes 102 that can operate collaborating in distinct regions or groups.

Figure 1A:
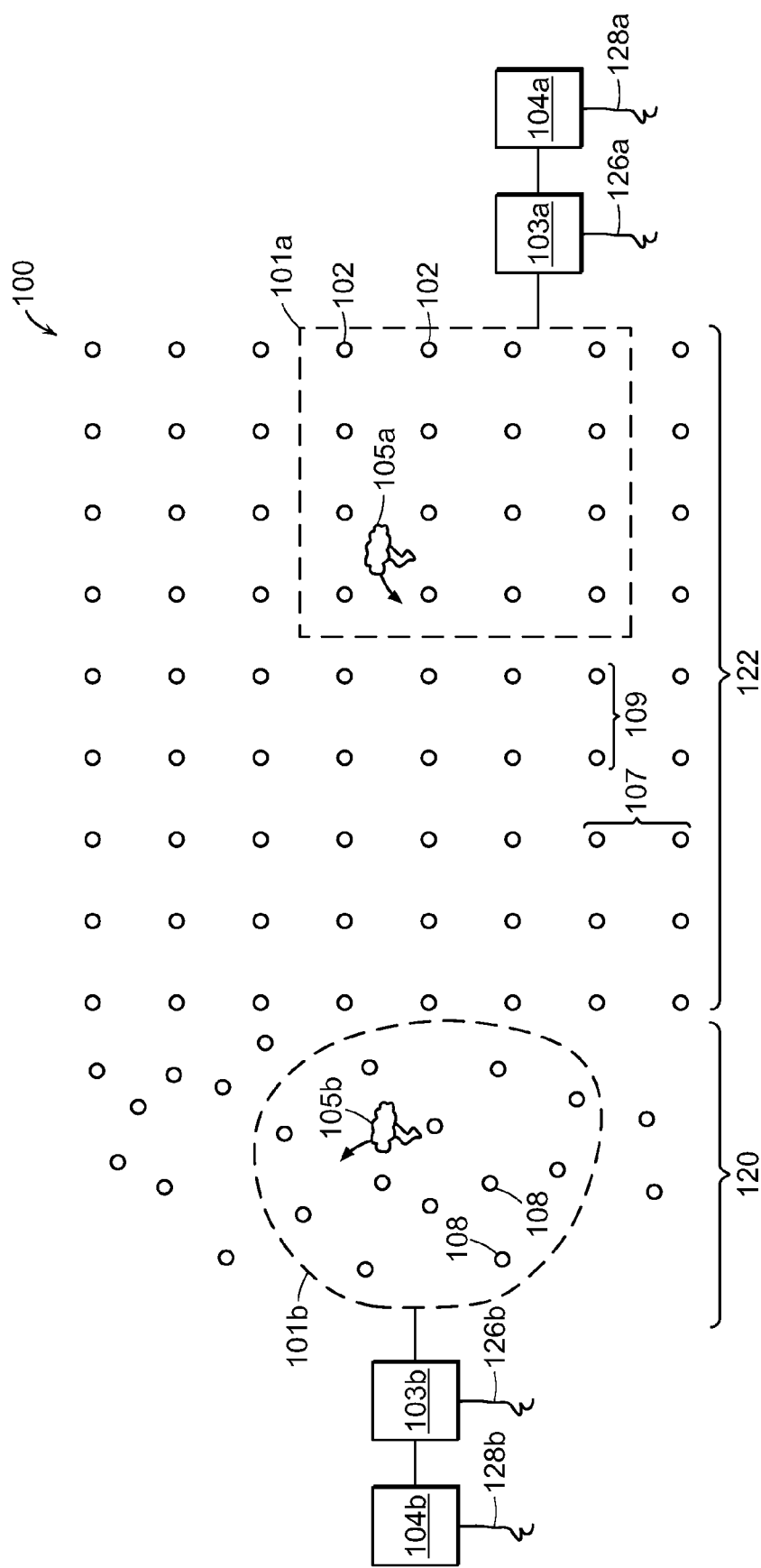
FIGS. 1A-1D schematically illustrates a multi-node radar network and a computer system that receives and processes data from the radar network and controls network operations in accordance with embodiments of the invention.

FIG. 1A illustrates a radar system 100 comprising a plurality of radar stations or "nodes" 102 covering a wide geographic area. In one embodiment, each of the radar nodes 102 operates at relatively short range, communicates with other nodes over a communications network, such as an Ethernet network and/or the internet, and adjusts its sensing strategy in response to evolving weather and changing user needs.

In this embodiment, the system 100 is divided into one or more smaller networks regions 101a, 101b, each comprised of a subset of nodes 102 operating in coordination with one another under the control of a command and control processor 103a, 103b. The command and control processor 103a, 103b communicates with each node over the communications network, and in one embodiment controls the scanning strategy for the network 101a, 101b based on a collaborative adaptive scanning strategy. The processors 103a, 103b communicate with a network control system to allocate system resources and control data flow. The beam scanning of the nodes 102 is coordinated to provide collaborative scanning to obtain multiple simultaneous views of a region for data-fusion based analysis, such as velocity processing, as well as adaptive scanning to optimize where and how the region is scanned based on the type of weather detected and the needs of the end-users.

The radar node spacing can be evenly spaced where distances 107 and 109 in area 122 are the same, or alternatively, the spacing between nodes 108 in region 120 can be different for each node. The spacing can be selected to improve the coverage and accuracy required for a particular geographical region, which can vary depending on the ground topography, which can impact the correction for clutter that may be needed, and the type of weather found in a particular region, as described in further detail herein.

Figure 1B:
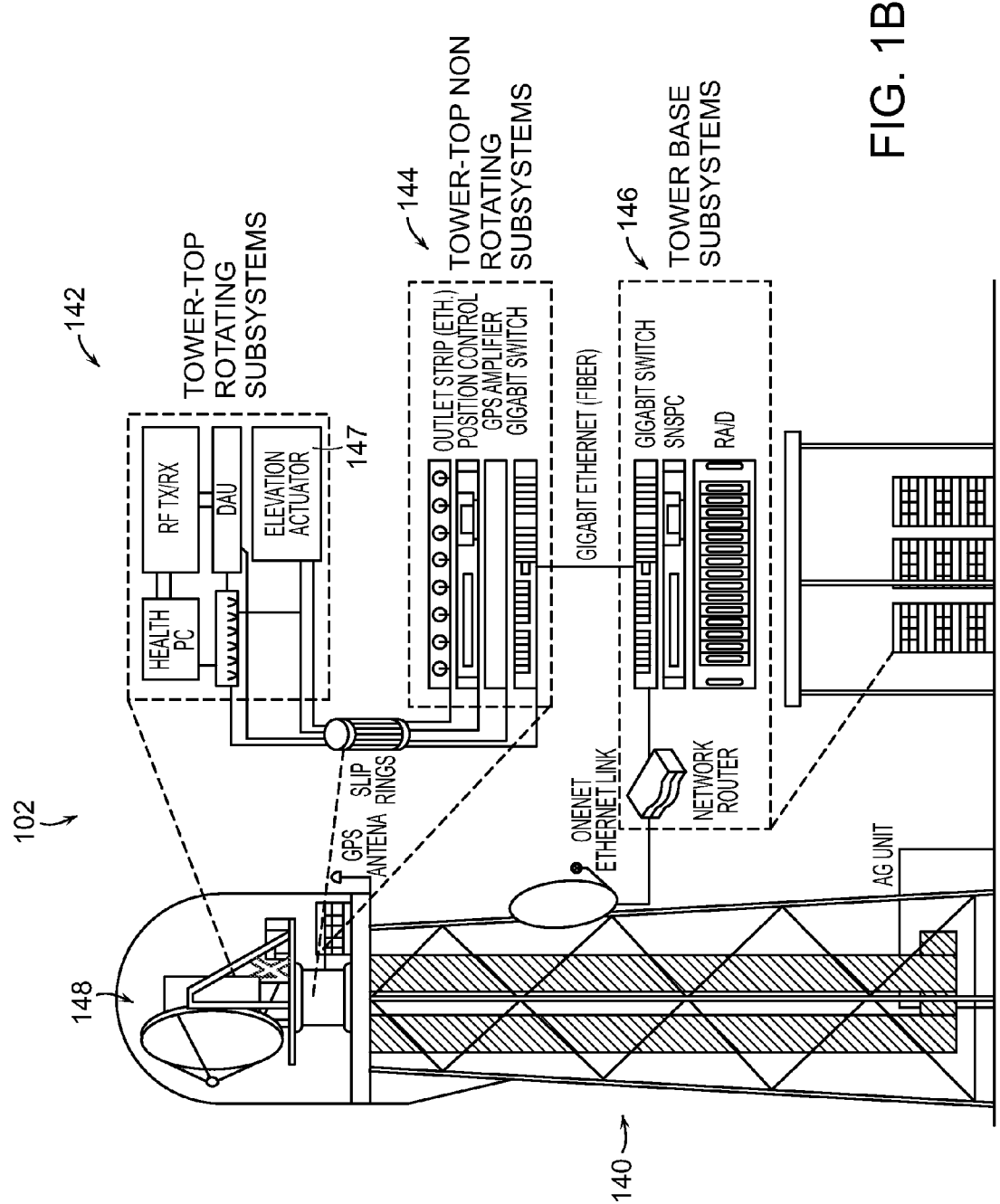

FIG. 1B illustrates one embodiment of a radar node 102. The radar node 102 generally includes a tower assembly 140 with a rotating assembly 142 and a non-rotating controller 144 and a base communication system 146. The system includes a radar antenna 148, transceiver, data acquisition system and actuator(s) 147 for scanning in azimuth and elevation. A local processor, which can be connected to the tower by a gigabit Ethernet optical fiber connection, provides a first level of data processing of detected radar signals, and generates data products that are then forwarded to the command and control processor 103 for further processing. These data products can include, for example, reflectivity (dBZ), velocity (m s$^{-1}$), spectral width (m s$^{-1}$), differential reflectivity (dB), differential phase (°), cross-polarization correlation, normalized coherent power, specific phase (rad m$^{-1}$), horizontal propagation phase (radians), and vertical propagation phase (radians). The site can be connected to the communications network (e.g., Internet) via a wireless radio link or to a secure wired network.

According to one embodiment, the nodes 102 include relatively small, compact radar antennas that are less than 5 m in diameter, and are typically 2 m or less in diameter, and in some embodiments are about 1 m or less in diameter. In certain embodiments, the small-sized antennas can be mounted on existing infrastructure, such as on building or communications towers (e.g., cell towers), thus obviating the need to build dedicated radar towers such as shown in FIG. 1B. In accordance with some embodiments, the radar antennas utilize relatively low-power transmitters, generally less than about 100 W of average transmitter power, in some cases less than about 30 W, and typically less than about 15 W of average transmitter power, with peak radiated power generally between about 5 and 100 kW, and typically about 10 kW.

The radar nodes 102 can operate at any suitable wavelength, such as X-band (8-12 GHz, 2.5-4 cm), S-band (2-4 GHz, 8-15 cm), C-band (4-8 GHz, 4-8 cm), K-band (12-40 GHz, 0.75-2.5 cm), and combinations of the above. In some preferred implementations, the radar nodes 102 operate in the X-band, which provides high spatial resolution with a relatively small aperture.

Figure 1C:
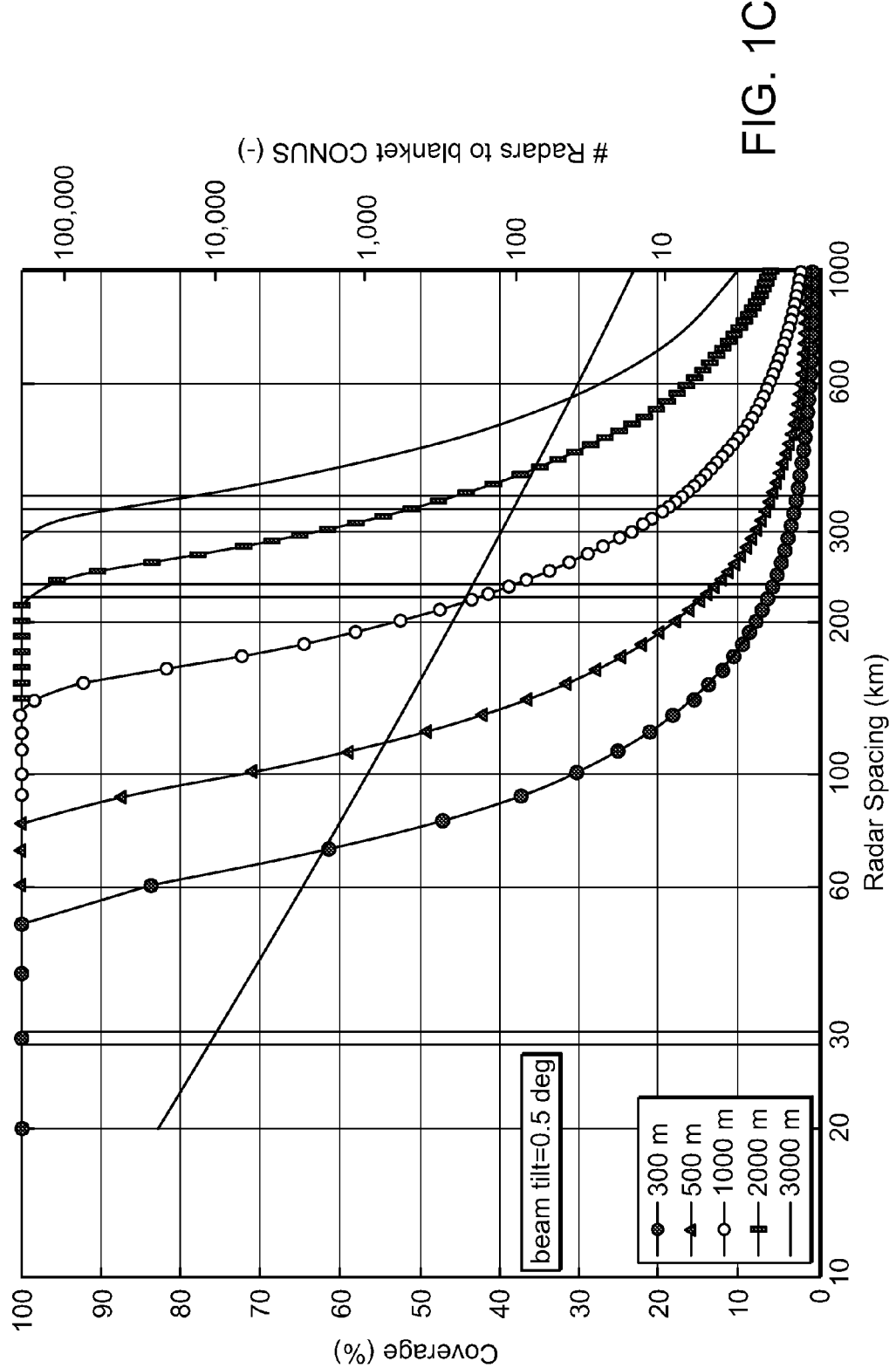

In the system 100 of FIG. 1A, the spacing between the radar nodes 102 is an important consideration. In conventional radar networks, the radar antennas are widely-spaced, typically several hundred kilometers apart, which results in a significant "sensing gap" in the lower troposphere (e.g., <3 km above-ground level (AGL)), particularly the further one moves away from the antenna location. This "sensing gap" is due to the curvature of the earth and terrain blockage. The gap in coverage at the lower atmosphere limits the usefulness of current radar systems in identifying and detecting certain meteorological events, such as small tornados and other fine weather features. One way to reduce this sensing gap in the lower atmosphere is to decrease the spacing between radar nodes. FIG. 1C is a plot of the percent coverage of the volume in a thin layer above ground versus radar spacing at different altitudes. FIG. 1C also shows the number of radars required for complete coverage of the continental United States as a function of radar spacing. The vertical bars at 230 km and 345 km indicate the representative spacing of the current NEXRAD system to the east and west of the Rocky Mountains, respectively. As can be seen from FIG. 1C, significant coverage gaps exist at lower altitudes, particularly in the troposphere below ~1 km AGL, where there is hardly any coverage. Low altitude coverage is greatly increased by decreasing the spacing between the radar nodes. At a spacing of about 150 km or less, there is nearly full coverage at ~1 km AGL. With spacing at ~50 km or less, the sensing gap due to the earth's curvature is virtually entirely eliminated, and low-altitude coverage approaches 100%.

In one embodiment of the present system 100, the spacing between radar nodes 102 is less than about 150 km, and is more particularly less than about 100 km, and is even more particularly less than about 50 km. In general, the spacing between nodes is between about 10 and 100 km, and is typically between about 20-60 km. In one preferred implementation, the spacing is approximately 30 km. In one embodiment, the radar nodes 102 are small (~1 m antenna) short wavelength (X-band) radars having a beamwidth of about 1.8° and a lowest tilt angle of 0.9°. At this lowest tilt angle, the entire beam is below 1 km over a 30 km range, and a network of these nodes at ~30 km spacing can provide substantially complete coverage of the lower atmosphere to ~1 km AGL or below.

The radar nodes 102 can be spaced at regular intervals, such as shown in network 101a, or irregularly spaced, such as in network 101b. A group of participating nodes can extend across both even and unevenly spaced nodes. The scan parameters can vary across the group to compensate for the variation in nodal spacing.

During operation of the system 100, the command and control processor 103a, 103b issues commands to each of the radar nodes 102 within the network 101a, 101b to commence a coordinated scanning operation. The radar nodes 102 scan the target volume as instructed, generating observation data, and communicate at least some of the observation data back to the command and control processor 103a, 103b for further processing and analysis. A velocity processor 104a, 104b associated with the command and control processor 103a, 103b ingests relevant observation data from the radar nodes 102, and uses this data to generate derived data products, including in particular vector velocity data, for at least a portion of the target volume. In a preferred embodiment, the velocity processor 104a, 104b generates vector velocity data in real-time, and the generated vector velocity data is used by the command and control processor 103a, 103b to generate the scanning strategy for the subsequent scanning interval (or system "heartbeat"). The command and control processor 103a, 103b issues commands to the nodes 102 to initiate the scanning operation for the subsequent system heartbeat, based at least in part on the real-time vector velocity data. The processed velocity information can then be communicated 128a, 128b to end users for display and use in further network operations, such as further selection of scan parameters.

Figure 1D:
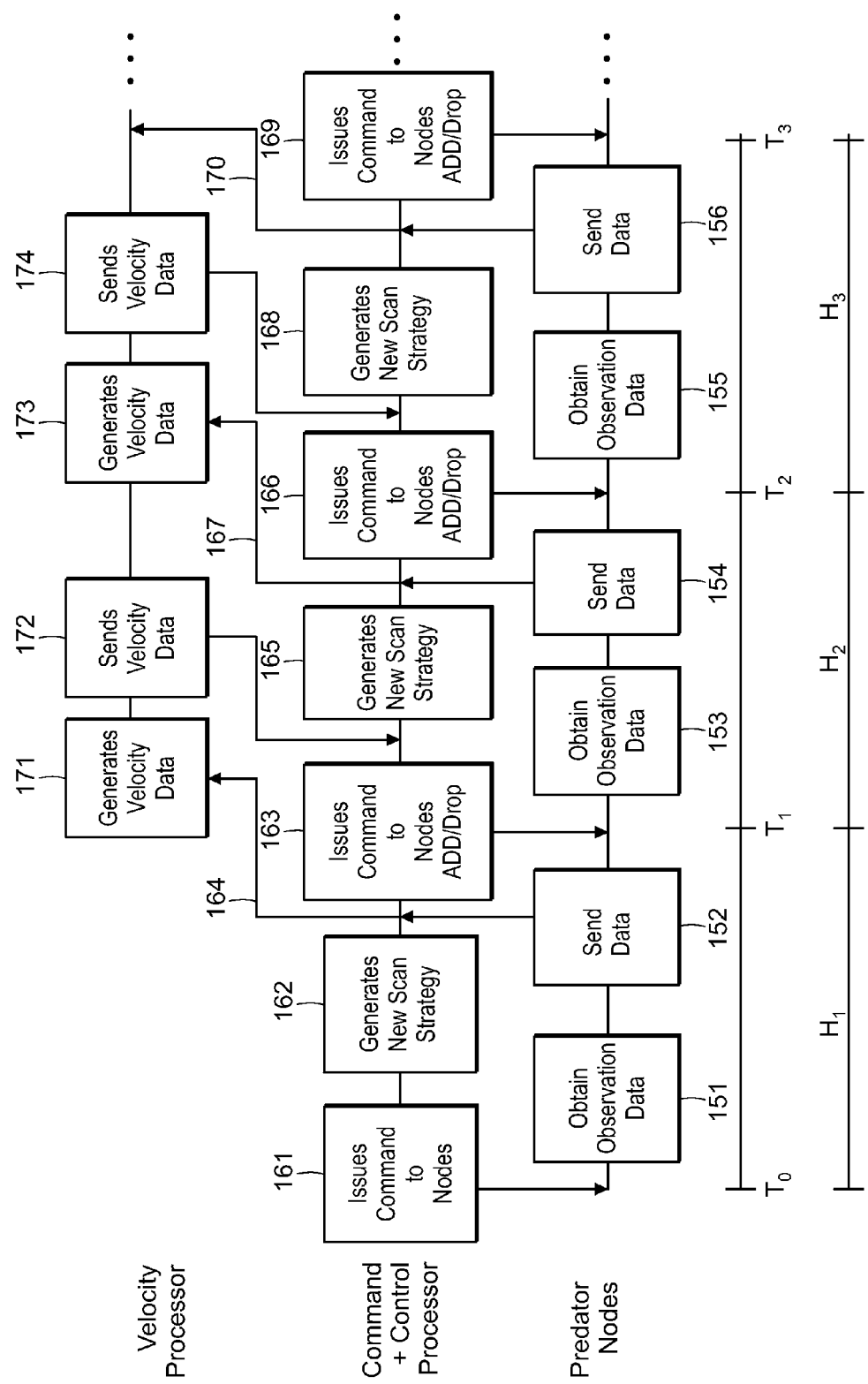

FIG. 1D is a flow diagram illustrating the operation of the system 100 over three successive system scan intervals or heartbeats ($H_1$, $H_2$ and $H_3$), in accordance with one embodiment. At $T_0$, which corresponds with the start of the first heartbeat, $H_1$, the command and control processor issues commands 161 to the radar nodes 102 to initiate a scanning operation in accordance with a pre-determined scanning strategy. The scanning strategy can include, for example, conducting a surveillance sweep over the entire target region (e.g., a low-level plan position indicator (PPI) sweep and/or range height indicator (RHI) sweep) as well as instructions to scan particular subvolumes in greater detail based on predicted or previously-detected weather events in particular locations, or on user need.

During scan interval or heartbeat $H_1$, the radar nodes obtain observation data and generate observation data products (e.g., data moments) 151, and send the data products 152 to the command and control processor, while the command and control processor generates a new scanning strategy 162, and issues a new set of commands 163 to the radar nodes to implement the new scanning strategy during the next system heartbeat. At least a portion of the data products generated by the nodes are sent to the velocity processor 164 for calculation of vector velocity data.

The second scan interval or heartbeat $H_2$ commences at $T_1$. During $H_2$, the velocity processor generates vector velocity data 171 and forwards the generated velocity data 173 to the command and control processor. The velocity data indicates the existence of one or more meteorological events, such as events 105a, 105b shown in FIG. 1A. The command and control processor then uses the newly-generated velocity data to generate the scanning strategy 165 for the next heartbeat. In particular, the scanning strategy can include instructions to scan certain sub-volumes, corresponding to the identified meteorological events, in greater detail. A new set of commands is sent 166 to the radar nodes. The radar nodes obtain a new set of observation data 153, and the data is sent 154 to the command and control processor and to the velocity processor 167.

During the third scan interval on heartbeat, $H_3$, the above process is repeated, with the velocity processor using a fresh set of data to generate updated vector velocity data 173, which is then sent 174 to the command and control processor, and used to generate the next scan strategy 168. The radar nodes obtain a further set of observation data 155, which is sent to the command and control processor 156 and velocity processor 170. New commands are issued to the nodes 169, and the process repeats with each subsequent scan interval.

In certain embodiments, the duration of each scan interval is typically less than about 2 minutes, and can be in a range of between about 20 and 90 seconds. Generally, the scan interval is between about 30 seconds and 1 minute in duration. In some systems, the duration of the scan interval is fixed, though in other embodiments it can be dynamically adjusted by the command and control processor.

The commands issued to the radar nodes by the command and control processor can range from more general instructions to scan particular sub-volumes during a given system heartbeat (with the specific operating parameters determined locally by the individual radars), to more specific control of individual radar operating parameters. These radar operating parameters can include, for example, position related information (i.e., controlling the azimuth and elevation position of the beam for each node) and transmit waveform related information. In one embodiment, radar control position-related commands include start position, stop position and speed of rotation in azimuth and/or elevation directions, the number of angle(s) to scan in the alternate direction (i.e. azimuth or elevation), and the number of times to repeat the scan operation. With respect to transmit waveform related information, these commands can include, for example, pulse mode (e.g., Dual Pulse Repetition Time (PRT) or Staggered Pulse Repetition Frequency (PRF)), pulse length and inter-pulse periods (for Staggered PRF), repetition frequencies and number of pulses per block (for Dual PRT), the number of range gates, and the number of averages. Thus, for example, during each scan interval the control processor selects a plurality of scan parameters that are adjusted relative to the scan parameter values for the previous scan interval in response to velocity distribution from the previous scan interval. The pulse repetition frequency for each node can be selected to decrease the error estimates in the velocity measurement for a set or group of participating nodes, i.e. the nodes generating velocity data in a particular region 101a, 101b. Note that at each scan interval, the group of participating nodes can be altered by adding additional nodes, and/or dropping nodes from the group of participating nodes in the velocity measurement. The process of adjusting scan parameters or adjusting the participating nodes can be automated or manually operating.

Thus, scan parameters such as the number of pulses in each scan interval, the density of collection (hybrid, dual, random, etc) spatial coverage (radials and gates) and their combination across participating nodes can be optimized for a given event being scanned. For example, having a certain combination of pulse repetition frequency (PRF) values across participating nodes can yield an unambiguous velocity (minimum error) for a particular event. Note that this can introduce errors in other important quantities (such as propagation phase for KdP). This can be particularly valuable when using a phased array, for example, where it can be useful to gauge the retrievals in terms of the quality in relation to the adjustable scan parameters. In a multi-function phased array radar (MPAR) system, for example, the distribution of values (i.e. the level of randomness or correlation between retrievals) can be evaluated and used to improve parameter selection. Thus, scan parameters are modified in response to metric determination.

In the embodiment of FIG. 1A, each network 101a, 101b includes its own separate command and control processor 103a, 103b and associated velocity processor 104a, 104b, though it will be understood that other configurations are possible. For example, a single command and control processor can control multiple networks. Also, the command and control processor and velocity processor can be combined as a single unit. In some embodiments, the number of radar nodes in each network 101a, 101b is fixed, while in other embodiments, the system 100 can dynamically re-configure the networks to add or remove nodes from a particular network. The various command and control processors 103a, 103b communicate with one another to negotiate which node(s) are assigned to participate in the velocity measurement for each network. In the case of FIG. 1A, for example, as the weather events 105a, 105b are tracked across a particular network 101a, 101b, the command and control processors 103a, 103b can negotiate with neighboring networks to add new nodes and/or drop unused nodes to continue to follow the weather events 105a, 105b as they move out of the original network's coverage area. In other embodiments, the plurality of networks 101a, 101b coordinate with one another to "hand off" the tracking of particular weather events 105a, 105b as they move into the coverage area of a neighboring network. The system can use automated systems to negotiate the use of network resources such as those described in Krainan et al., "An Application of Automated Negotitation to Distributed Task Allocation," 2007 IEEE/WIC/ACM, the entire contents of which is incorporated herein by reference.

Figure 2:
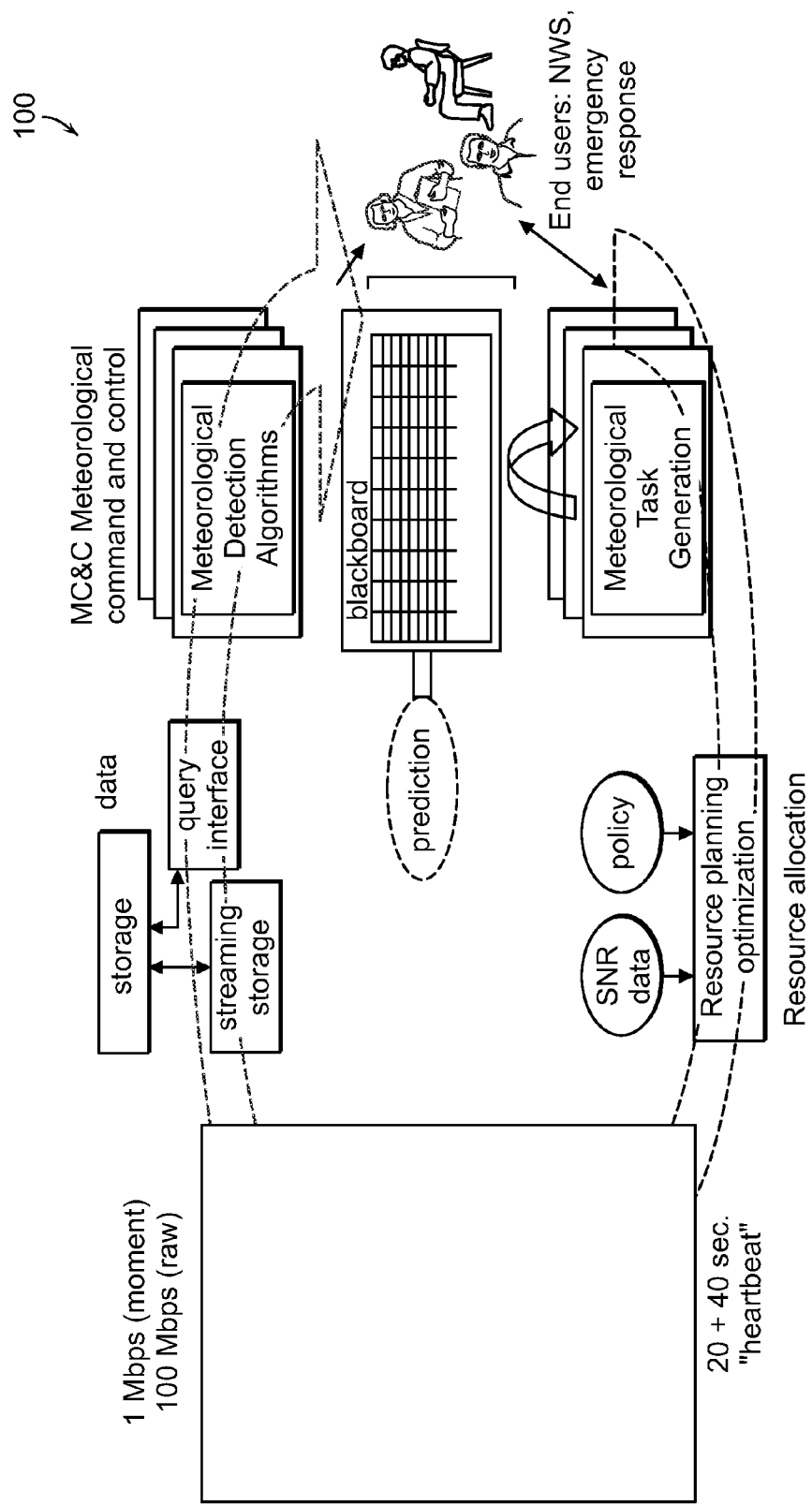
FIG. 2 schematically illustrates the information flow and control of a radar network.

The CASA IP1 system, for example, consists of four radars, which while performing individual observations in a typical Doppler weather radar fashion, collectively observe the surrounding atmosphere in a distributed and collaborative sense. A detailed review of CASA IP1 system's architecture and operation can be found in McLaughlin et al., "Short-Wavelength Technology and the Potential for Distributed Networks of Small Radar Systems," *Bulletin of the American Meteorological Society*, pp. 1797-1817 (December 2009), the entire contents of which are incorporated herein by reference. FIG. 2 provides an illustration of information flow across the system 100, and can be considered representative of Doppler radar networks. Because measurements are performed at the nodal level, a measurement's raw data is locally stored and ran through local, single-node algorithms to generate weather moment data and other observation related products. Due to limited communication bandwidth, only selected data is transmitted across the network to make it available for feature detection algorithms, post processing, or routed to other processes. The overall system is controlled by the meteorological command and control, or MC&C, which serves as the "brains" of the CASA system. MC&C controls the radar scanning of participating radar nodes, with some scanning tasks established in a predetermined manner (such as surveillance scans). Scanning commands are synchronously dispatched to the radar network following the system's heartbeat or scanning period, the time in which the network conducts a single scan of the region, normally set at one minute. In devising scanning strategies, MC&C considers numerous inputs, such as user requests, current observing conditions, and hardware availability. To insure efficient resource allocation, MC&C also considers the quality of the measurements themselves.

Figure 3:
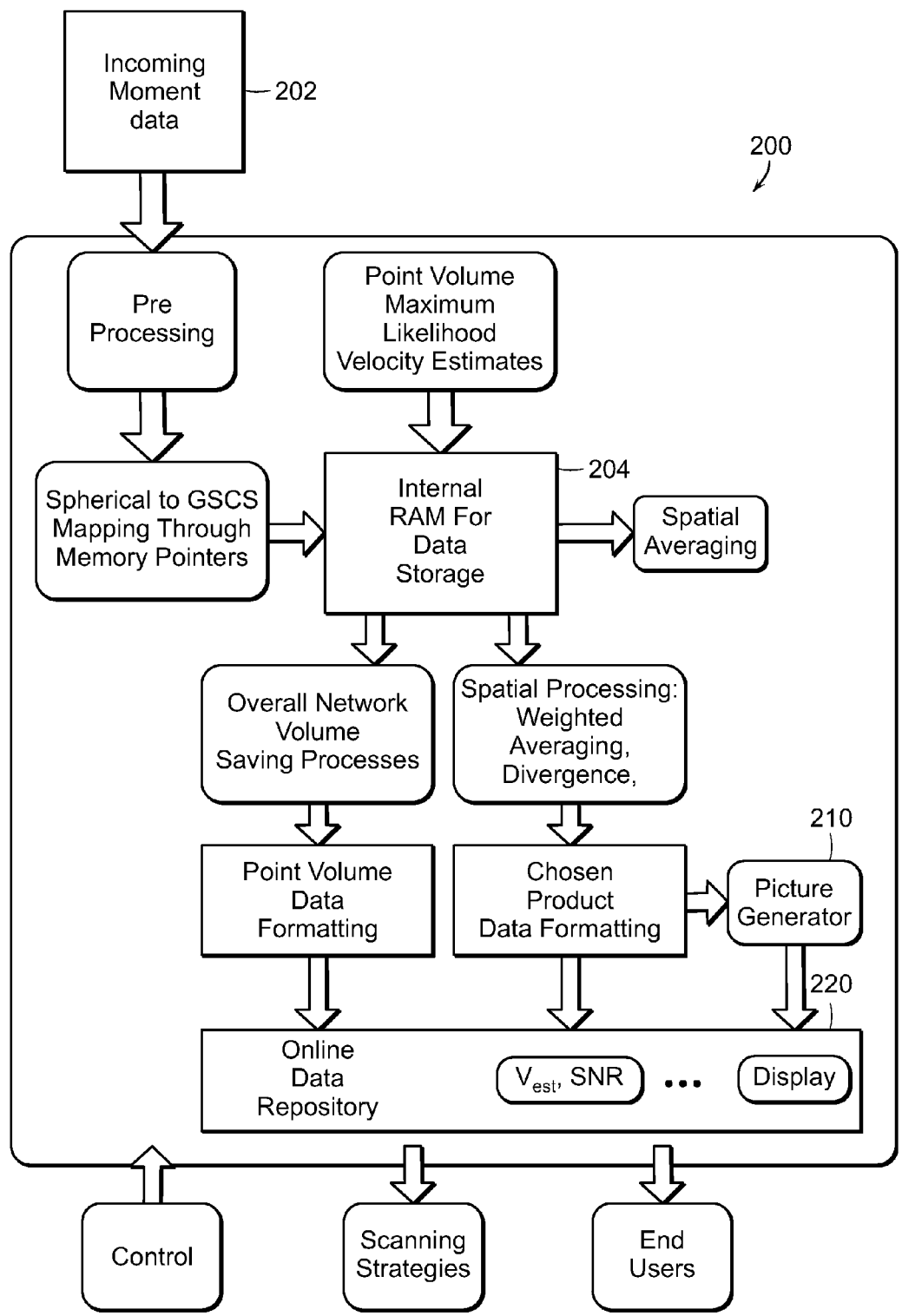
FIG. 3 is a schematic illustration of a processor for generating a derived product from multi-node moment data according to one embodiment.

To provide a real-time operational solution to the estimation of velocity and velocity related fields in a radar network environment, the balance between the processing speed, system cost, ease of implementation and, most importantly, fidelity of the estimates, needs to be considered. Because real-time mapping and calculation of vector velocities has high demands on computational resources, it is necessary to maximize the algorithm's computational efficiency of the process. A digital signal processor, or some variation of computer cluster, provides one mechanism for increasing computational throughput. In order to minimize developmental and operational costs while at the same time addressing the system scalability, a single, off-the-shelf multiprocessor computer work station is used as the architecture for one embodiment of the present invention. Because computational hardware performance and network bandwidth increase over time, it is difficult to specify a final and complete set of rules for general velocity processor design. However, the present embodiment presents one solution to this overall problem. This architecture can be reconfigured and scaled to accommodate different radar network topologies. FIG. 3 presents the architecture of the vector velocity processor 200. The network velocity processor, or VERNe, which stands for Velocity Estimation and display in a Radar Network. This processor can be implemented using a suitable programming language, such as C programming language, and in a multi-threaded, multi-processor environment.

Figure 4:
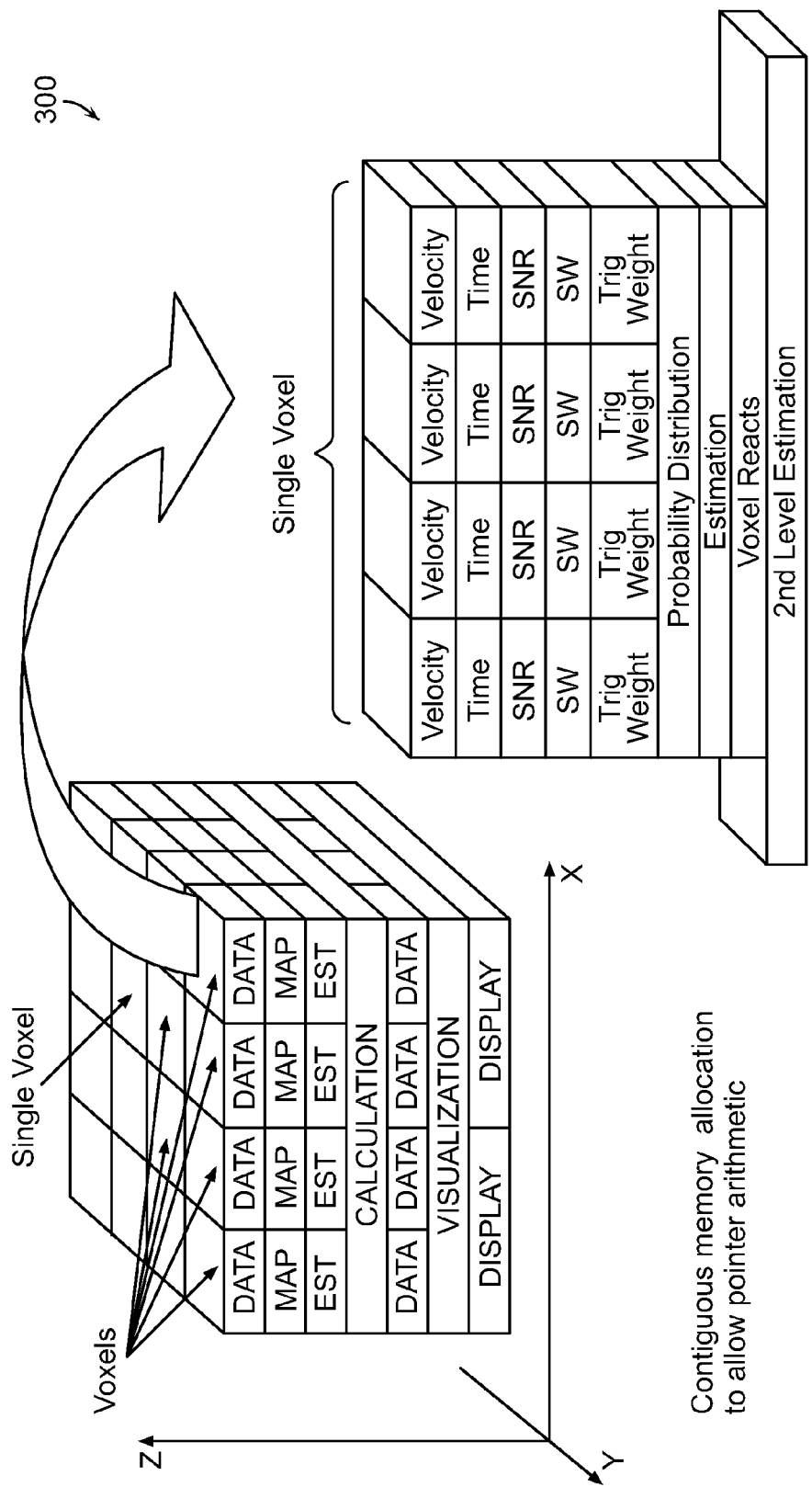
FIG. 4 shows memory allocation for a vector velocity processor according to one embodiment.

In CASA's IP1 system, access to the incoming nodal moment data 202 is provided through Unidata's Local Directory Manager (LDM), enabling a physically independent placement of VERNe within the overall MC&C infrastructure. While nodal moment data is ingested, it is first pre-processed to determine relevant statistics and scales. The data is stored in a RAM memory system 204. It is then mapped to its place in the network coordinate system. To gain a computational advantage in the intensive calculation processes, the spherical to network coordinate system maps are pre-calculated so that incoming data can be made immediately available to its correct geographic location. The pre-calculated nodal to network coordinate system mapping is provided through the means of memory pointers assembled in a contiguous data architecture that is based on a common grid, as shown in FIG. 4. This way, through simple use of memory pointer arithmetic, the speed of the mapping process is only dependent on the speed of data availability, usually limited by the communications bandwidth or sustained hard drive read speeds. This effort in saving in computational time however comes with the penalty of requiring a substantial amount of random access memory (RAM). The required size of RAM is directly dependent on the resolution and the size of the nodal and network coordinate systems. To insure VERENe's computational efficiency, heap memory is carefully managed to prevent it from becoming a bottleneck for real-time computation.

After ingestion, pre-processing and mapping to a common grid, network based calculations are performed. One such calculation is the determination of vector velocity based on a maximum likelihood technique. Results are returned to memory and made available to secondary processes, such as data storage, averaging, display generation 220 or detection algorithms. Typical parameters of the processor along with its computational and hardware specifications according to one embodiment of the invention are described in Table 1:

TABLE I

Typical VERNE parameters

| Parameter | Description |
| --- | --- |
| hardware | 2.8 GHz 8 core MacPRO with 32 GB RAM |
| planimetric resolution | user defined, typically 48 or 96 meters for CASA IP1 |
| vertical resolution | user defined, typically 500 m up to 1 km and 1 km afterwards |
| spherical resolution | user defined, typically for CASA IP1: 48 or 96 meters in range, 0.025° in azimuth, and 0.1° in elevation with 35° maximum |
| required memory | approximately 2.5 GB per vertical layer for the first three data moments for 2400 × 2696 voxel sized network |
| threads | single thread per node for ingesting files single thread per CPU core for network based calculations |
| data format | netCDF for input and output data sets png for display xml for parameter control |
| saving options | velocity estimate, confidence bound and reflectivity field across whole network network estimates of velocity, reflectivity, shear, divergence, vorticity at bottom two layers display in png format parameter summary in xml format remote ssh transfer |

TABLE I-continued

Typical VERNE parameters

| Parameter | Description |
|---|---|
| control format | fixed parameters (i.e. resolution, size) at compilation time in form of text file dynamic parameters in xml format |
| average speed | ingestion and weighted mapping: 1.2 s per file at 96 m resolution 8 μs per range-gate bin per thread network process: 0.5 s per vertical layer at 96 m resolution 2.5 μs per voxel per thread (CPU core) |

Because participating nodes of a radar network system operate in their node-centric spherical coordinate system, an overarching three dimensional grid needs to be established so that individual observations can be integrated into the network of measurements and processed. Several coordinate systems have been considered to serve this function. The Flat Earth Cartesian system has the advantage of directly providing relative distances across the network, a necessary variable in data merging and estimation processes. However, it falls short in terms of scalability because every node of the network would require its own spherical-to-Cartesian map. For example, azimuthal scans collected from participating nodes (all at zero degrees elevation) would not form a uniform grid, and transformation from their native spherical coordinates to the global coordinate system would change with position in the network. A latitude, longitude, height (lat, lon, h) coordinate system, generally found in various radar networked environments, suffers from the same scaling disadvantage as the flat Earth system does, and also requires constant lat/lon to distance transformations which present additional burdens to computation. A Geo-centered (Earth center) Spherical Coordinate System (GSCS) with the "equator" and reference meridian located in the center of the network, provides a mechanism for easy scalability because the coordinate transformation does not depend on position within the system. Further, by choosing the reference location to be in the center of the network, convergence of the meridian lines is negligible, and Euclidian distance measures may be used, both in terms of physical distance or in terms of lat/lon angles. This characteristic aids the implementation of point velocity estimation techniques, which require a constant voxel volume. The Geo-centered Spherical Coordinate System has this characteristic over a fixed height, and is constant to within 0.5% over a 10 km extent in height.

To calculate the relative position of nodes in comparison to the GSCS center, the law of cosines is utilized to calculate the great circle distances, $X_n$ and $Y_n$, which provide an offset to data coming from different nodes of the network, as in $$x_n = R_E \cos^{-1}(\sin(\text{lat}_c)^2 + \cos(\text{lat}_c)^2 \cos(\text{lon}_c - \text{lon}_n))$$

$$y_n = R_E \cos^{-1}(\sin(\text{lat}_c) + \sin(\text{lat}_n)\cos(\text{lat}_c)\cos(\text{lat}_n)) \quad (1)$$

where $(\text{lat}_c, \text{lon}_c)$ and $(\text{lat}_n, \text{lon}_n)$ are latitude an longitude positions of the GSCS origin and radar nodes respectively.

The design and operation of the CASA IP1 network gives, on average, a preference to PPI (azimuth) over RHI (elevation) scans. Moreover, because participating nodes are positioned on the Earth surface, results of higher fidelity are obtained for regions of constant elevation, and since limited computational resources constrain the overall resolution, preference is given to the planimetric resolution rather than vertical.

Within velocity processor, the planimetric resolution needs to be sufficiently high so that the spherical GSCS transformation errors would be kept to a minimum and to accommodate the spatial scales relevant to the majority of weather related phenomena (e.g., approximately 500 m planimetrically). In one embodiment, the processor's planimetric resolution is set to be a constant across the network, and is determined by a user-defined integer divisor of the smallest range resolution available from participating nodes. The size of the coordinate system is defined by the maximum radius of the participating nodes. The vertical resolution does not need to be constant and can be defined as a vector of heights, typically with 350 m bins beginning at 400 m up to 2 km height and 1 km bins afterwards, up to a 10 km height. The size and number of the bins are typically determined based on the available computational resources.

Figure 5:
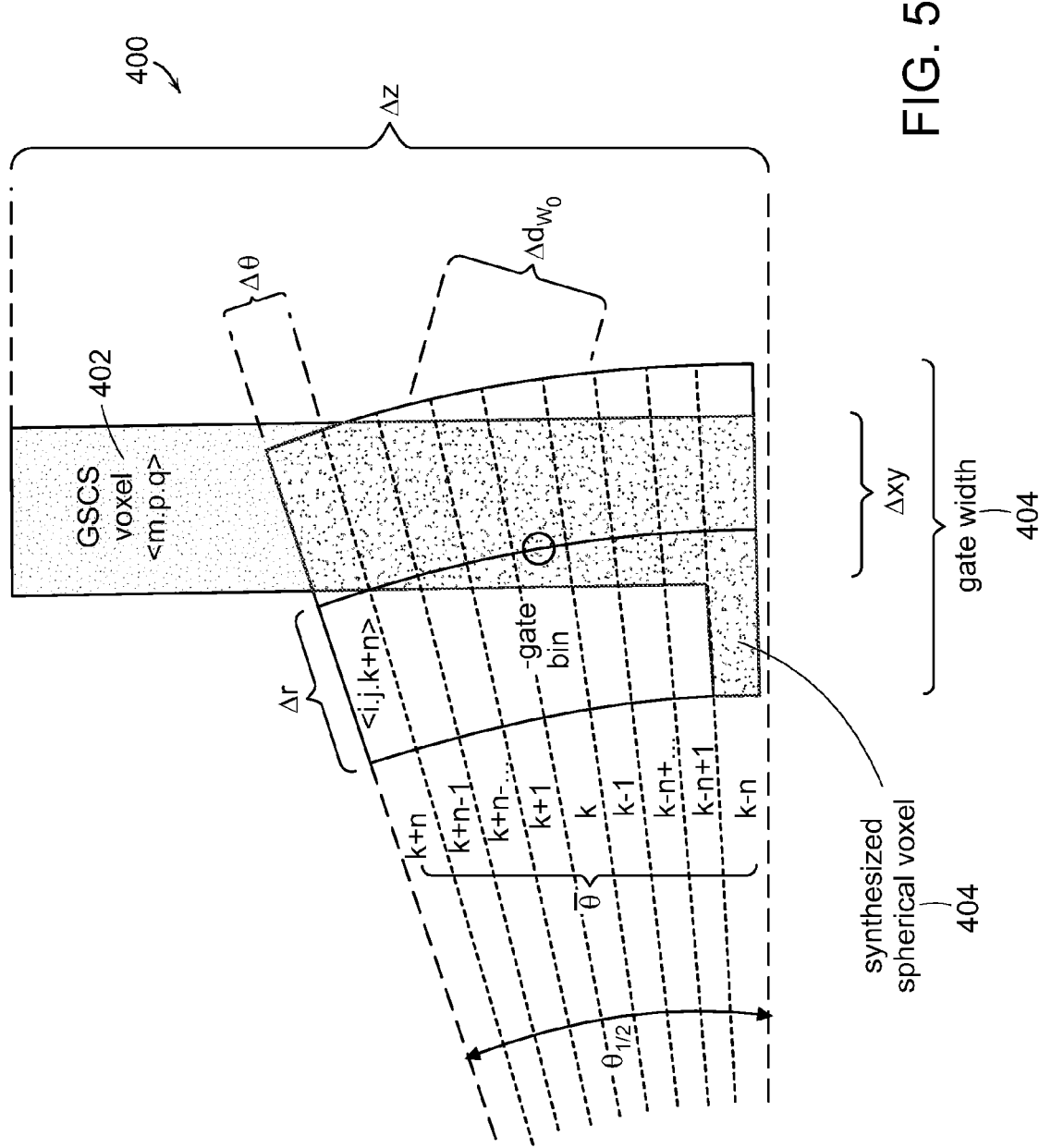
FIG. 5 illustrates the spatial relationship of observation volume (range-gate bin) to the synthesized spherical and Geo-centered Spherical Coordinate System (GSCS) voxels presented in elevation-range plane.

In one embodiment, to avoid constantly converting from one coordinate system to another, an intermediary spherical coordinate system is synthesized at a finite resolution, so that the corresponding map to the Geo-centered Spherical Coordinate System can be precomputed and held in memory. FIG. 5 illustrates the spatial relationship between three coordinate systems. Coordinate transformation errors are minimized by keeping the synthesized spherical coordinate system resolution as high as possible under the constraint of available memory. Each volume (or voxel 402) that is observed by a radar node (nominally defined by the elevation and azimuth beamwidths, and the range resolution) spans a corresponding volume in the synthesized spherical coordinate system (synthesized voxels 404) centered on that node. For example, a set of elevation angles in the synthesized space, $\bar{\theta}_k$, corresponding to the actual elevation θ, and the region surrounding it, as bounded by antenna half power beamwidth $\theta_{1/2}$, is given as:

$$\bar{\theta}_k = [k-n, k-n+1, \ldots, k-1, k, k+1, \ldots, k+1, \ldots, k+n] \Delta\theta \quad (2)$$

where integers k and n are defined as k=rint(θ/Δθ), n=rint($\theta_{1/2}/2\Delta\theta$), where Δθ is the elevation resolution of the synthesized spherical coordinate system and rint is a rounding function to the nearest integer. Using a similar approach for determining radial and azimuthal vectors for the synthesized spherical space, the measurement volume described in its native nodal spherical coordinate system as $\langle r, \phi, \theta \rangle$ is mapped to a corresponding set of volumes in the synthesized spherical space as $\langle \bar{r}_i, \bar{\phi}_j, \bar{\theta}_k \rangle$. Rather than referring to the discrete positions in spherical space however, individual entries in the synthesized coordinate system are referred to by their indices $\langle i, j, k \rangle$, where, for example, $r_i = i\Delta r$. Adopting the formulation in Doviak and Zrnic, *Doppler Radar and Weather Observations*, MIT Press, Boston, 1974, the height above the Earth surface, $h_{i,k}$, is calculated by $$h_{i,k} = \sqrt{r_i^2 + \frac{16}{9}R_E^2 + r_i \frac{8}{3}R_E \sin(\theta_k)} - \frac{4}{3}R_E \quad (3)$$

and the great circle distance $d_{i,k}$ is $$d_{i,k} = \frac{4}{3}R_E \sin^{-1}\left(\frac{r_i \cos(\theta_k)}{\frac{4}{3}R_E + h_{i,k}}\right), \quad (4)$$

where $R_E$ is the Earth's radius.

To fully define the measurement volume's center position within the synthesized spherical space, $\phi_j$ is used to represent the azimuth position of the observing beam in the synthesized spherical space. The placement of the resolution volume in synthesized spherical space defined by ⟨i,j,k⟩ maps to the corresponding indices ⟨m,p,q⟩ of the GSCS memory as $$m = rint(d_{i,k} \cos(\phi_j)/\Delta xy) + m_n$$

$$p = rint(d_{i,k} \sin(\phi_j)/\Delta xy) + p_n$$

$$q = rint(h_{i,k}/\Delta z) + q_n \quad (5)$$

where $\Delta xy$ and $\Delta z$ are the planimetric and vertical resolutions, respectively, and $m_n$, $p_n$ and $q_n$ are the radar center positions of the nth node, in terms of memory pointer locations within the GSCS.

Because the GSCS coordinate transformation is kept in memory, only a single memory address pointer is required to map ⟨i,j,k⟩ to the corresponding position ⟨m,p,q⟩; the only real-time computation necessary to map data from its native nodal spherical system to GSCS is to determine the indices ⟨i,j,k⟩ in spherical space. Note that this approach readily accommodates participation of the nodes that are not stationary. To insure a complete mapping of GCSC space without the use of additional interpolation methods, the highest resolution of synthesized spherical space that is necessary should meet the Nyquist spatial sampling requirement $2r_{max} \sin(\Delta\phi) < \Delta xy$, where $r_{max}$ is the maximum range observed by a single node.

Because the spherical-to-GSCS transformation is not a one-to-one relationship, it is necessary to perform pre-processing on the incoming nodal data. In a normal implementation of network velocity processor, across a vast majority of the GSCS system, the planimetric resolution is smaller than the resolution proscribed by the antenna beam width. Hence, distance thresholding, a process where data from the observation whose beam center is closest to the GSCS voxel takes precedence over other overlapping observations, can be used. This thresholding is indirectly implemented in azimuth by performing the mapping at the resolution of the minimum antenna motion. Nodes in the CASA IP1 system typically oversample their observation space in azimuth.

As a result of the coarse vertical resolution of the geocentric spherical coordinate system in comparison to the vertical resolution in the node-centric spherical coordinate system, in regions close to individual nodes an oversampling of the GSCS space occurs. Because nodal data is mapped to the GSCS through the synthesized nodal spherical space whose resolution is high in comparison to the resolution of observations, by keeping track of the resulting number of mapped samples, a weighted running average of observations falling into a single resolution volume is easily computed by $$\hat{x}_n = \frac{x_n + (n-1)\hat{x}_{n-1}}{n} \quad (6)$$

where $X_n$ is the nth synthesized spherical space sample used in establishing the estimate, $\hat{x}$, for the given voxel in the geocentric spherical coordinate system. Because the area on which the weighted averaging takes place is bounded by the voxel height, in instances where different observation volumes intersect with a particular GSCS voxel, this approach results in a beam-voxel-intersection-volume-weighted average. This is a desired effect, because observation volumes whose intersection with an encompassing voxel is larger will have a proportionally larger number of scatters representing the intersecting voxel compared to observation of smaller volume-voxel intersection.

In overlapping regions of a network, multiple measurements from each of the participating nodes may exist. To provide a better means for comparing and combining the data, it is necessary to estimate the quality of measurement itself. Because statistical moments of the nodal measurements are calculated assuming a Gaussian distribution, the quality of individual observations can be related to the signal to noise ratio (SNR) and the spectral width. Adopting the classical radar range equation for precipitation, the SNR can be calculated as $$SNR = \frac{P_{Tx} c T_{pulse} G_{ant}^2 \left(\frac{\theta_1}{2}\right)^2 |K_w|^2 \pi^3}{1024 \ln(2), \lambda^2 k_b T B W F} \frac{Z}{r^2} \quad (7)$$

where $P_{Tx}$ is the transmitted power, $T_{pulse}$ is the length of the pulse, $G_{ant}$ is the antenna gain, $\theta_{1/2}$ is the antenna half power beamwidth, $K_w$ is a coefficient related to the permittivity of water, $k_b$ is Boltzmann's constant, T is temperature, $\lambda$ is the operating wavelength, Z is the reflectivity and r is the radial distance to the target. As expected, it can be seen that in addition to the mostly fixed radar parameters, the signal to noise ratio, and hence the accuracy of the measured velocity, is primarily proportional to the reflectivity and inversely proportional to the square of distance.

The spectral width is the second weather spectral moment and is defined as the 3 dB width of the velocity spectra. If the measured spectra follow a Gaussian distribution, this width can be equated to the square root of the measurement variance, which can be used in determining statistics related to velocity estimates. If algorithms for determining the spectral width fail to converge, the absence of the spectral width can in turn be used as an additional indicator for use by subsequent algorithms.

In addition to VERNe's calculation of estimated nodal observations and data quality in GSCS space, a metric gauging how mapped estimates geometrically relate to GSCS space is also derived to assist subsequent processes that operate on data from a network persective. This metric can be derived by considering the observation volume size, its intersected volume with a GSCS voxel, the mutual proximity of observation centers, and the proximity of observation centers to the center of the GSCS voxel.

In the CASA IP1 VERNe implementation, the beam size is directly related to the distance, measured in memory pointers, between the node center and the target volume. This is achieved by using a constant GSCS planimetric resolution and constant observation volume size in terms of spherical coordinate system units. The intersection between the observing volume and GSCS voxel volume can be determined during the mapping from synthesized spherical space to GSCS system by simply recording the total number of mapped spherical voxels, n, as shown in Eq. (6). It has been shown that, in addition to Cressman weighted averaging, a linear weighted average yields the most desirable result in velocity estimates. Hence, a linear function is used to derive the weight which corresponds to the ratio of the volume described between the observing beam and the GSCS voxel, and the observing volume itself, as in $$W_V = \begin{cases} n\frac{\Delta\phi\Delta\theta}{\sin(\theta_{1/2})^2}, & n\frac{\Delta\phi\Delta\theta}{\sin(\theta_{1/2})^2} < 1 \\ 1, & n\frac{\Delta\phi\Delta\theta}{\sin(\theta_{1/2})^2} \geq 1 \end{cases} \quad (8)$$

where $\Delta\phi$ and $\Delta\theta$ are the azimuthal and elevation resolution, in radians, of the synthesized spherical coordinate system and n is total number of mapped samples from the synthesized spherical coordinate system to a given voxel in the GSCS system. In a typical CASA IP1 VERNe's configuration, $W_V$ reaches unity for radii less than 5-10 km, which is less than the midpoint distance between any pair of nodes. Hence, this weighting can be applied to competing measurements across all of the network.

To gauge mutual proximity of observation centers weight $W_O$ is provided. At the GSCS voxel where multiple beams intersect, from vector of indices $\langle \overline{m}, \overline{p}, \overline{q} \rangle$ representing the beam center positions in the GSCS, the real valued indices vector $\langle \hat{m}, \hat{p}, \hat{q} \rangle$ is derived to represent geometric center of observations. Distance between the center of particular observation, represented by $\langle m, p, q \rangle$, and $\langle \hat{m}, \hat{p}, \hat{q} \rangle$ is used to calculate corresponding $W_O$, as in $$W_O = 1 - \frac{\sqrt{((m-\hat{m}_v)\Delta xy)^2 + ((p-\hat{p}_v)\Delta xy)^2 + ((q-\hat{q}_v)\Delta z)^2}}{i_{max}\Delta r \sin(\theta_{1/2})} \quad (9)$$

where $i_{max}\Delta r \sin(\theta_{1/2})$ represents the maximum beam size. Due to the nature of VERNe's mapping, note that in Eq. (9), and in the subsequent Eq. (10), the numerator is never greater than denominator.

The ratio of the distance between centers of observation volume and intersecting voxel and the maximum beam size is used to provide weight gauging the proximity of the observing beam and GSCS voxel, as in $$W_D = 1 - \frac{\sqrt{((m-m_v)\Delta xy)^2 + ((p-p_v)\Delta xy)^2 + ((q-q_v)\Delta z)^2}}{i_{max}\Delta r \sin(\theta_{1/2})} \quad (10)$$

where $\langle m,p,q \rangle$ and $\langle m_v, p_v, q_v \rangle$ represent the beam center and voxel indices in GSCS space respectively.

The estimation of vector velocity, $\vec{v}_T$, in one embodiment is based on a point volume maximum likelihood (PVML) estimator, written as $$\hat{v}_r = (A^T \text{Cov}_{v_R}^{-1} A)^{-1} A^T \text{Cov}_{v_R}^{-1} \overline{v}_R \quad (11)$$

where A is a matrix of trigonometric projections of the target onto observing nodes, $\overline{v}_R$ is a vector of participating radial velocity measurements and $\text{Cov}_{v_R}$ is a positive definite measurement covariance matrix such that $\text{diag}(\text{Cov}_{v_R}) = \overline{\sigma}_{v_R}^2$, and $\overline{\sigma}_{v_R}^2$ is a vector of measurement variances representing the confidence bound of the measurement.

Because participating nodes of a radar network system operate in their own node-centric spherical coordinate systems, they rarely observe exactly the same volumes. Hence, it is necessary to reformulate the covariance matrix used in PVML to incorporate uncertainties introduced through the mapping of observations. For vector velocity estimation, we use the above described mapping quality values to formulate the constituent entries of the covariance weighting matrix, as in $$\sigma_{v_r}^2 = \frac{1}{N_s W_V W_D W_O}\left(2\left(\frac{\lambda \cdot PRF}{4\pi}\right)^2 SNR^{-1} + SW^2\right), \quad (12)$$

where PRF is the radar pulse repetition frequency, SW is the spectral width, and $N_S$ is the number of samples collected during the nodal measurement to determine the statistical moments.

Starting from the formulation for the variance of the estimated velocity field, described further below, the corresponding standard deviation can be written as $$\sigma_T = \|\text{diag}((A^T \text{Cov}_{v_R}^{-1} A)^{-1})\|_2, \quad (13)$$

where $\|\cdot\|_2$ is L-2 norm.

The placement of velocity estimates into the Geo-centric Spherical Coordinate System provides a computationally efficient mechanism for employing higher-order calculations. For example, planimetric operations such as $$\frac{\partial v_x}{\partial x} + \frac{\partial v_y}{\partial y}, \text{ and } \frac{\partial v_y}{\partial x} - \frac{\partial v_x}{\partial y}, \quad (14)$$

directly yield to estimation of divergence and vorticity respectively, whereas comparative operations across vertical dimensions, as in $$\sqrt{\frac{\partial v_x^2}{\partial z} + \frac{\partial v_y^2}{\partial z}}, \text{ and } \frac{\partial}{\partial z}\arctan\left(\frac{v_y}{v_x}\right) \quad (15)$$

yield to the estimation of vertical speed and directional shear.

Figure 7A:
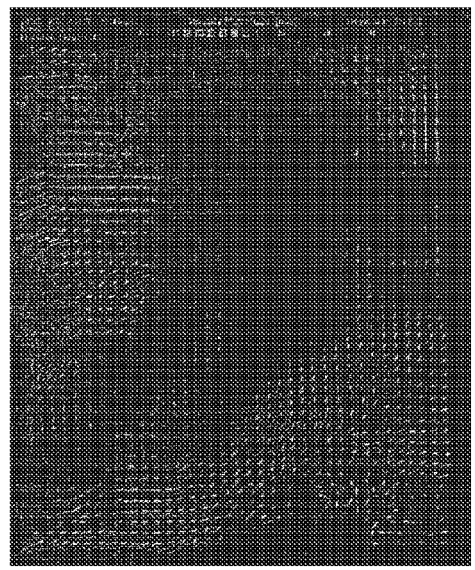
FIGS. 7A and 7B are a displays of the vector velocity field plot generated by a processor of the invention from CASA IP1 set of observations on Feb. 10, 2009 21:08 at 192 m planimetric resolution, at 0-600 m AGL in GSCS (FIG. 7A) and 600-1200 m AGL in GCSC (FIG. 7B)
Figure 7B:
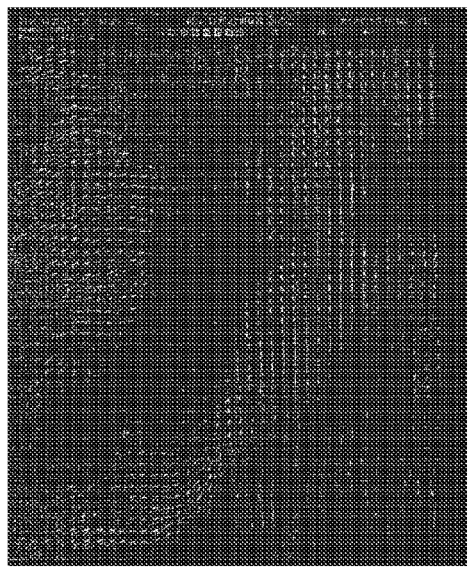

While configurable, the main VERNe products are the datasets of estimated velocities and corresponding confidence bounds in the GCSC coordinate system. Additional products include reflectivity fields that are used for reference, and for enhancing the display. In addition to derived data products, VERNe incorporates a real-time display as well, a sample of which (collected by CASA's IP1 network on Feb. 10, 2009 at 21:07 UTC; also depicted in FIG. 8) is shown in FIGS. 6A-6F. The operational parametric resolution was 96 m and scalar fields are displayed at 192×192 m. The vector fields of FIGS. 6A and 6B are displayed at 3.1 km and 364 m, respectively. The vector field of FIG. 6B corresponds to the area depicted by rectangles in FIGS. 6A and 6C-6F. The circular rings represent maximum radar range of 42 km. Note that areas of low confidence are opaque and that a meteorological hook echo (bounded by a rectangle in FIG. 6A) appears in the upper left central portion of the display. A higher resolution field (shown in FIG. 6B) reveals flow dynamics that resemble an emergence of a closed circulation and potential updraft. Note that vector fields in FIG. 6B, not post-processed for error minimization or model fitting, are presented at 384 m planimetric resolution, while FIGS. 6C through 6F were derived as an average from a running 768 m² window. In these figures, a relatively high counterclockwise vorticity, evident at the bottom of the reference rectangle in FIG. 6D, and the corresponding clockwise vorticity, near the rectangle center, indicate the presence of an updraft. Further, the presence of a strong clockwise directional and magnitude shear at the bottom of the rectangle in FIGS. 6C and 6F, respectively, further indicates the formation of a rotating updraft within the storm. This is verified by data from the following CASA IP1 periodic network command signal (heartbeat), on Feb. 10, 2009 at 21:08 UTC, shown in FIGS. 7A-7B, which reveal vortex-like circulations. While the velocity field strength in FIG. 7 is not sufficiently high to indicate the presence of tornado, the magnitude and direction provide evidence of the storm severity.

Figures 8A, 8B:
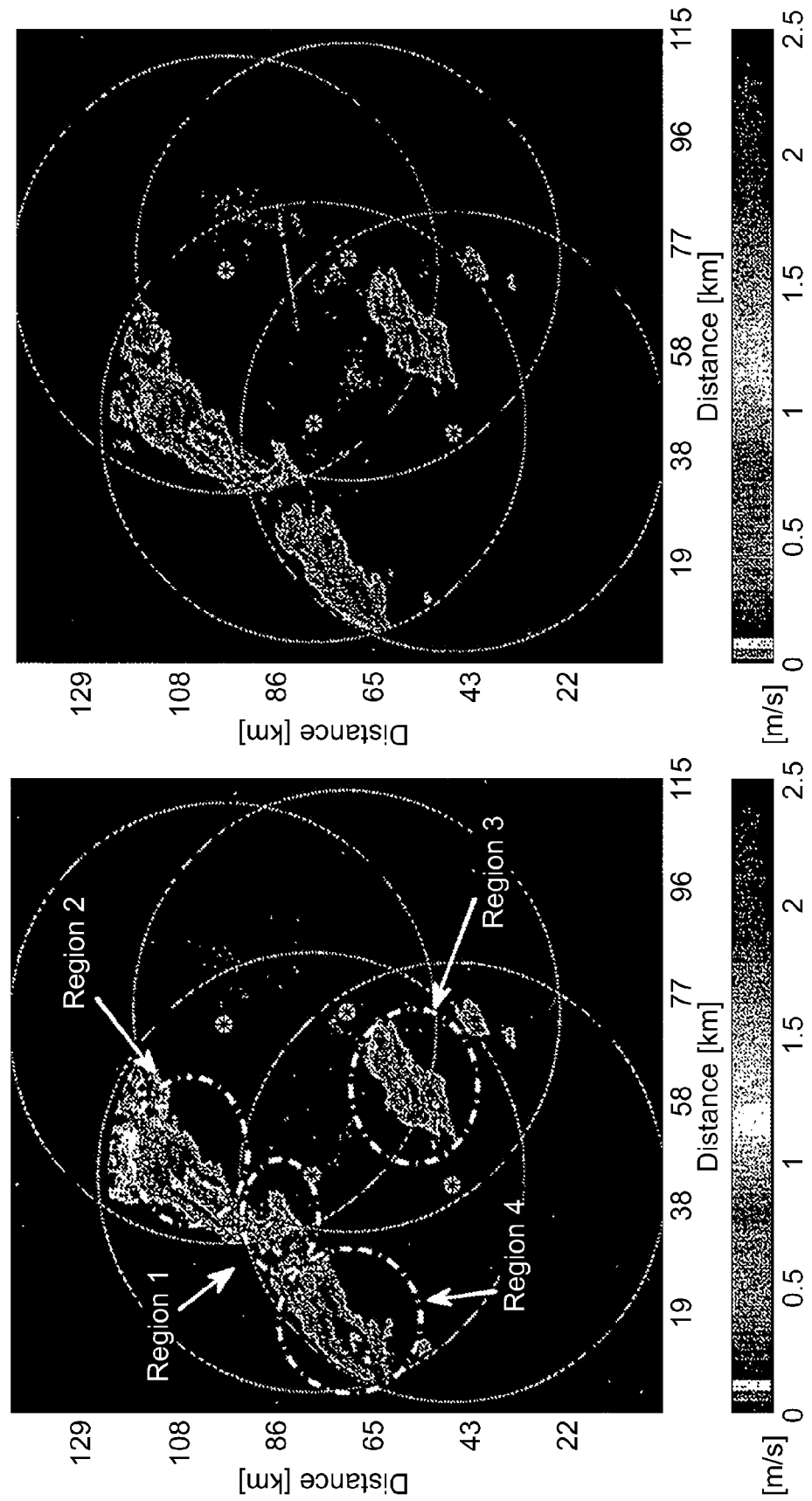
FIGS. 8A-8D show a comparison of standard deviation estimates to several different approaches to multi-Doppler vector velocity estimation, with the estimates of standard deviation deduced considering $W_F=W_O=W_D=1$ (FIG. 8A); $W_D=W_O=1$ (FIG. 8B); $W_D=1$ (FIG. 8C); and $W_O=1$ (FIG. 8D)
Figure 8D:
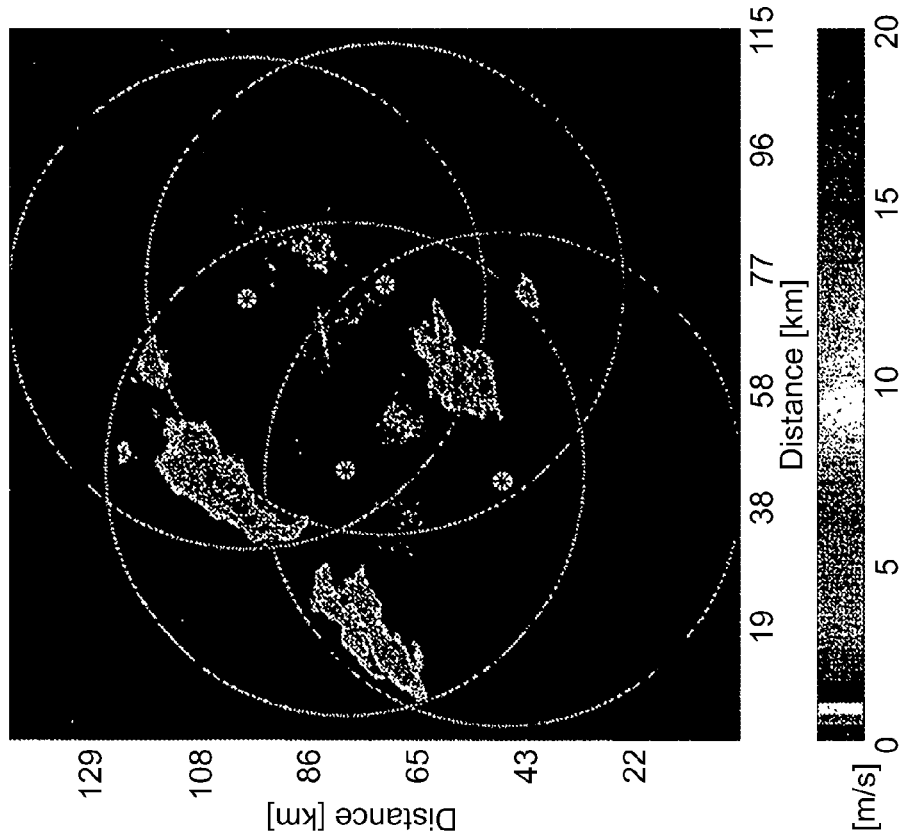

To provide an insight on the influence of the weights used in Eq. (12) on the standard deviation computed by Eq. (13) within the network, FIGS. 8A-8D are shown, where various combinations of weights are employed. Several different approaches to multi-Doppler vector velocity estimation at 0-600 m AGL of multiple scans with one minute time span are shown. The thin solid circles represent 42 km maximum nodal range. Data was processed at 96 m resolution and running block averaged at 384 m. Note that the field in FIG. 8A, where no mapping derived weights were considered, shows the standard deviation of the estimated velocity field assuming that all of the observations had a Gaussian distribution and were properly matched in volume. While this holds true only in limited regions of the network, the plot of FIG. 8A provides a theoretical upper bound of the estimation accuracy. The accuracy field depicted in FIG. 8B, utilizes the weight Wv, and indirectly takes into account the range-to-target. Hence, the beam size and its projection onto the GSCS network coordinate system play a role in estimating the accuracy. However, the solution shown in FIG. 8B has limited utility because it does not consider the co-alignment of participating measurements. The results in the plot shown in FIG. 8C takes this into account by considering the proximity of participating beams to each other. The results shown in FIG. 8D differ from FIG. 8C as they consider the distances of observation centers to the voxel, so the estimates, in terms of confidence in representation of GSCS voxels, can be gauged. Although provision of spatial co- and cross-correlation of data provide better metrics to assist data post-processes, they can be computationally cumbersome, and hence generally not practical for use in a real-time environment. The more practical solution of calculating weights lends itself much better to this application. More generally, weighting represents a cost function that is proportional to the standard deviation of the estimated fields, but is not intended to calculate the error bound exactly. Rather, their purpose is to determine relative accuracies, and this itself can change depending on the criteria used in choosing the balance of weights.

Figure 8C:
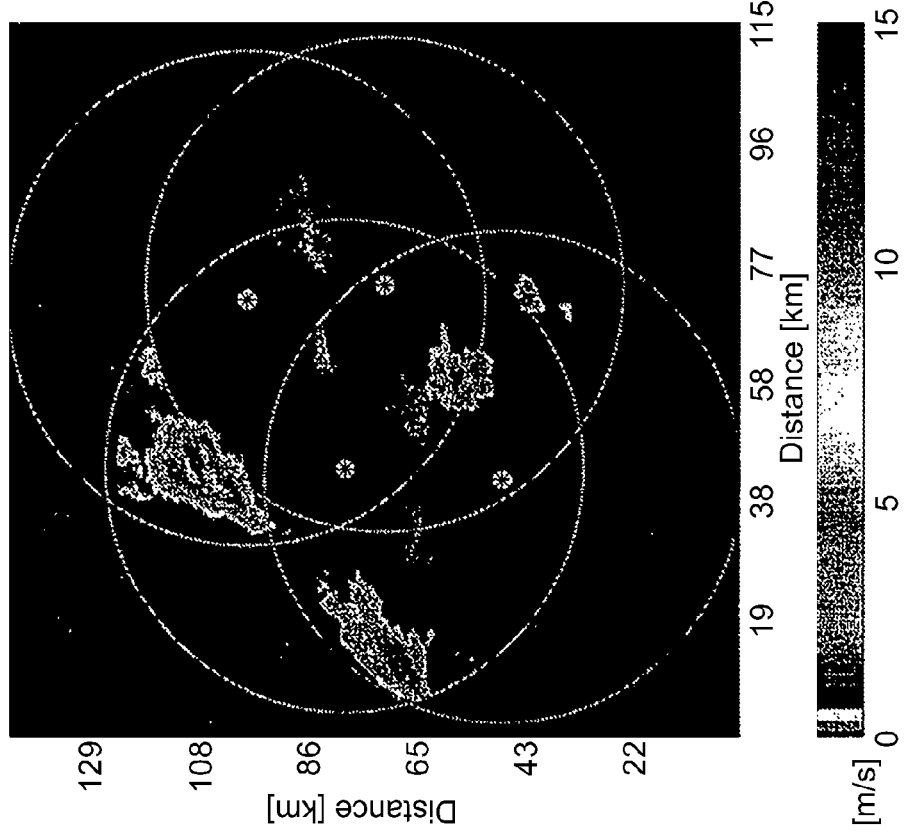

To demonstrate this difference, four regions within the derived fields of FIGS. 8A-8D have been highlighted. In Region 1, where the presence of a hook echo is evident, the results in FIG. 8C show a large estimate uncertainty. This is due to the fact that the formulation in FIG. 7C favors physically matched beams, which occur at equidistant positions between the nodes, and this is not the case for Region 1 (unless the closest node is discarded). This effect is also evident in Regions 2, 3 and 4, within which it can be observed that portions closest to the equidistant point amongst the node centers are favored compared to other locations in the network. Interestingly, while FIG. 7C is closest to the correct error estimate from a mathematical perspective, the inclusion of effects from the GSCS coordinate system make it less so. That is, while participating beams can be well co-aligned in physical space, the corresponding estimates are not necessarily correctly balanced in the synthesized space, and can yield to incorrect conclusions in further analysis. Although the estimated velocity error in FIG. 8D appears to be the largest in an absolute sense, compared to the others, it is more evenly spread across all of the depicted regions, and is the best made for in using the mutual proximity of observations and their projections onto GSCS voxel centers as inputs for the error estimation.

Different weighting scenarios, as described above, can be used to adjust the balance between data utilization the use of accurate data. For example, VERNe can provide an estimate for directional vertical shear. If only the correlation of data were used to determine accuracy, the result would be a high proportion of missed detections. In the weighting scenario shown in FIG. 8D, the weighting is much more even and hence likely to correctly highlight reasonable candidates for regions exhibiting a large vertical shear.

The computational speed of VERNe depends on its configuration parameters, the number of derived outputs and the quantity of nodal observations processed. The number of nodal data sets is determined by CASA's system heartbeat, which on average generates 20 files per heartbeat, typically one-third of these are full surveillance scans. While some parameters, such as the type (RHI, PPI, etc.) and number of processes, can be configured dynamically, the main parameter impacting the algorithm speed, the GSCS resolution, is set at compilation time. On average, 1 µsec, or 15K clock cycles, per CPU core, per voxel are required. Across the CASA IP1 coverage area, processed at 96 m planimetric resolution and 8 vertical layers (a typical configuration), nodal mapping takes 15 seconds, and network estimation takes 4 seconds to complete. Including data set creation, display generation, and output transfer to a remote repository, VERNe's total heartbeat processing time takes on average 40 seconds, well within the one minute heartbeat of the CASA system. Additional information on VERNe's timing performance and configuration options can be found in Table 1, above.

Figure 9:
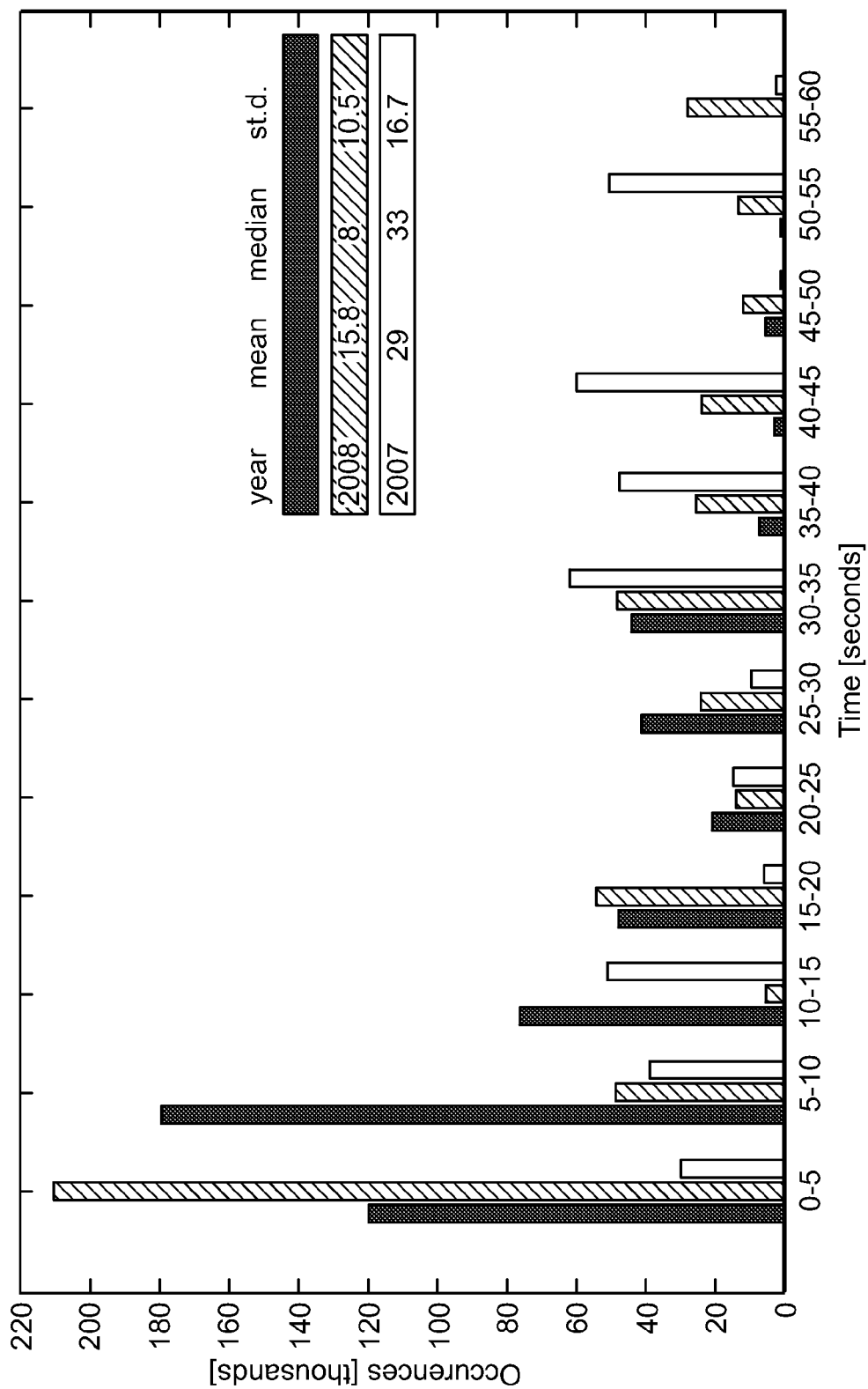
FIG. 9 is a composite histogram of differential scanning times for the CASA IP1 network for three instances in 2007, 2008 and 2009 respectively.

To accurately estimate vector velocities, participating observations have to be sufficiently temporally correlated, meaning that participating nodes have to observe the space in timely, possibly coordinated, manner. To insure correlation time sufficiency, VERNE in its velocity estimate can consider data originating either within the specified time window, or from a set of scans issued at given heartbeat of the system, which in CASA IP1 is currently set at 1 minute length. To gain an insight into the CASA IP1 system scanning performance, the time between observations can be measured by considering the maximum differential time of observation amongst intersecting beams at given point in space. FIG. 9 provides a composite histogram for three instances, which can be considered as typical cases in 2007, 2008 and 2009 performance. Scanning differential times are binned at 5 second intervals and collected between 500 and 1000 m in height, where the majority of scans belong to 2° elevation PPI scans. In 2008, the CASA IP1 system made the 2° elevation PPI scans mandatory that are performed at beginning of every periodic network command signal, clearly improving differential observation times in comparison to 2007. In several 2009 cases it was noted that the mean differential observing times at heights that do not generally belong to the surveillance scans degrade to approximately 22 seconds, a value well within the recommendations given in the literature.

Figure 10:
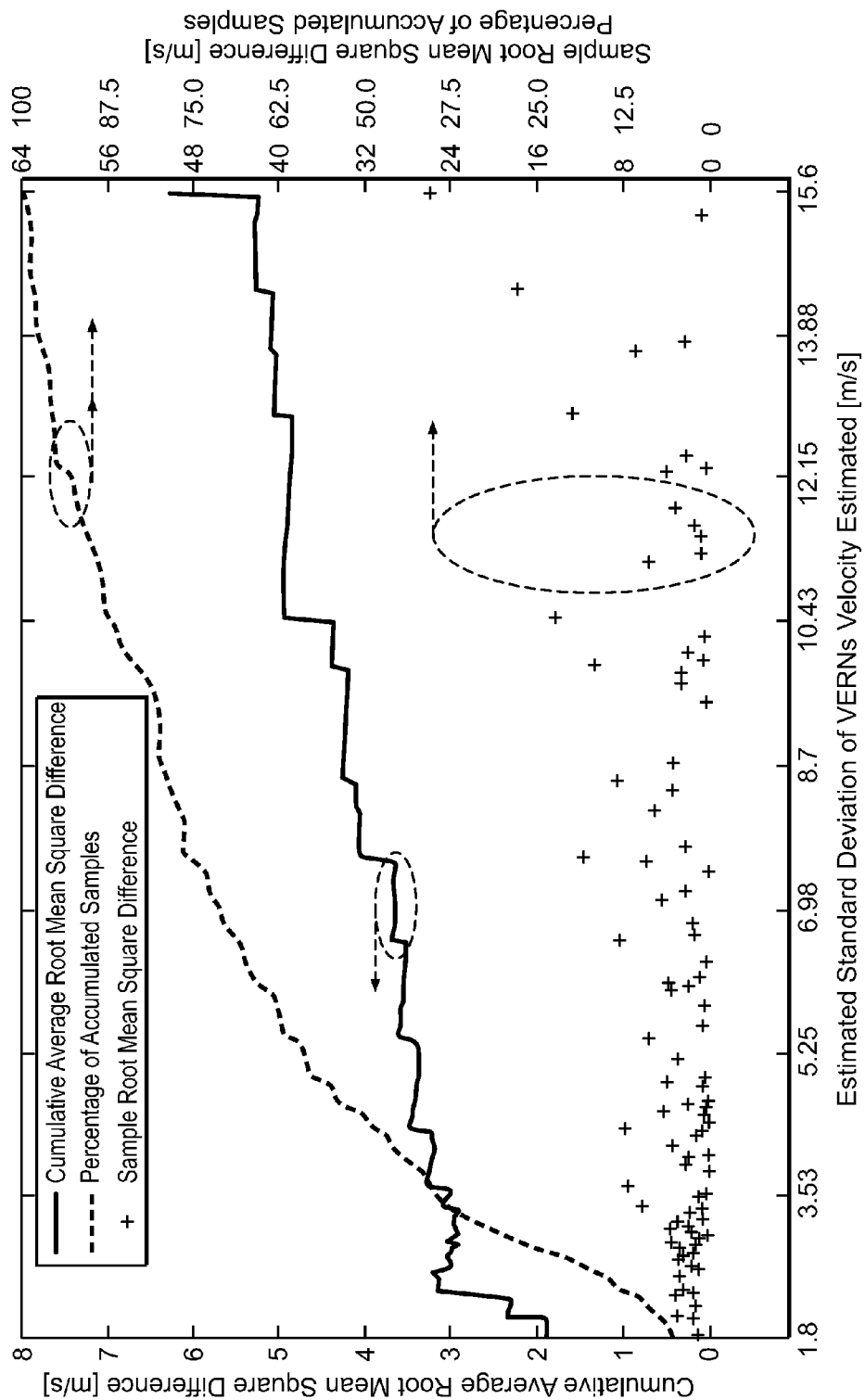
FIG. 10 is a plot of the Root Mean Square Difference Analysis for May 14, 2009 2 AM through 6 AM UTC as measured in-situ and estimated by a processor of the invention.
Figure 11:
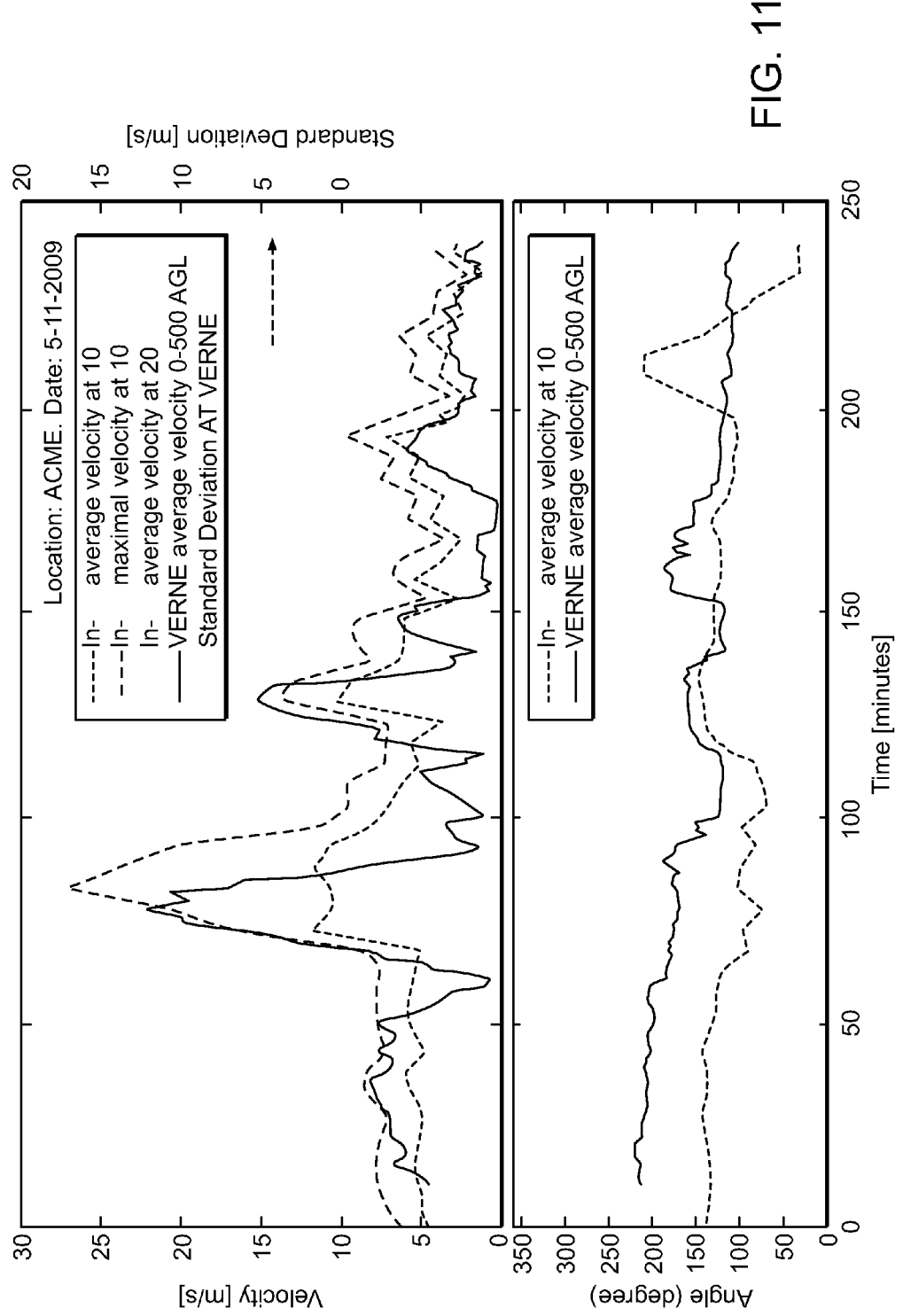
FIG. 11 shows the magnitude of velocity for May 14, 2009 2 AM through 6 AM UTC as measured in-situ and estimated by a processor of the invention.

In order to gain an insight into the qualitative aspect of the performance of the network velocity processor, its velocity estimates can be compared to ground-based clear-air velocity measurements made by the Oklahoma Mesonet, a network of weather monitoring stations, some of which are positioned within the overlapping CASA IP1 network coverage. The ACME Mesonet station, located at latitude: 34° 48' 29" N and longitude: 98° 1' 23" W is situated 25.5, 22.1, 8.5 and 30.5 km from CASA's KSAO, KCYR, KRSP and KLWE nodes respectively, with corresponding beam heights of 0.865, 0.758, 0.286 and 1.065 km. Although there is a difference in heights, the relationship between Mesonet data and data output from VERNe is quite good. An example of this comparison is shown in FIG. 11 where VERNe data was collected as an average of voxel values within 500 m radius around the ACME site with the GSCS resolution set at 48 m in the plane and 500 m vertically. For this two hour period shown, the ground measurements and VERNe estimates have a cross-correlation of 0.69 and average mean square difference of 9.5 m/s. In this period of comparison, 32% of the voxels were derived from two node observations, 38% from three nodes, and 14% from four nodes. The mean square difference of these observations was 13.2, 8.0 and 4.6 m/s for the 2, 3 and 4 node estimates respectively. The majority of CASA observations in this time period were close to or below the system thermal noise floor. To gain better insight into performance, estimates should be evaluated relative to the corresponding standard deviation. FIG. 10 is presented to demonstrate the relationship between the VERNe estimated standard deviation of velocities, $\sigma_{\bar{v}_T}$ and the root mean square difference, RMSD, in velocity magnitude between those estimated by VERNe, $v_T$, and the ones derived from the ACME Mesonet station, $v_{meso}$, calculated as $\sqrt{\|\langle \bar{v}_t \rangle\|_2^2 - v_{meso}^2}$. In this figure, a solid line represents the cumulative RMSD of all points whose corresponding to $\sigma_{\bar{v}_T}$ is lower the standard deviation threshold given on the plot's x-axis. The dashed line gives the percentage of accumulated samples that met the given threshold and has an upper limit of unity. The correlation coefficient between $\sigma_{\bar{v}_T}$ and the RMSD is 0.96 indicating a strong relationship between the estimates, as determined by VERNe, and the measured ground data. A scattering plot is included to demonstrate the individual sample relationship where it can be noted that the larger values of RMSD are driven by fewer samples of larger magnitudes.

Figure 12A:
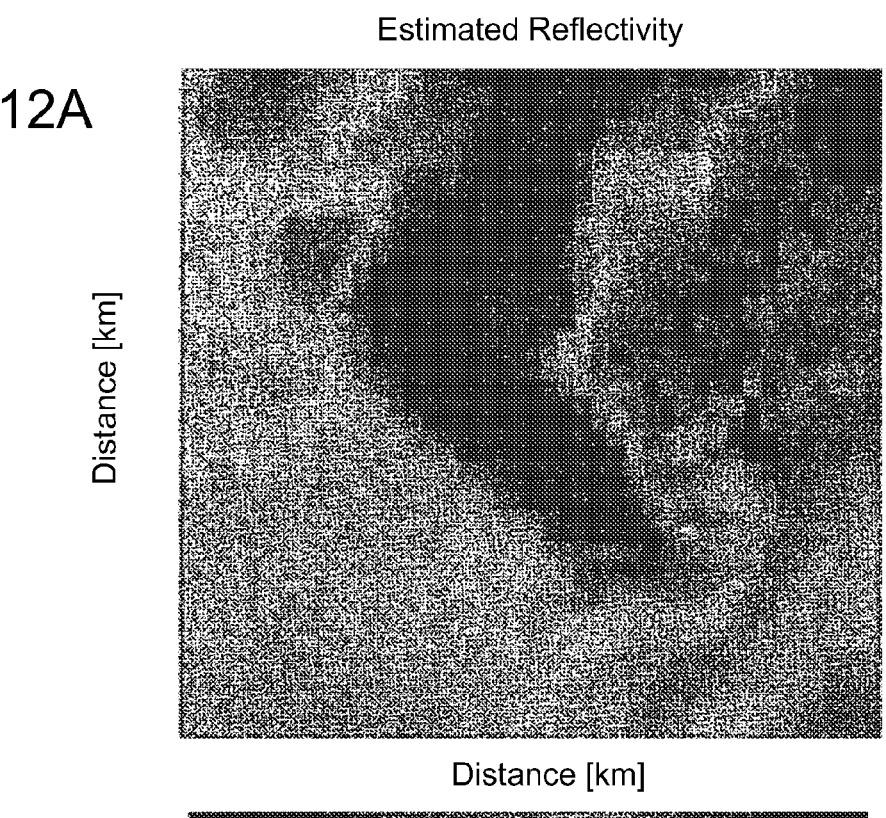
FIGS. 12A-12B illustrate reflectivity output for May 14, 2009 21:07 UTC CASA IP1 data depicting two different approaches for displaying reflectivity fields of 0-500 AGL, with data resolution at 192×192 m.
Figure 12B:
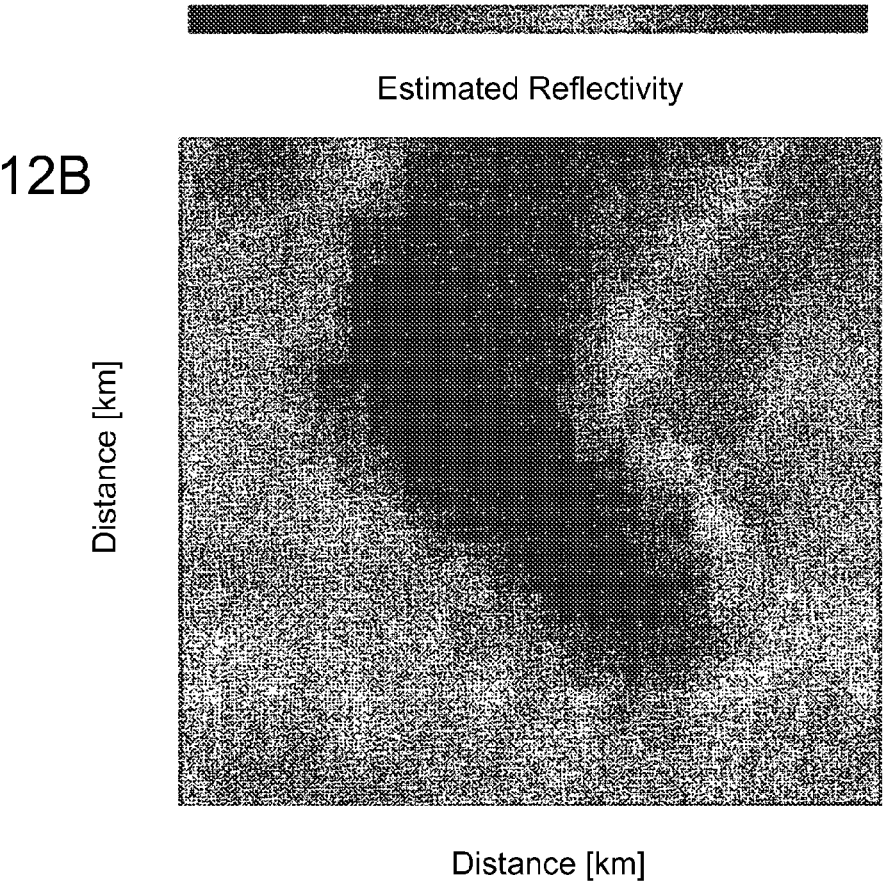

The infrastructure of VERNe allows its software machinery to be applied to processing data other than velocity. One such application is for the determination of reflectivity, as shown in FIGS. 12A-12B. FIG. 12A illustrates the use of VERNe's weighing parameters, as employed in Eq. (12). In comparison, FIG. 12B illustrates the case derived by choosing the maximum value amongst participating observations, a computational friendly technique often employed to compensate for effects related to signal extinction. Because of the way that memory management is implemented in VERNe, both approaches can take place within the one minute CASA heartbeat. It can be seen in the results that the weighted average method is more sensitive to fine detail, up to the point where the presence of the hook is better defined. It is generally expected that this would be the case because the weighted average approach takes into account the projection of nodal observations into the Geo-centric Spherical Coordinate System and therefore represents a better accounting of contributions related to the different observations.

Another application of the VERNe architecture is its use in velocity unfolding, which is described further below. In some embodiments, velocity unfolding may not be evaluated in real-time due to the computationally intensive nature of this operation. FIGS. 13A-13I which illustrate a collection of four radial observations from May 14, 2009 02:38 AM UTC and processed at 48 m resolution through VERNe. Here, the central 5 km$^2$ is shown, which is located 21, 11, 20 and 33 km from the KSAO, KCYR, KRSP and KLWE CASA IP1 nodes respectively. FIGS. 13A-13C show nodal moment data mapped into GSCS by VERNe. Because observations of this area made by the KCYR node experienced substantial extinction during data collection, its observations were eliminated from this analysis. In FIG. 13B, the KRSP node reveals the presence of velocity folding in the Doppler data. In addition, there appears to be some outliers in the radial velocity fields as well. While the origin of these outliers required further investigation, they do correlate with large spectral widths, and therefore may be a result of a flattening of the Doppler spectra. The images shown in FIGS. 13D and 13E, represent the output from VERNe's typical configuration. The results reveal inaccuracies in the estimated velocity fields induced by the spectral folding from the KRSP node. Because the angle of observation between the remaining nodes, KSAO and KLWE is 156°, and therefore are nearly co-aligned, any dual-Doppler combination would experience the same inaccuracies as the multi-Doppler estimation. Images shown in FIGS. 13F and 13G illustrate the estimated velocity field using the multi-Doppler velocity unfolding technique described below. Successful unfolding can be noted across the majority of the magnitude and angle fields. It can also be noted that the images of FIGS. 13F and 13G were strongly influenced by partial folding, an occurrence where only a fraction of the velocity spectra folds, and a near zero radial velocity measurement is recorded. This effect can be seen in the KRSP radial velocity field (FIG. 13B) around the edges of the folded velocity region. To account for the partial folding case, the $F_V$ matrix (described below) is modified such that its entries occur in half-steps of folding, rather than whole integers, as in $$F_v = \begin{bmatrix} \cdots & 1 & 1 & 1 & 0 & 0 & \frac{1}{2} & 0 & 0 & -\frac{1}{2} \\ \cdots & 0 & 0 & 1 & 0 & \frac{1}{2} & 0 & 0 & -\frac{1}{2} & 0 \\ \cdots & 0 & 1 & 0 & \frac{1}{2} & 0 & 0 & -\frac{1}{2} & 0 & 0 \end{bmatrix}.$$

A limit has been placed on the evaluation of partial folding to −1.5 m/s to 1.5 m/s of constituent radial velocity as inclusion of larger span of values yields to incorrect results. Also, note that in $F_V$ we did not include multiple partial folding combinations nor triple node full folding, as some evaluation had shown that in such instances many estimates would be unfolded incorrectly.

The design and implementation of Velocity Estimation in Radar Network, VERNe, operating on weather moment data is described. It is demonstrated that VERNe can efficiently perform velocity estimation and provide the accuracy metrics, and at the same time, accommodate the secondary layer processes, including the real time display, as well as capability of off line calculations or predictive scenarios. In one embodiment, this was achieved by providing an overarching network coordinate system in terms of Earth geo-centered spherical coordinate system, GSCS. The GSCS's resemblance of a Cartesian system at the scales of the small range radar network enabled use of pre-computed spherical to GSCS maps, provided computationally efficient mean estimation from radar network perspective, and at the same time, addressed scaling and various configuration needs. Use of VERNe's data velocity unfolding from network perspective was demonstrated. Comparison of VERNe's performance to ground in-situ measurements indicated a good correlation of estimated data. VERNe's analysis of storm environment as observed by CASA IP1 system indicates VERNe real time capabilities in the operational radar network.

Recent efforts have been undertaken to develop low-cost, high spatial density and dynamically adaptive networks of weather Doppler X-band radars for sensing the lower atmosphere. For example, the CASA radar network system, discussed above, is formed on a Distributed Collaborative Adaptive Sensing (DCAS) paradigm based on large numbers of small radars operating collaboratively within a dynamic information technology infrastructure and adapting to changing atmospheric conditions. The allocation and configuration of radar system resources within the DCAS network is based on a balance between the priority and type of user requests and the desired quality of the measurement for the given user task.

For one such measurement type, the vector velocity and vector velocity variance of observed events are both indicators of turbulence and hazardous weather conditions. Understanding the trade-off between the allocation of limited network resources, such as dwell time, the number of observing nodes utilized and measurement accuracy, is important for optimizing the deployed network geometry and actively generating observing strategies based on changing weather conditions and user priorities. In addition, timely provision of vector velocity estimates along with their confidence bounds can aid detection, visualization, and other subsequent processing and quality control.

Over the last several decades, numerous methods to transform the radial velocity weather data into vector velocities were developed. One class of such techniques, generally used in meteorological and numerical weather prediction communities, is based on variational analysis, the mass conservation law, and a set of boundary conditions. One important aspect of these techniques is that they generally rely on particular physical models that cannot readily provide velocity related quality metrics relevant to the operational parameters of the radar network. Moreover, it is known that the use of variational techniques presents a heavy burden on computational resources, impeding their incorporation into an operational system.

If overlapping regions within a network are considered only, the derivation of vector velocities can be achieved through the use of well known dual- or multi-Doppler techniques which can efficiently address the computational requirement of a real-time operational network. The foundation for a multi-Doppler radar network design and analysis provides insight related to the determination of the quality of estimated fields. Direct Doppler analysis for larger volumes is inferior in accuracy to the equation of continuity due to the temporal and spatial scales of participating observers. However, it is recognized that the results of Doppler retrievals are greatly improved when temporal scans were reduced to one minute (the correlation time amongst participating nodes), which is an expected value for typical CASA retrievals, and a lower temporal bound for many "high-impact" weather phenomena. Temporal scans can be further improved though the use of a phased array radar system, potentially leaving only the spatial scales as a major parameter in velocity estimation. Besides the temporal and spatial scales of observations, there are other numerous and significant factors that affect the quality of velocity estimates.

Motivated by evidence of temporally and spatially improved measurements in an operational radar networked environment, the multi-Doppler approach can be improved through the use of the maximum likelihood method to provide improved velocity estimates. This is achieved by viewing the radar network as a single measurement instrument, considering all relevant and quantifiable design, measurement, and processing parameters, both of the participating sensors and those of the network geometry. Assuming sufficient temporal correlation amongst participating observers, the velocity estimation problem becomes primarily a signal processing problem of the projection of statistical properties through the observing geometry. The end-result represents a tradeoff between resolution and estimate accuracy, which can be adjusted to meet user needs.

The formulation for vector velocity estimation can be done in two and three dimensions. It is shown how this formulation lends itself to maximum likelihood estimation and the determination of estimate variances. This formulation is then extended from a point volume (a single vector velocity estimate) into an entire collection of point volumes, thereby creating a map of network determined vector velocities. Various sources of error are then considered in the context of the overall estimation process.

In a preferred embodiment, a plurality of metrics, such as three error metrics can be provided for determining the accuracy (predicted and actual) of various estimation approaches. The estimation techniques are then applied to a set of canonical examples. Finally, it is shown how the developed methods can be used for velocity unfolding from a network perspective and as a tool for determining optimal geometries for the network layout.

For systems with limitations in communications and processing, the provision of measurement data in its raw form (i.e. a time series which provides a starting point in any estimation technique), is not possible in an operational real-time environment. Instead, radar sensors generally output statistical moments of the measured data. In the case of weather radar networks, these are based on physical models of data, such as reflectivity (a byproduct of measured power), velocity and, when possible, other measurement products, such as the spectral width, etc. Hence, in some embodiments the present invention operates with the assumption that the moment data are of sufficient quality, meaning that the data, with respect to the measurement parameters, are sufficiently accurate and unbiased unless noted otherwise.

To provide the spatial framework against which relevant measurements are processed and estimates provided, a common coordinate system is necessary. The Cartesian system is an obvious choice because of its simplicity, ease of implementation in a computational environment and, most importantly, because of the fact that in its gridded form across space, provides a constant point volume (bin or voxel) around which the proposed method is formulated.

In an effort to provide a more efficient formulation, a concise notation is used to depict the variable(s) and the space on which it operates. For convenience, Table 2 provides a guideline to the notation used in the following discussion.

| GUIDELINE TO NOTATION | |
|---|---|
| Designator | Description |
| $v_r$ | measured radial velocity |
| $\hat{v}_r$ | estimated model of measured radial velocity |
| $\hat{\bar{v}}_r$ | vector of constituent estimated point radial velocities corresponding to the model of measured radial velocity |
| $\bar{v}_R$ | vector of constituent measured radial velocities at a given point volume |
| $\hat{\bar{v}}_R$ | vector of constituent estimated models of measured radial velocities at a given point volume |
| $\bar{v}_{R_v}$ | vector of measured radial velocities across the overall volume |
| $\hat{\bar{v}}_{R_v}$ | vector of constituent estimated models of radial velocities across the overall volume |
| $\bar{v}_r$ | the true target vector velocity at a given point volume |
| $\hat{\bar{v}}_r$ | estimated target vector velocity at a given point volume |

-continued

GUIDELINE TO NOTATION

| Designator | Description |
|---|---|
| $\hat{\bar{v}}_{i_v}$ | vector of estimated the point volume target vector velocities across the overall volume |
| A | matrix representing velocity projection within the point volume |
| $A_V$ | matrix representing velocity projection across the overall volume |
| $V_v$ | overall volume consisting of P point volumes |
| $V_p$ | one point volume in space |
| $V_r$ | a resolution element observed by one radar node |
| N | total number of nodes |
| P | total number of voxels |
| K | total number of measurements |

Figure 14:
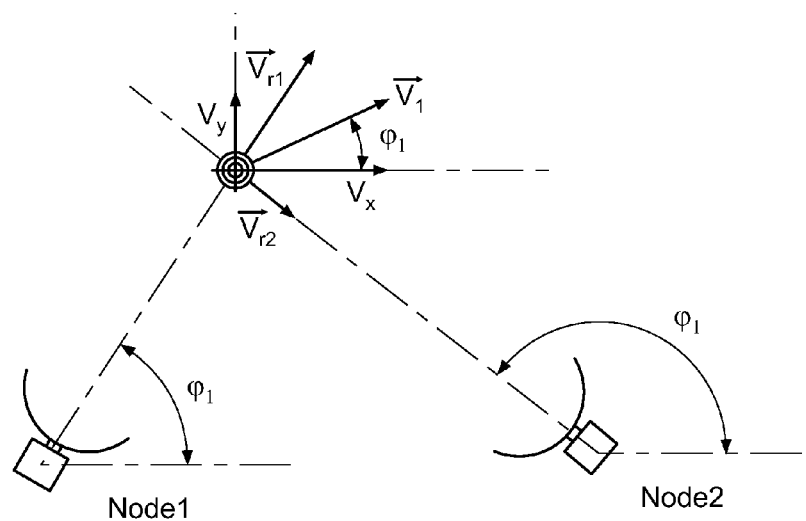
FIG. 14 illustrates a velocity vector in two dimensions observed from two points.

To clearly demonstrate dual-Doppler velocity retrieval, FIG. 14 is presented, where two observation points are employed to detect a point target moving at velocity $\bar{v}_T = v_x \hat{x} + v_y \hat{y}$, where the velocity in the $\hat{z}$ dimension is discarded for the purpose of illustration. By use of basic trigonometric transformations, the following equation for the observed radial velocity for two nodes in a network can be written as $$\begin{bmatrix} v_{r1} \\ v_{r2} \end{bmatrix} = \begin{bmatrix} \cos(\phi_1)\sin(\phi_1) \\ \cos(\phi_2)\sin(\phi_2) \end{bmatrix} \cdot \begin{bmatrix} v_x \\ v_y \end{bmatrix} \quad (16)$$

or, more concisely $$\bar{v}_R = A \cdot \bar{v}_T \quad (17)$$

yielding a measured radial to target vector velocity relationship $$\bar{v}_R = A^{-1} \cdot \bar{v}_R. \quad (18)$$

Note in Eq. 16, that if $\phi_1 = \pm \phi_2$, which is the case when the target lies in the line of sight between the observation points, the matrix A becomes singular and $A^{-1}$ cannot be determined. This degenerate case reflects the physical situation where the target and radars are in line with one another, resulting in a one-dimensional geometry instead of the two required for vector velocity retrieval. When three or more observation points are utilized, the vector in Eq. 17 is extended to N nodes, as in $$\begin{bmatrix} v_{r1} \\ v_{r2} \\ \vdots \\ v_{rN} \end{bmatrix} = \begin{bmatrix} \cos(\phi_2) & \sin(\phi_1) \\ \cos(\phi_2) & \sin(\phi_2) \\ \vdots & \vdots \\ \cos(\phi_N) & \sin(\phi_N) \end{bmatrix} \cdot \begin{bmatrix} v_x \\ v_y \end{bmatrix} \quad (19)$$

and the problem becomes over-determined and trigonometric transformation does not lend itself to the simple inversion of Eq. 18.

Figure 15:
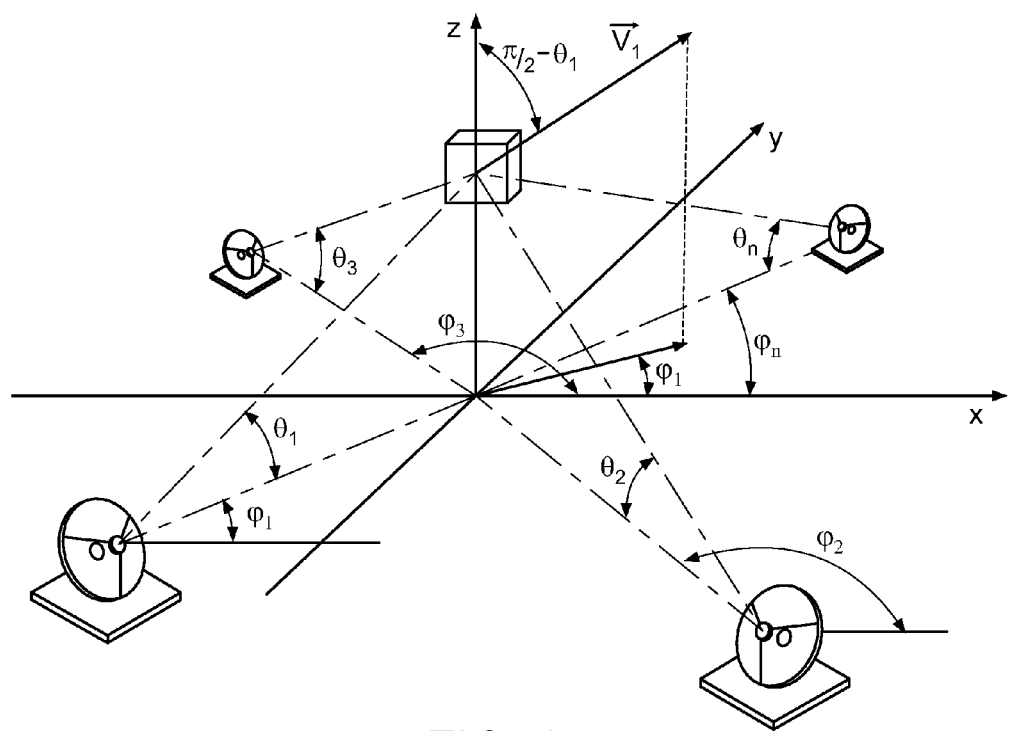
FIG. 15 illustrates a vector velocity measurement by a radar network system.

FIG. 15 extends the 2D case from the previous example to illustrate the geometry for multiple radar nodes observing a point target moving at the velocity $\bar{v}_T$ in a three-dimensional environment. Similar to the 2D case, this can be extended to accommodate any number of observing points. Additionally, one can include an arbitrary error, $\epsilon_n$, per measurement, per node, as in $$\begin{bmatrix} v_{r1} \\ v_{r2} \\ \vdots \\ v_{rN} \end{bmatrix} \begin{bmatrix} \cos(\phi_1)\cos(\theta_1) & \sin(\phi_1)\cos(\theta_1) & \sin(\theta_1) \\ \cos(\phi_2)\cos(\theta_2) & \sin(\phi_2)\cos(\theta_2) & \sin(\theta_2) \\ \vdots & \vdots & \vdots \\ \cos(\phi_N)\cos(\theta_N) & \sin(\phi_N)\cos(\theta_N) & \sin(\theta_N) \end{bmatrix} \quad (20)$$

which can be written in matrix form as $$\bar{v}_R = A \cdot \bar{v}_T + \bar{\epsilon}_R. \quad (21)$$

Eq. 21 is of all expression used in maximum likelihood estimation theory. If a Gaussian distribution for the errors is assumed, then for the error probability, it can written as $$p(\bar{\epsilon}) = \frac{1}{(2\pi)^{N/2}\|Cov_{vR}\|^{1/2}} e^{[-\frac{1}{2}\bar{\epsilon}^T Cov_{vR}^{-1}\bar{\epsilon}]} \quad (22)$$

where $\bar{\epsilon}$ is the measurement error vector and $Cov_{v_R}$ is the N×N positive definite measurement covariance matrix where $$\text{diag}(Cov_{v_R}) = \bar{\sigma}_{v_R}^2.$$

For independent errors, $\bar{\sigma}_{v_R}^2$ can be indirectly derived from the radial measurements and sensor node parameters, as is shown below.

Note that a simplification can be made in maximum likelihood theory, referred to as ML hereon, if the errors in each of the measurements are assumed to be independently, identically distributed (iid) with zero mean, which leads to the well known least squares (LS) formulation. Reverting to the general ML formulation, by use of the Gauss-Markov theorem, the linear minimum variance unbiased estimate of the target velocity $\bar{v}_T$ can be written as $$\hat{\bar{v}}_r = (A^T Cov_{v_R}^{-1} A)^{-1} A^T Cov_{v_R}^{-1} \bar{v}_R = M \bar{v}_R \quad (23)$$

Where it can be shown that the error covariance matrix can be calculated as $$Cov_{err} = (A^T Cov_{v_R}^{-1} A)^{-1}$$

which in the Cartesian coordinate system is written as $$Cov_{err} = \begin{bmatrix} E[v_x^2] & E[v_x v_y] & E[v_x v_z] \\ E[v_y v_x] & E[v_y^2] & E[v_y v_z] \\ E[v_z v_x] & E[v_z v_y] & E[v_z^2] \end{bmatrix} \quad (24)$$

The diagonal of $Cov_{err}$ represents the variance of the estimated target velocity in each of the Cartesian directions, while the off-diagonal components show the interrelationships between velocity errors in Cartesian coordinates after transformation from node-centered radial coordinates. Importantly, the entries in this estimated vector velocity covariance matrix can be used as an error bound in vector velocity data analysis.

The maximum likelihood formulation shown in Eq. 23 is only optimal when the observing volumes, $V_r$, defined by the antenna beam of the participating nodes, are matched in space. In this case, the resulting estimate corresponds to a point volume, $V_p$, of the same size and position as $V_r$. Because radars operate in their native spherical coordinate system, this is infrequently the case. Note that, in the rest of this document, when the formulation in Eq. 23 is used to provide an estimate, regardless of whether beam matching exists or not, such an estimator will be referred to as a point volume maximum likelihood, or PVML, (volume estimator) because it estimates the velocity for one volume location in space.

To address the beam size issue, the considered overall network volume can be viewed as either over-sampled (i.e. $V_p > V_r$) or under-sampled space (i.e. $V_p < V_r$). In the over-sampled scenario, consider the case when the measurement space of participating nodes is a subset of the estimation space. For example, when the size of the point volume $V_p$ used in the maximum likelihood approach is sufficiently large that it encompasses complete and multiple observations from multiple points. In this case, artificial beam matching can be achieved through the use of a spatial averaging across $\nabla_r$ of the participating radial observations within the point volume $V_p$. Here, if $V_p$ can be chosen so its minimum dimension size approximates the largest beam width (i.e. radius×sin(Beamwidth$_{Antenna}$) amongst participating observers, the resulting errors in the estimate can be proportional to the difference between the point volume, $V_p$, and the volume associated with the observing nodes, $\nabla_r$.

The drawback of the over-sampled scenario is that its resulting volume can be substantially larger than the spatial scales that are desired to be analyzed. One of the reasons for radar networks to be deployed is to increase both the accuracy and the resolution of the measurements. Thus, the over-sampled scenario favors the accuracy of the estimate over the resolution.

For the under-sampled space, we consider the scenario when the synthesized network grid is smaller in size than the largest dimension of the participating observations. For example, the gate width of shortest pulse of participating Doppler radars can be used as a reference size for the horizontal synthesized grid. Considering the solution for the two-dimensional undersampled case, a system of equations similar to Eq. 23, for the overall volume $V_v$ containing P point volume bins $V_p$ spanned with K measurements, can be written as the vector of observed radial velocities, $$\bar{v}_{R_V} = \|A_v \bar{v}_{T_V}\|_{v_r} + \bar{\epsilon}_R, \quad (25)$$

where $A_v$ is a matrix of transformations which for the 2D scenario is an K×2P matrix as in and $\bar{v}_{R_V}$ is a vector of K independent radial measurements made by N participating nodes, such that $\bar{v}_{R_V} = [v_{r_1}, v_{r_2}, \ldots v_{r_K}]^T$. In the above, the term $\|\cdot\|_{v_r}$ represents the row-wise norm operator, which accounts for the relationship between the point volume and the observed radial velocities. Further, $\bar{v}_{T_V} = [\bar{v}_{r_1}; \bar{v}_{r_2}; \ldots ; \bar{v}_{T_P}] = [v_{x_1}, v_{y_1}, v_{x_2}, v_{y_2}, \ldots, v_{x_P}, v_{y_P}]^T$ is the vector of target velocities and $\bar{\epsilon}_{R_V}$ is a K-long vector of errors corresponding to radial measurements $\bar{v}_{R_V}$.

The iid Gaussian assumption about the error distribution regarding the measurement and the observable behavior provide the basis to the ML solution in Eq. 23. Regardless of the correctness of the hypothesis in Eq. 25, since $\|\cdot\|_{v_r}$ is not exactly known, Eq. 25 is not considered a formal ML solution. However, under certain assumptions regarding $\|\cdot\|_{v_r}$, the least squares formulation (LS) can directly provide a solution to the system of equations described in Eq. 25. In most instances Eq. 25 will represent an underdetermined rank deficient system, resulting in an infinite number of solutions that minimize $\|\bar{v}_R - \|A_v \bar{v}_{T_V}\|_{v_R}\|_2$. Therefore, to employ LS relies on the $\|\bar{v}_T\|$ norm, which is not necessarily the best solution. More importantly, because $\|\cdot\|_{v_r}$ is not exactly known, direct use of LS will not yield to the most efficient estimate.

The description of the overall volume velocity relationships can be viewed as a problem of estimating the constituent individual point volume radial velocities in $\bar{v}_r$, whose relation to the measured radial velocity $v_r$ is expressed through the $\|\cdot\|_{v_r}$ operator. This operator can be defined as the expected value, in a weighted average sense, of the projected point volume velocities onto the observer:

$$v_r = \left\| \frac{\hat{\bar{\omega}}_r}{\|\hat{\bar{\omega}}_r\|_1} \cdot \bar{v}_r \right\|_1 = \frac{\hat{\bar{\omega}}_r^T \bar{v}_r}{\|\hat{\bar{\omega}}_r\|_1}, \quad (26)$$

where $\|\cdot\|_1$ is L−1 norm operator (summation). Similarly, we define a matrix of weights, $W_v$, whose element-wise multiplication (indicated by a ·) with $A_V$ replaces the operator $\|\cdot\|_{v_r}$ of Eq. 25, as in $$\|A_v \bar{v}_{T_V}\|_{v_r} = (W_v \cdot A_v) \bar{v}_{T_V} = A_{TLS} \bar{v}_T, \quad (27)$$

so the overall system can be described as $$\bar{v}_R = (A_{TLS} + \Xi_{A_{TLS}}) \bar{v}_r + \bar{\epsilon}_R, \quad (28)$$

where $\Xi_{A_{TLS}}$ is the error surrounding the determination of $A_{TLS}$. This form is typical of one employed by the total least squares, TLS, usually used in applications where the number of equations exceeds the number of variables. As $A_{TLS}$ will, in general, be rank deficient and ill-conditioned, direct use of the TLS approach will not be possible. Given the knowledge about the distributions and relationships within and between $\Xi_{A_{TLS}}$ and $\bar{\epsilon}_R$, be it in probabilistic sense, physical model based, or indirectly derived from the measurements, constrained TLS or conditional ML could be applied to Eq. 28. Because it has previously been shown that the total least squares solution is equivalent to the minimum norm solution, the problem can be solved numerically thorough the means of residual minimization in terms of the difference between estimated models and measurements of radial velocities, as in, $\|\bar{v}_{R_V} - \hat{\bar{v}}_{R_V}\|_2$, where $\|\cdot\|_2$ is the L−2 norm operator. By extending the matrix M of PVML in Eq. 23 to describe the transformation across the overall volume, $V_v$, consider $$\hat{\bar{v}}_{R_V} = W_V^T A_V M_V W_V \bar{v}_{R_V}, \quad (29)$$

where $W_V$ is a KP×K matrix of weights with rank($W_V$)=K and columns as described in Eq. 26. The matrix $M_V$ in the 2D case is a 2P×KP matrix, and $A_V$ is KR×2P. One trivial solution to this problem is the case when $A_V M_V$ simplifies to an identity matrix, allowing any choice of $W_V$ to yield a solution. This occurs in the critically determined scenario when the ML system description is equivalent to dual-Doppler analysis, rendering the approach unnecessary. Another trivial solution is when all of the relevant entries of $W_V$ are equal, reducing Eq. 29 to Eq. 23, which is the case when all of the measurements observe a single normal distribution across the observing volumes, and the formulation becomes equivalent to a set of PVML solutions to Eq. 23 across the overall volume, $V_v$. This LS solution, arrived at from Eq. 27, which just minimizes the error norm, is one of the solution methods used for the comparisons below.

In the absence of a closed form solution, under the assumption of Gaussian velocity distribution within the point volume, the under-sampled scenario is formulated as the conditional least square of maximum likelihood, as a minimization problem. That is $$\|\bar{v}_{R_V} - \hat{\bar{v}}_{R_V}\|_2 \quad (30)$$

$$\begin{cases} \bar{v}_T = M\hat{\bar{v}}_R \\ \hat{\bar{v}}_r = \hat{\omega}_r v_r \forall\ v_r \in V \end{cases}$$

The solution of Eq. 30 can be found numerically through the use of iterative methods, where the choice of appropriate error minimization method can be either probabilistic or physical model based, or a combination of both. Because the analytic solution to Eq. 30 presents a great challenge, especially in multi- and non-parametric scenarios, iterative methods using minimum square error, MSE, and ML methodology.

Figure 16:
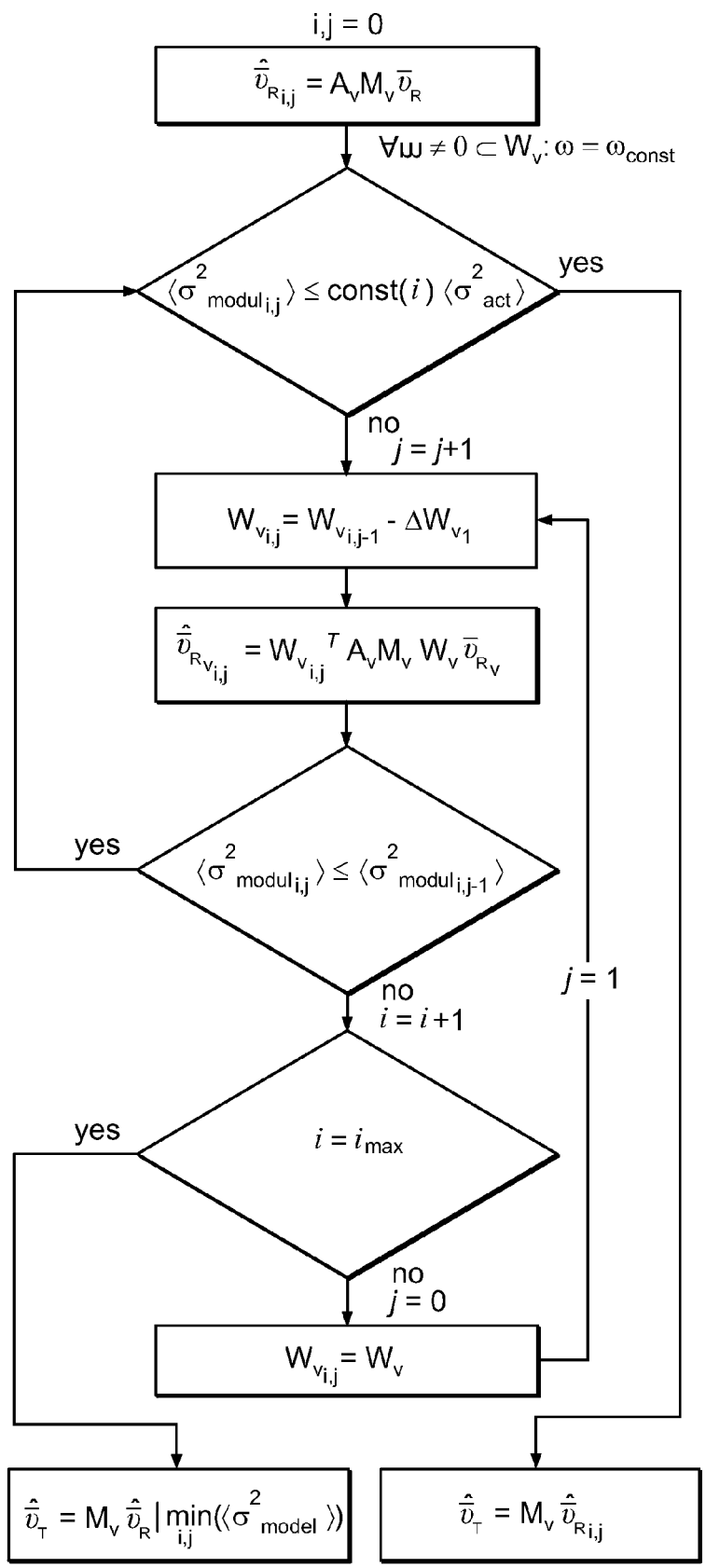
FIG. 16 is a process flow sequence for iterative methods for the undersampled observation embodiment.

Consider an error minimization method as depicted in the flow chart of FIG. 16. Here, the PVML calculation is made for each point volume, $V_p$, across the considered volume space, $V_v$. From this calculation, the estimate error $\langle \sigma_{est}^2 \rangle$, the model error, $\langle \sigma_{model}^2 \rangle$, and the backprojected radial velocity, $\bar{v}_{R_{ij}}$, are all calculated. The resulting model error is compared to a scaled estimation error to check if the direct PVML solution has sufficient accuracy. If not, a non-normal distribution is assumed and the weighting coefficients, $W_V$, are updated accordingly. This process is repeated as long as new iterations, j, provide lower model errors in comparison to the previous iteration. If this is not the case, an alternative distribution, associated with iteration i, is assumed and the whole process is repeated again. Once the error converges to a desired level, the last iteration provides the final estimate, $\bar{v}_T$. If all considered distributions are exhausted ($i=i_{max}$) and convergence did not occur, the iteration that resulted in the least error model norm is used to provide the final estimate.

To form the measurement covariance matrix $Cov_{v_R}$ of Eq. 23, the variance of each of the constituent measurements made by the sensor nodes and the errors introduced by the networked data merging process needs to be known. Given an overarching network temporal and spatial reference grid against which all of the nodal measurement statistics are processed, one of the ways errors can be classified is according to their sources, such as: i.) measurement statistics, ii.) system limitations and iii.) the spatial and temporal scales of the overall measurement process. Assuming that errors are independent, the total measurement variance can be written as a sum of all variances for their respective error sources $$\sigma_{v_R}^2 = \sigma_{Statistics}^2 + \sigma_{Statistics}^2 + \sigma_{Scales}^2. \quad (31)$$

These errors exist due to various factors, some of them better quantified then others. In fact, it is not possible to properly determine the existence and exact contribution of every error source. Even with all of the parameters, an explicit closed form expression is not possible as it depends on specifics of the system and its relationship to the observable. In order to provide the expression in a concise, closed form, only a few of these error sources are included which are possible to quantify directly from the measurement and the measurement parameters. Errors for which additional information is necessary can also be included.

A detailed description for the relationship of sample statistics, measurement parameters, and processing parameters, to the accuracy of the nodal estimation of the mean radial velocity, can be found in Zrnic, "Estimation of Spectral Moments for Weather Echoes," *IEEE Transactions on Geoscience Electronics*, vol. GE-17 (1979). This measurement accuracy mainly depends on the signal to noise ratio, SNR, and to a lesser extent, the width of observable spectral signature, SW. Being limited to the moment data only, $$\sigma_{Statistics}^2 = \sigma_{SNR}^2 + \sigma_{SW}^2 \quad (32)$$

The influence of SNR on radial weather Doppler measurements is well understood. However, to demonstrate how SNR affects the vector velocity estimate, consider a basic formulation of the phase measurement error for a pulsed Doppler radar. A low SNR, or a low level of received echo strength compared to the instrument generated thermal noise ratio, can often be a dominant error source in vector velocity retrievals. For example, in many weather Doppler radars, such as the X-band pulsed radar that CASA uses for sensing, the signal is attenuated in the presence of water content along the path to the observed volume. Hence, low SNR's are expected to often occur in a storm environment.

A Doppler radar detects the radial velocities by measuring the phase shift between two independent samples, as in $$v_r = \frac{\lambda \cdot PRF}{4\pi}(\phi_2 - \phi_2) = \frac{\lambda \cdot PRF}{4\pi}\phi. \quad (33)$$

The SNR induced error on radial velocity measurement is $$\begin{aligned} \sigma_{SNR}^2 &= \left(\frac{\partial v_R}{\partial \phi}\right)^2 (\sigma_{\phi_1}^2 + \sigma_{\phi_2}^2) \\ &= \left(\frac{\partial v_R}{\partial \phi}\right)^2 2\sigma_\phi^2 \\ &= \left(\frac{\lambda \cdot PRF}{4\pi}\right)^2 \frac{2}{N_S SNR} \end{aligned} \quad (34)$$

where $N_S$ is the number of samples, PRF is the pulse repetition frequency and $\lambda$ is the operating wavelength. The signal to noise ratio is proportional to the various radar parameters, the target signal reflectivity and the square of the distance between the target and the observation point.

In the case of an under-sampled volume, because the resulting network grid has a higher resolution than the resolution of the participating nodes, estimation of SNR from the corresponding measurements gives a disproportionate influence for observations made by the nodes with reduced resolution (i.e. larger volumes) than those nodes with higher resolution. This imbalance can be fixed by using the ratio of the point volume size, $V_p$, to the measurement volume, $V_r$, as a weighting factor in the SNR derivation. This approach is only absolutely correct if the distributions of scatterers within the measured volume is uniform.

In some situations this is not always sufficient. Under the assumption that the scatterer distribution is spatially uniform, such that all of the participating observers see the same scatterer density, the overall field consisting of P point volume voxels observed by K measurements, consider $$\bar{p}_{R_V} = A_{V_W}\bar{p}_{R_V}, \quad (35)$$

For the observed power, where $A_{V_W}$ is a P×K matrix that converts the measurements space, $\bar{p}_{R_V}$ (a K-long vector of powers), to the estimation space of P point volumes powers given by $\bar{p}_{R_V}$. The equation $$\bar{p}_{R_V} = A_{V_W}^T (A_{V_W}A_{V_W}^T)^{-1}\bar{p}_{R_V} \quad (36)$$

Can be used to find the minimum norm solution to the above system of equations. Normalized weighing of $A_{V_W}$ by $\bar{p}_{R_V}$ through an appropriate transfer function yields $W_V$, which can be used to scale measurement SNR's. Note that if Eq. 35 is scaled by the appropriate reflectivity model, Eq. 36 can be used to derive reflectivity fields within the overall volume.

To demonstrate the application of this approach, FIGS. 17A-17D present where a simulated power field observed by two nodes, 90 degrees apart, and the synthesized volume is at eight times higher resolution than the antenna beam. In addition to the synthesis of increased resolution reflectivity fields, in the over-determined scenario, this approach can be used to determine signal attenuation rates. For example, under the assumption that the scatterer density is uniform, the attenuation within a volume can be estimated from differences in the power measured by the participating observers. This result can be used as a starting point for the determination of signal attenuation derived from a network point of view.

Due to the finite number of samples there is inherently a limit to which the measurement of the mean radial velocity is correct. Given the normal distribution, an approximation can be made by using the Cramer-Rao lower bound on the accuracy of the measurement as $$\sigma_{SW}^2 = \frac{SW^2}{N_S}, \quad (37)$$

where SW is the measured radial velocity spectrum width and $N_S$ is the number of samples collected during the measurement. To address the under-sampled scenario, an approximation, using the Cramer-Rao bound again, can be made by multiplying the right hand side of above equation by the $V_r/V_p$ ratio.

To consider temporally and spatially induced errors from a networked processing point of view, one has to know the relationship between the time and spatial scales of the phenomena observed and parameters for the measurement and the estimation. While it is well known that the spatial and temporal scales are strongly correlated, to gain a brief insight, assume that errors of temporal and spatial origin are independent, so that they can be treated separately.

Because radar design is well established, from a nodal point of view, it can be safely assumed that through appropriate design, the temporal and spatial aspects of nodal observations are stable. For example, dwell time, coherency, beam precision and other relevant parameters are well chosen in the design of a nodal radar system. In a networked environment, insufficient correlation times amongst participating observers, in comparison to temporal scales of phenomena, can result in significant errors in the network based estimate. In order to account for these effects, the temporal scales of phenomena need to be known.

Assuming a spatially isotropic normal distribution of temporal changes in the velocity of phenomena, the formulation $$\sigma_{Temporal}^2 = \langle a_r (t_r - \langle t \rangle) \rangle, \quad (38)$$

can be used, where $\langle a_T \rangle$ is expected acceleration, or value of change, in magnitude of the target velocity per unit time. Further, $t_r$ is the time of the particular measurement, and $\langle t \rangle$ the average time of all participating measurements. It is not clear how the value for $\langle a_T \rangle$ can be determined without relying on some physical model which can be represented as a function of the spectral signature of the observed field. In one embodiment, given a sufficient number of observations for a given volume, $\langle a_T \rangle$ can be derived from a comparison between the observed velocities and previous measurements, so that the rate of change can be directly determined from data.

As the radar nodes operate in their native spherical coordinate systems, mapping of their measurements to an overarching synthesized spatial grid can introduce significant errors which depend on the relationship between the observing beam, synthesized grid and the spatial scale of the observable. These errors can be minimized through carefully devised data selection, merging and processing, as discussed above.

Quantization noise, phase noise, system coherency, side lobe level, channel cross talk, beam pointing accuracy and stability, and numerous others can introduce additional sources of error in any measurement system, some of which are very difficult to track. However, appropriate system design can address these error sources and can reduce the role played in the measurements.

Signal processing at the node level is well established. Errors introduced by these nodal processes are insignificant as they are generally exceeded by those already discussed above. However, since the weather moments generation methods operate on an assumption of a normal distribution for the observable, they can introduce an error to the extent of bias introduction if the distribution is otherwise. It is expected that in such instances, the nodal estimate of the second moment (i.e. a spectral width) can fail to converge. This failure in turn can be used to flag the presence of non-Gaussian targets and hence enable alternative processing schemes. The following section presents one such scenario where a PVML-MSE minimization procedure was employed to estimate a vector velocity field.

For a low number of samples, which in a radar network environment is frequently the case, the ML solution is very susceptible to the introduction of measurement bias. Bias can be introduced through the presence of contaminants in the observed signal, which are in weather Doppler radar systems usually referred as stationary and non-stationary clutter.

Clutter, while occurring infrequently, can introduce significant errors in observations. In certain embodiments, known pre-processing techniques that minimize the clutter are employed. For example, it is shown that in the case of stationary clutter, algorithms can effectively remove undesired observations to a relatively high degree of success. The presence of these algorithms can potentially introduce other sources of error. It is evident that the availability of an over-determined observation system can assist in the mitigation of such errors.

Another example of measurement bias is the presence of velocity folding, which occurs when the speed of the target exceeds the maximum unambiguous velocity of nodes within the system. An unfolding technique can be utilized to provide an improved estimate vector velocity field to the simulated scenario of folded velocity measurements, as described in further detail below.

Accuracy of the estimates provided by the PVML based method, assuming unbiased measurements, depend on the accuracy of measurement error bounds as well. Because the presented approach utilizes weights that are proportioned measurement errors, an introduction of uniform bias on the weights amongst the participating observations does not necessarily effect the estimate as much as the confidence bounds would be misrepresented. For example, if an inaccurate estimation of SNR is equally employed on all participating measurements, their relative strength in the estimate would be dampened though the inverse projections, whereas, the error in the estimated confidence bound of Eq. 24 can be directly proportional to the error in initial determination of measurement error bounds.

As an example of the PVML approach and the methods described herein, a data set was generated to indicate the performance in the estimation of 2D velocity fields under a different observing conditions. Taking the observing parameters into consideration, this method was then projected onto participating nodes to provide simulated measurements, which in turn, were used to derive estimates along with their respective error bounds $\langle \sigma_{est}^2 \rangle$. The diagonal of Eq. 24 can be used to provide an upper bound to the estimation error. This equation can be used to gauge the overall performance of the 2D estimation field, and can be written as $$\langle \sigma_{est}^2 \rangle = \langle \sigma_{v_x}^2 \rangle + \langle \sigma_{v_y}^2 \rangle. \quad (39)$$

Further, estimated velocity fields can be compared to the original field so that the accuracy of the estimation process can be determined. For example, the error variance in terms of the sum of squared differences between the generated and estimated fields in each of dimensions, can be determined by $$\langle \sigma_{True}^2 \rangle = \langle (v_x - \hat{v}_x)^2 + (v_y - \hat{v}_y)^2 \rangle. \quad (40)$$

This quantity can be used to gauge the performance of the estimation technique. In an over-determined scenario, when there are more measurements than variables, evaluating performance in terms of comparison to the original, the performance can also be gauged by the projection of the estimated fields back onto the observers $$\langle \sigma_{model}^2 \rangle = \langle (v_r - \hat{v}_r)^2 \rangle = \langle (v_r - \text{projection}(\hat{\vec{v}}_T|r))^2 \rangle, \quad (41)$$

so that the estimated model can be quantifiably compared to measurements. Note that the dual-Doppler case represents a critically determined system; hence, the measurement error, $\langle \sigma_{model}^2 \rangle$, exists due to the difference between the estimated fields and the measurement by a third node, a node not used in the dual-Doppler calculation.

To appreciate the performance of the considered estimation techniques, in addition to the quantitative measures, consider a side-by-side comparison in terms of 2D vector velocity graphs. Amongst a myriad of ways to configure a measurement scenario and simulate statistics of the observable, the following examples were analyzed to provide a basis for estimation inter-comparison both in qualitative and quantitative terms.

In the following, observations were generated using a exemplary velocity field in conjunction with an appropriately scaled random function, so that the relevant statistics to the generated fields, measurements, and measurement errors can be provided. In these examples, errors include $\sigma_{SW}^2$ and $\sigma_{SNR}^2$. Overall fields were synthesized in terms of equally sized point volume bins so that they can be easily assigned to each of the measurements. Hence, the consideration of errors due to beam mismatch was unnecessary. The height of the beams were kept at a constant for all of the observers as well. In all of the examples a uniform distribution of isotropic signal sources (i.e. uniform isotropic reflectivity field or radar cross section) across all of the volume is assumed. A total of three observing nodes were employed, so that the over-determined scenario for the estimation of point volume 2D velocity fields can be considered. Note that the estimated values, as represented by an arrow in the vector velocity graphs of the following four figures, were calculated and presented at the centers of intersection for the participating beams.

The following results represent a consideration of the undersampled scenario—the spatial correlation of the estimated fields is not taken into account, so that dual-Doppler and PVML approaches perform only sub-optimally. In instances where results of the network volume error minimization method, based on Eq. 30, have shown an evident improvement over the PVML approach, these are presented as well. As an approach operating across the whole observing volume, results based on the LS calculation, Eq. 25, were provided in all of the considered scenarios. Results of the LS solution were obtained using the method of singular value decomposition (SVD).

To provide scalability in these examples, units of spatial dimensions are omitted, as the overall volume size and its synthesized grid were derived in terms relative to the beam width, or gate width, of observing nodes. For example, the gate length, the length of the measurement volume in direction of observation, was defined to be of one point volume unit for all of the participating nodes. In all of the presented scenarios the beam width of the 3rd node at 0° (direction of observation is parallel to the x-axis) and the 2nd node at 90° (direction of observation is parallel to the y-axis) encompass one complete side of the overall observing volume, which in the following four figures is represented by eight individual column-wise or row-wise vectors. The $1^{st}$ node had a narrower beam width, encompassing a single point volume within its beam. Hence, for an overall volume meshed at 8×8 resolution the total number of K independent measurements, was K=8+8+64=80, resulting in an underdetermined set of linear equations describing the overall 2D velocity field.

FIGS. 18A-18F depict a divergent velocity field, which can be considered as representative of weather phenomena. The example of a velocity field, shown in FIG. 18A, has an average unit volume standard deviation of 1.0 ms$^{-1}$ in each of the dimensions, resulting in mean velocity magnitude of 6.7±1.4 m/s and mean angle of 112±28° across the volume. In this scenario, measurement SNR's of 5, 3 and 8 dB and observation angles of 60°, 0° and 90° for nodes 1, 2 and 3, respectively, were considered. Note, that the measurement errors, formulated in Eq. 32, averaged across the whole field for each of the nodes are shown below FIG. 18A. The SVD based LS solver approach, FIG. 18E, obtained a solution with a very small model error $\sigma_{model}^2$. This is expected as the majority of energy in the simulated field comes from a set of linear functions (i.e., no discontinuities or abrupt changes in dynamics of the velocity fields).

Two of the three dual-Doppler cases (FIGS. 18B and 18D) captured the essential direction of the overall field; however, both solutions failed to properly estimate the presence of planar divergence, as evident in the quantitative sense in all of the error metrics. Despite their placement at 90° apart, which is considered optimal due to the orthogonality of observations, the dual-Doppler combination in FIG. 18D performed comparatively poorly, primarily due to the broad antenna beamwidths. However, the dual-Doppler combination in FIG. 18B with nodes separated by 60° and SNR's (8 and 5 dB), performed worse than the combination in FIG. 18C, with SNR's of 3 and 5 dB and a 30° angle of separation. The reason for this behavior, where an opposite performance would normally be expected, is due to the distribution of velocities within the observing beams. In its measurements, the second node observed a much larger velocity distribution than the third node; hence, the planar divergence went undetected. This result is important as it illustrates how larger SNRs and orthogonal angles of observation do not necessarily guarantee more accurate results, as is commonly believed.

Figures 18A, 18B, 18C:
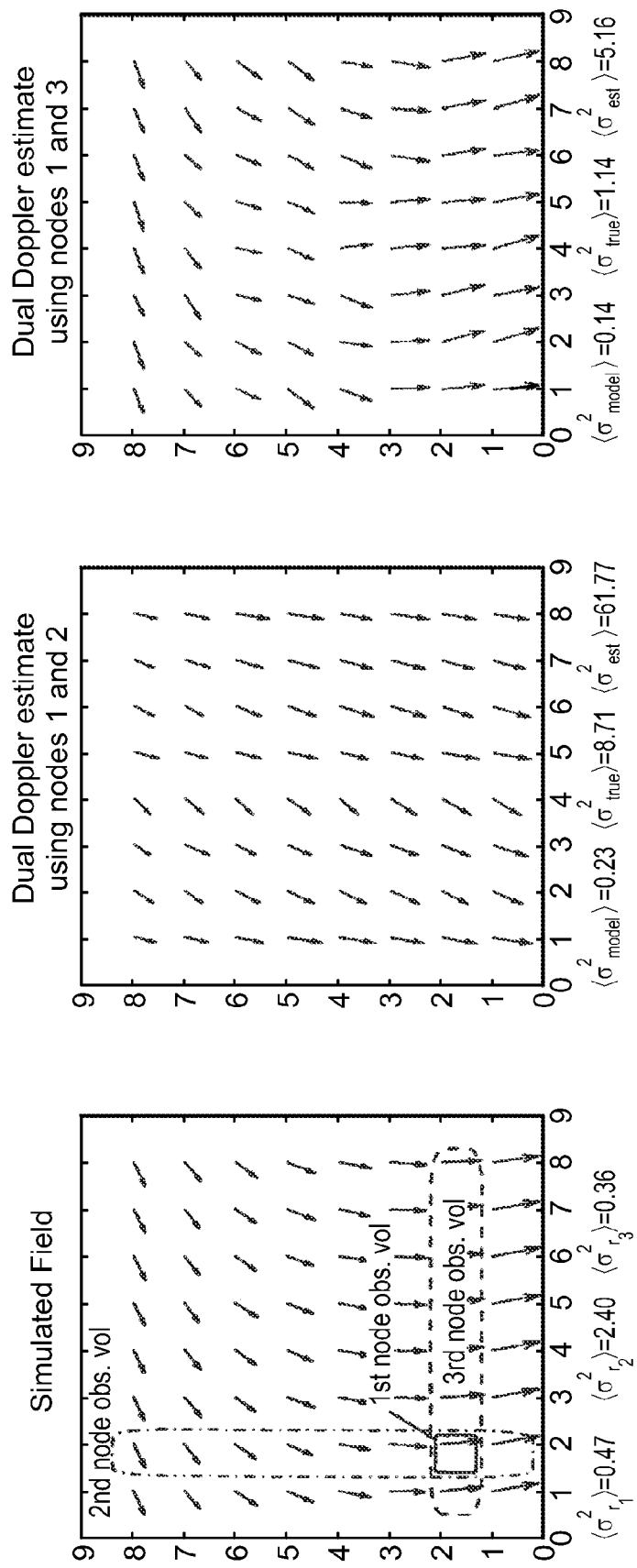
FIGS. 18A-18F illustrate errors and variances based on an exemplary velocity field.
Figures 18D, 18E, 18F:
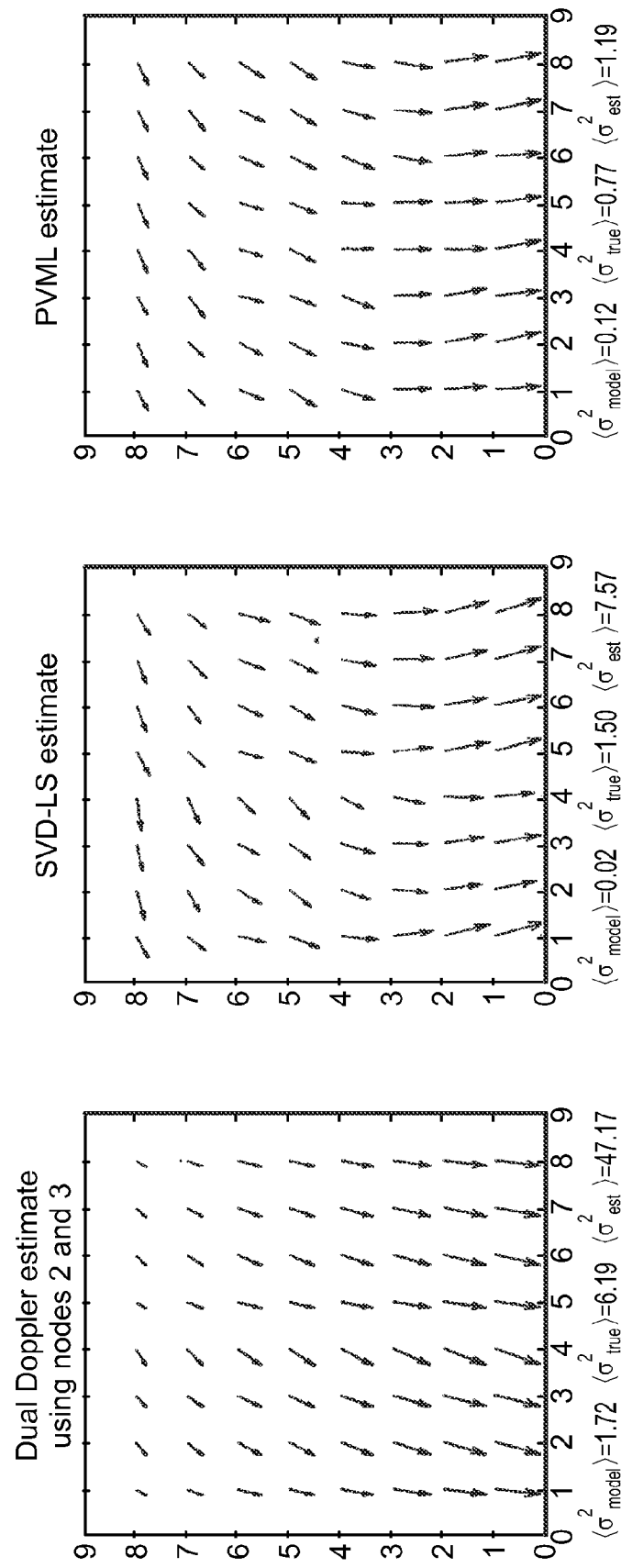

The PVML approach, as shown in FIG. 18F, performed slightly better than the dual-Doppler combination in FIG. 18C, demonstrating that the inclusion of all available nodes in the estimation process leads to more efficient results that are less dependent on target behavior from a probabilistic point of view. The superior performance of the SVD based LS solver method, SVD-LS, in terms of the model error, $\langle \sigma_{model}^2 \rangle$, was expected as, by definition, it provides a solution of minimum norm. However, it performed worse than PVML in comparison of its estimate to the original velocity field, as provided by $\sigma_{true}^2$, confirming that the minimum error norm solution is not necessarily the best solution.

Figures 19A, 19B, 19C:
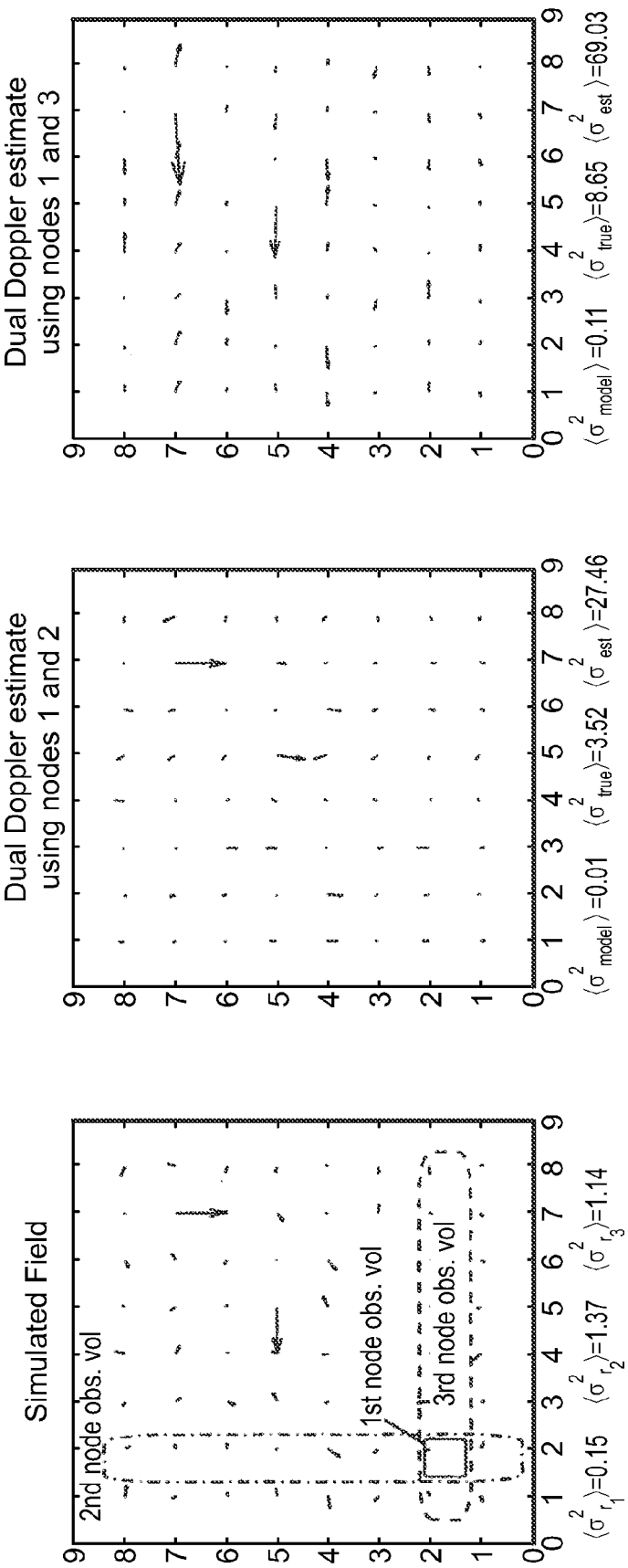
FIGS. 19A-19F illustrate errors and variances based on an exemplary velocity field.
Figures 19D, 19E, 19F:
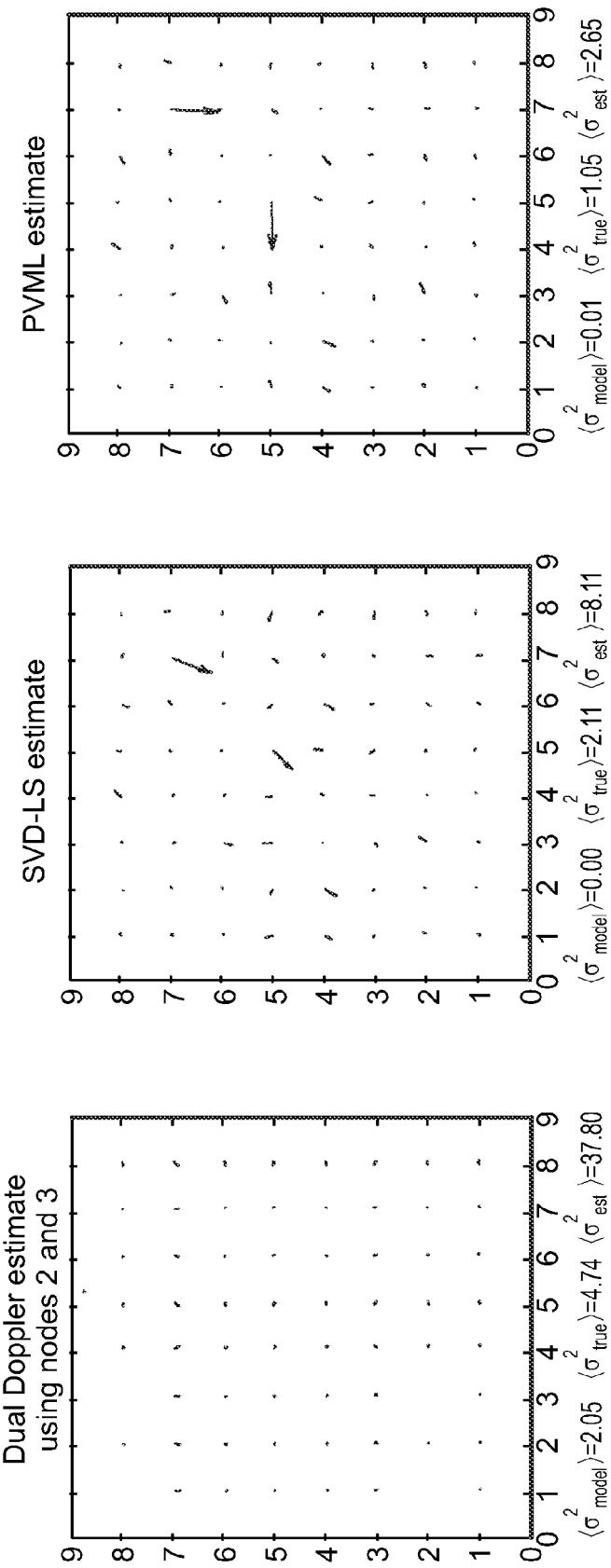

A useful aspect of a velocity estimation can be the detection and estimation of moving point targets in the presence of clutter though the means of Doppler measurements. FIGS. 19A-19F include a background velocity field, as shown in FIG. 19A, of a zero mean Gaussian with standard deviation of ±1.0 m/s is simulated with two targets added to the field of 10 m/s velocities in the x and y directions as shown. Similar to the other presented scenarios, a uniform isotropic reflectivity was assumed across the volume, where embedded targets had the same reflectivity value per gridded unit area. A 15 dB SNR was used for all three participating nodes, which were spaced 45° apart. As a consequence of this scenario, the simulated measurement of radial velocity of the nodes with large beam widths is driven towards zero, a normal result of moment estimation because the number of samples of zero mean velocity outweigh ones with embedded moving targets. Hence, in the case of dual-Doppler combination for wide beams, as shown in FIG. 19E, the presence of moving point volume targets went undetected. In the case of other dual-Doppler combinations, as shown in FIGS. 19B and 19C, employment of the higher resolution node, node 3, helped the detection of presence of both targets; however, their movement direction was closely estimated in only one instance. SVD-LS, shown in FIG. 19E, detected the presence of the two moving targets. As in the previous example, because the LS approach provides a solution of minimum energy across overall volume, the SVD-LS did not closely estimate the direction of target movement. By contrast, the PVML method provided a solution of slightly worse model error, $\sigma_{mod\ el}^2$, but in terms of $\sigma_{true}^2$, as evident by visual inspection, provided a closer result to that of the simulated field.

Figure 20C:
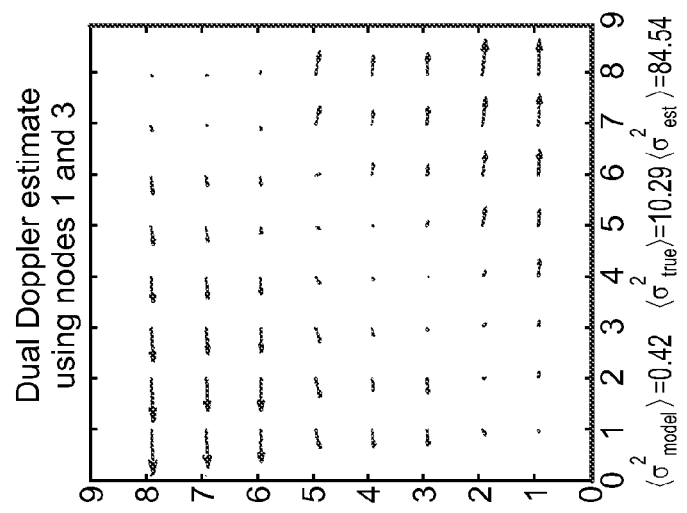
FIGS. 20A-20F illustrate errors and variances based on an exemplary velocity field.
Figure 20B:
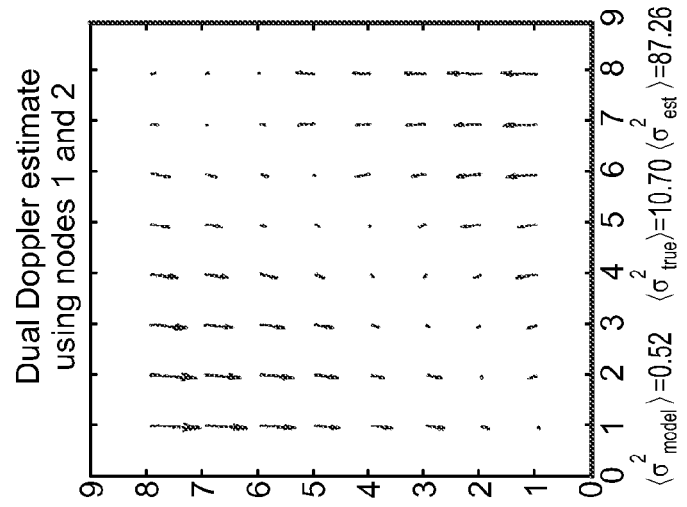
Figure 20A:
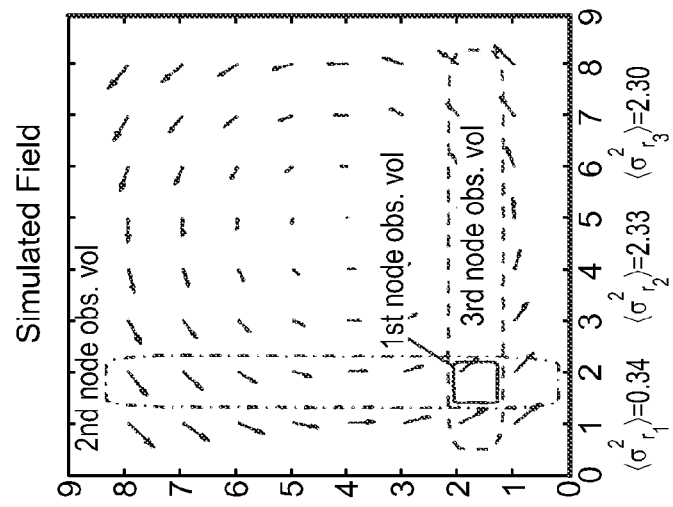
Figure 20F:
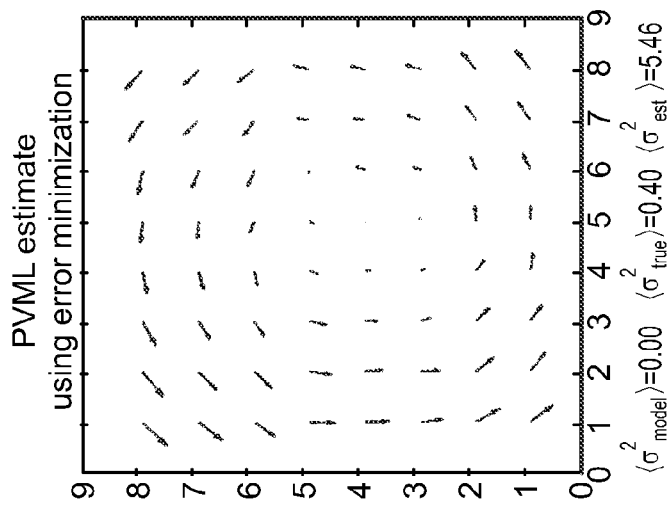
Figure 20E:
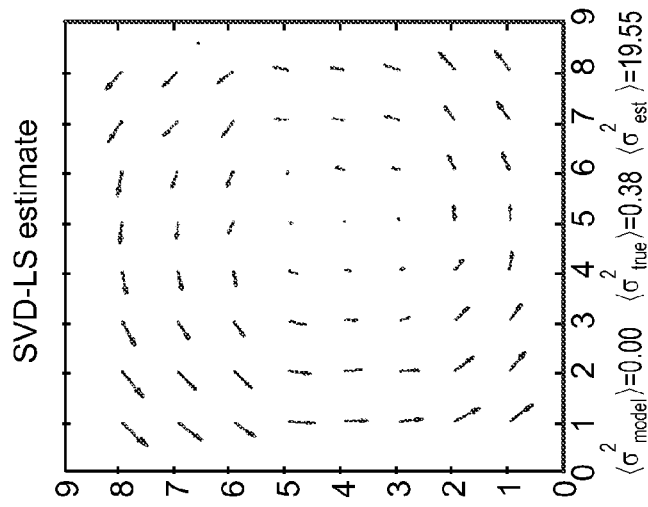
Figure 20D:
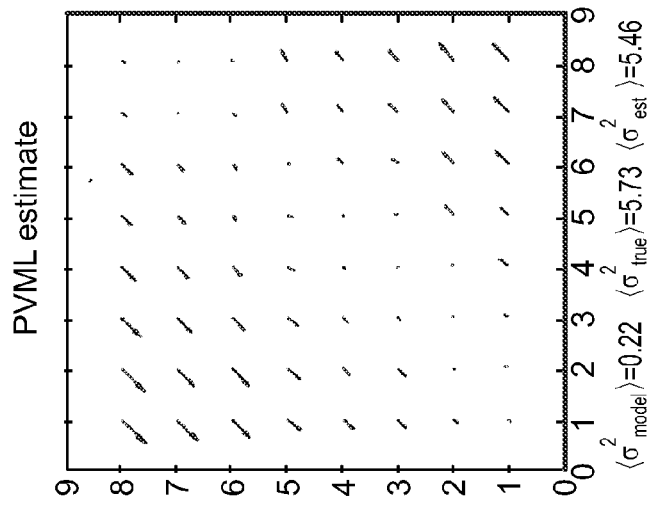

One important characteristic of hazardous weather, such as tornados, is that their spectral signature is not necessarily of Gaussian. To analyze the performance of the considered methods we present the scenario shown in FIG. 20A, where a vortex is simulated. As in previous scenarios, uniformly distributed isotropic targets were used. In this simulation we assumed an equal measurement SNR of 8 dB for all three nodes. Note that nodes 2 and 3, due to the large sizes of their beam observed on average zero mean velocity across all of their measurements. The dual-Doppler analysis of their combination is not presented in FIG. 20, as it results in zero mean vector velocity fields. Dual-Doppler combinations, for nodes 1&2 and 1&3, presented in FIGS. 20B and 20C, respectively, resulted in measurement and estimation errors of very similar magnitude; however, their estimated fields were orthogonal in direction to each other. This is expected, as only the first node had sufficiently small beam width to observe non-zero mean radial velocities. Hence, estimated velocity fields, when detected, were always tangential to the node measuring the zero mean velocity. The PVML approach performed better, properly estimating the direction of the velocity field at points where at least one of the measurements was not zero mean. Still, it failed in a visual sense to estimate the simulated vortex, as is evident at the points where all of the three observing nodes produced zero mean measurements. FIG. 20F illustrates the PVML estimate with error minimization, PVML-EM, based on the approach described by Eq. 30, where the coefficient update block is controlled by the following equations:

$$\Delta \hat{v}_{r_i} = \hat{v}_{r_{i-1}} - v_r |\max \|\bar{v}_{R_V} - \hat{v}_{R_V}\|_2$$

$$\hat{v}_{r_i} = \hat{v}_{r_{i-1}} - \bar{w}_r \Delta \hat{v}_{r_i}$$

$$\hat{v}_{T_i} = M \hat{v}_{R_i} \forall \hat{v}_T \epsilon r; \quad (42)$$

which are parsed iteratively. It took 64 iterations for this algorithm to converge to the desired error value providing an improved estimate of vortex field. As expected, SVD-LS performed very well again, as shown in FIG. 20D.

Because the overall system is underdetermined and the minimum norm is not necessarily the best norm, in all of the instances $\langle \sigma_{mod\ el}^2 \rangle \leq \langle \sigma_{true}^2 \rangle$. Also, note that $\langle \sigma_{true}^2 \rangle \leq \langle \sigma_{est}^2 \rangle$, meaning that estimators were employed properly. Considering the presented scenarios, in general, SVD-LS has shown consistent results not requiring any additional error minimizing post processes, as PVML, in case of the vortex field, did require. However, one has to bear in mind the computational cost of the SVD calculation as the system of equations governing the SVD-LS solution grows exponentially, depending on the ratio between the number of sythesized voxels and the overall volume size. In the given simulations, PVML, and its extension PVML-EM, provided the best overall results. Because these methods do not have to operate continuously across all space, PVML and PVML-EM represent attractive approaches to the estimation of velocities in an operational Doppler radar network environment.

Some weather phenomena, such as tornadoes, and man made point targets, such as airplanes, produce velocities exceeding the maximum unambiguous velocity for the observing nodes. This results in a folding of the signal spectrum due to the $2\pi$ ambiguity in phase estimation. The present ML-based approach can be used to unfold this phase ambiguity and accurately estimate vector velocity. The formulation is as follows.

We begin by considering Eq. 33 rewritten such that the radial velocity is subjected to an integer folding, $N_F$, such that $$v_r = \frac{\lambda \cdot PRF}{4\pi} (\phi_2 - (\phi_2 + 2\pi N_F)), \quad (43)$$

Assuming the complete spectrum folding, the ith combination of foldings amongst radial velocity measurements can be written as $$\bar{v}_{R_i} = \bar{v}_R + 2\text{sign}(\bar{v}) \cdot \bar{F}_{v_i} \cdot \bar{v}_{R_{max}} \quad (44)$$

where $\bar{v}_{R_i}$ and $\bar{v}_{R_{max}}$ are vectors of measured mean velocities and maximum unambiguous velocities, respectively. In Eq. 44, the · operator represents an element multiplication operation and $F_{v_i}$ is the ith column of the folding coefficient matrix, $F_V$, which for one folding in a network of three nodes is given as $$F_V = \begin{bmatrix} 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \end{bmatrix}.$$

A network of N observers with a common observing volume, considering the same number of foldings $N_F$ for all of the observers, yields $N_F^N$ possible combinations of radial velocities that can be used to construct the radial velocity vector as shown in Eq. 21. Inclusion of Eq. 44 into Eq. 23 results in the ith estimate of target velocity, $\bar{v}_{T_i}$, which, in turn, can be projected back onto sensor nodes to find the resulting radial velocity model $$\hat{v}_{R_i} = A \hat{v}_{T_i} = A M \bar{v}_{R_i}, \quad (45)$$

where the radial velocity model, $\bar{v}_{R_i}$, has been subjected to folding. Comparison of the measurement of the radial velocity $\bar{v}_R$ to the radial velocity model $\bar{v}_{R_i}$ shows the error involved with the use of a particular target velocity estimate $\bar{v}_{T_i}$. Employment of the weighted minimum square error estimator where each of the velocity differences are weighted by the error involved with each of the nodal measurements, yields the improved vector velocity estimate as in $$\hat{\bar{v}}_r = M \bar{v}_{R_i} \left| \min_i \left\{ \sum_{i=1}^{N_F^N} (\bar{v}_{R_i} - \hat{\bar{v}}_{R_{m_i}})^2 \right\} \right. \quad (46)$$

Note that $N_F^N$ iterations are required to determine the i that minimizes Eq. 46. It is expected that this algorithm can operate over a much broader range of velocities than the nodal maximum unambiguous velocity, being limited by computational power, error in the measurements and the spectral width of the observation.

Figure 21C:
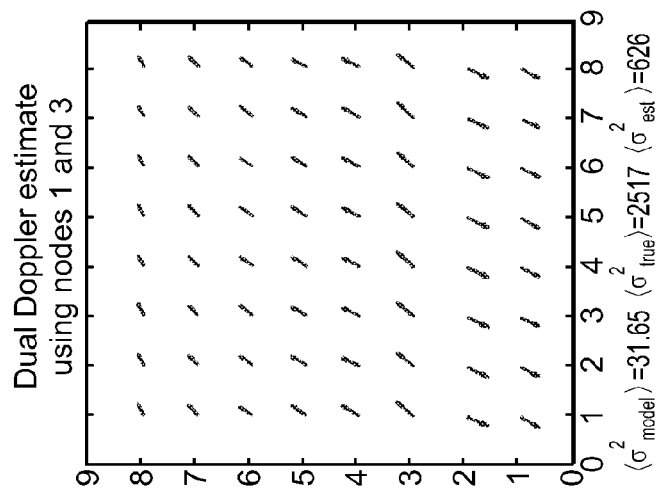
FIGS. 21A-21F illustrate errors and variances based on an exemplary velocity field.
Figure 21B:
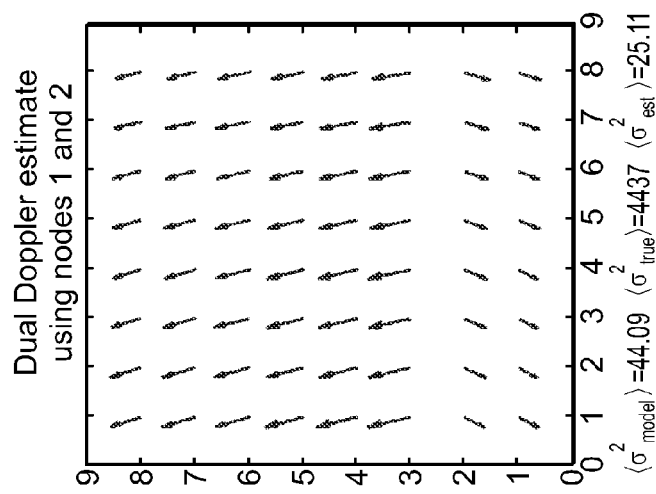
Figure 21A:
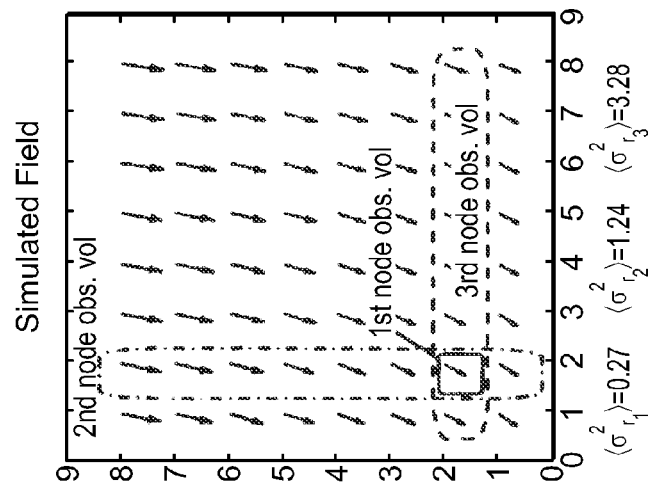

The above formulation presents a solution to full spectrum folding. To determine the effect of velocity folding in a simulated measurement scenario, a velocity field was generated, shown in FIG. 21A, with a mean velocity 35±7 m/s and mean angle of −109±7°. In this scenario all three nodes were set at 27 m/s maximum unambiguous velocity.

Without some physical model or continuity constraint, the dual-Doppler approach itself cannot yield an unfolded solution. Still, to depict the boundary between folded and unfolded velocities and identify contributing observers to the folding occurrence, two dual-Doppler cases are presented in FIGS. 21B and 21C. The PVML case, as shown in FIG. 21D, can be seen as an average between the dual-Doppler solution yielding an even more visually complex incorrect solution.

Considering a single folding and K independent measurements there are $2^K$ possible combinations of folded and unfolded measurements that have to be individually evaluated by the SVD-LS algorithm in order to find the minimum error solution. Because this can represent an enormous solution space (K=80, or some $10^{24}$ computations for the presented simulations), to view potential output from the SVD-LS based unfolding approach, for simplicity we constrain our search space such that the observations from any one node are considered either entirely folded or unfolded for all measurements, resulting in only $2^N$ (or 8) evaluations of the SVD-LS algorithm. The results of this limited SVD-LS solution are shown in FIG. 21E, where it can be seen that only one-half of the velocities were correctly unfolded. This is because its solution space did not permit a minimization search over all possible combinations of folded and unfolded measurements.

Figures 21D, 21E, 21F:
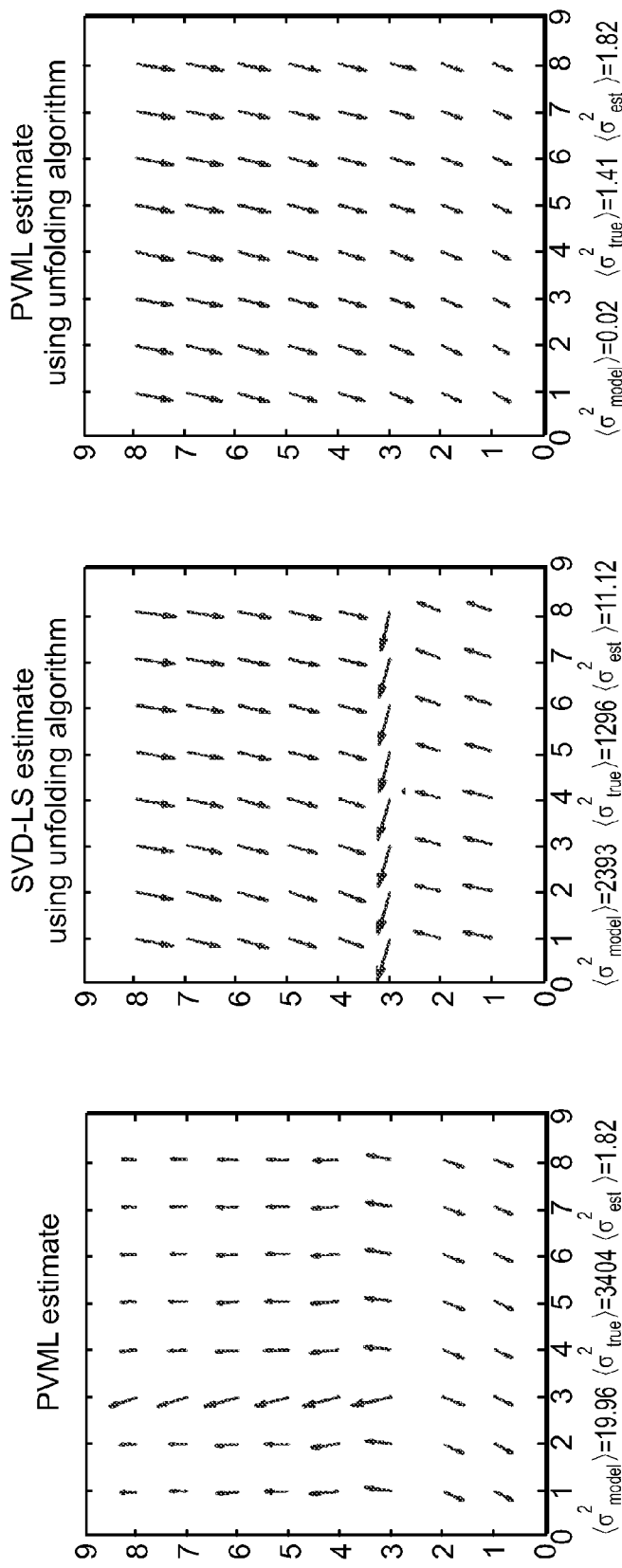

By contrast, as shown in FIG. 21F, the unfolding algorithm using the PVML technique performed much better, where it can be seen that all of the velocities were properly unfolded after only $2^N$ (or 8) iterations. Note that $\langle \sigma_{est}^2 \rangle$ is identical for both versions of the PVML technique (FIGS. 21D and 21F) because the determination of $\langle \sigma_{est}^2 \rangle$ of Eq. 39 is independent of the actual measured radial velocity.

Figure 22:
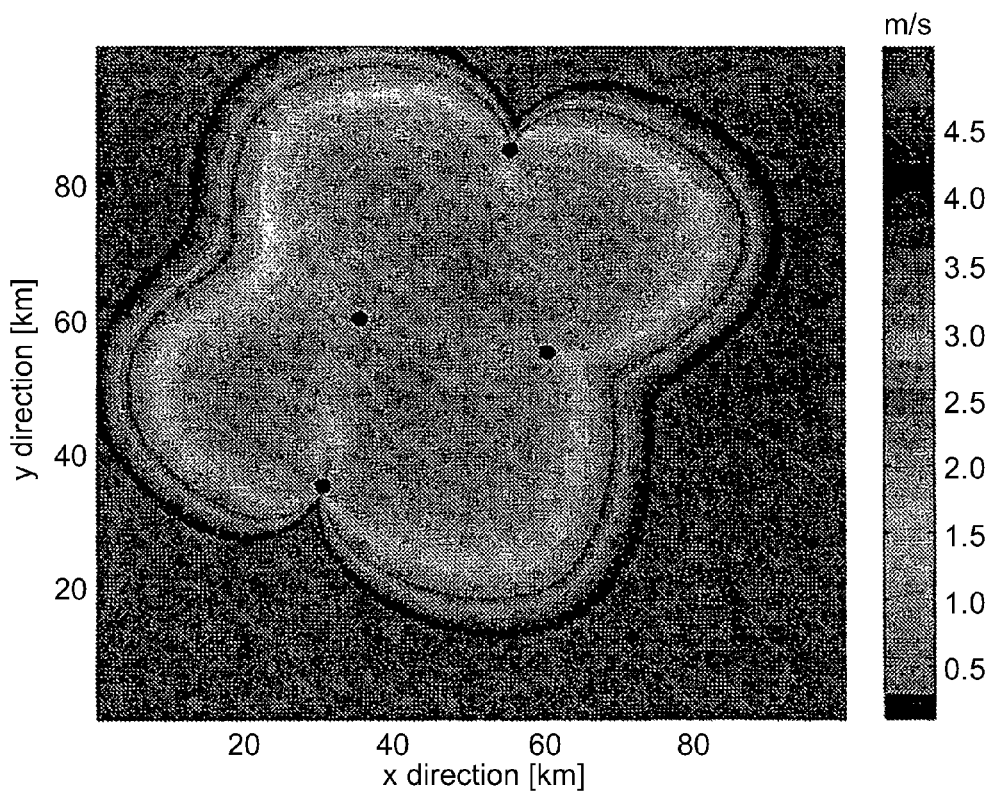
FIG. 22 illustrates a two dimensional vector velocity accuracy map.

One important benefit of the ML approach is that the provision of error bounds is readily available from the formulation shown in Eq. 24. If all of the underlying assumptions are met, the accuracy of velocity estimates can be calculated as a function of reflectivity, geometry of observation, and dynamics of the observed field. FIG. 22 shows simulation results for the standard deviation of the estimated 2D vector velocity over a 100 km×100 km area radar network system of four radar nodes positioned in a similar manner to nodes deployed by CASA's IP1 radar network system. The positions of radar nodes are depicted by solid black circles and 42 km maximum range limitation was assumed. Further, a uniform reflectivity of 10 dBZ (a typical value at X-band frequencies for a light rain of 0.2 mm/hr or smoke plumes from a major fire) was chosen to illustrate the effect of low SNR levels at the edges, which are expected to have a dominant effect on velocity accuracy in comparison to other sources of errors. Note that along line-of-sight between the two nodes, there is a significant degradation of accuracy, an effect that is expected as a single geometric analysis heavily drives the estimation process. Plots such as this can be used to gauge the velocity errors that would be expected for various deployment geometries. In this particular geometry, the expected value of the mean and median standard deviations are 2.3 m/s and 1.3 m/s respectively.

Figure 23:
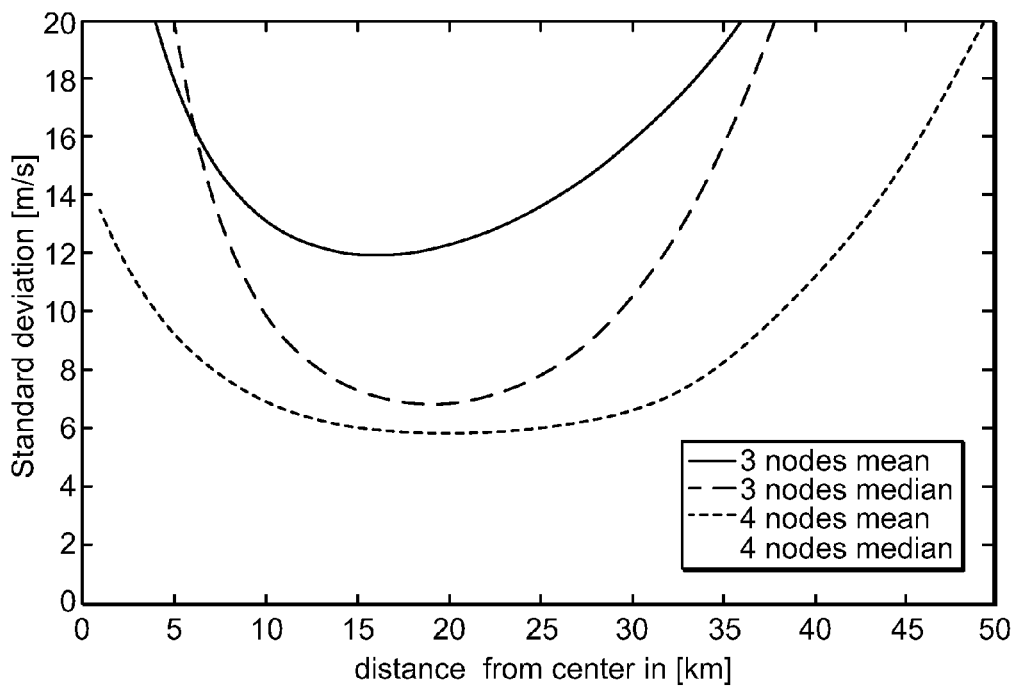
FIG. 23 illustrates a method for selecting placement of nodes to improve velocity estimation.

FIG. 23 is presented to show the optimum distance between: i.) three nodes placed at the corners of an equilateral triangle, ii.) four nodes placed at the corners of a square, centered in the middle of the 10,000 km² area. This cost curve shows that for given geometry and coverage area, optimal distances can be determined which provide the highest accuracy of Doppler retrievals.

The present invention relates in one aspect to a new methodology for estimating vector velocities in a radar network environment. This new technique was developed by extending the basic multi-Doppler formulation and viewing the radar network as a single measurement instrument, considering many of its relevant and quantifiable design, measurement, and processing parameters. Enabled by the advantage of an over-determined observation scenario and by identifying a necessary set of requirements, in one embodiment the basic least squares approach is extended to provide a maximum likelihood formulation. Normal iid distributions of the participating measurements and behavior of observable, sufficient correlation scales and absence of bias serves as a hypothesis for the developed maximum likelihood approach.

One important source of bias is the mismatch in volume size amongst participating observations. To address this issue, in one embodiment a common grid of spatially identical bins is synthesized, whose size, in comparison to the volume of the participating measurements, would classify the observation volume as either over-sampled or under-sampled. This classification depends on the balance between the desired accuracy and the resolution of the estimates. The present inventors identified that in the case when all of the measurements observe normal distributions, both the under-sampled and oversampled approaches would yield the same result, an important finding as the presented maximum likelihood method does not have demanding computational requirements. To accommodate scenarios in which some of the necessary requirements are not present, results from the maximum likelihood based technique are used to build an initial model of observation fields and error minimizing techniques are employed to provide more efficient estimates, according to one embodiment.

Several observation scenarios were simulated and through intercomparison of various velocity estimation techniques, the overall strength of the present methodology is demonstrated. Simulated results were presented in which errors from bimodal distributions and velocity folding in the radial measurements of participating sensor nodes were mitigated. These results from simulations confirmed the theory that the maximum likelihood based technique represents a more efficient estimator than the standard dual-Doppler approach. The ML estimator is asymptotically an optimal estimator.

Because the ML approach provides error bounds, areas of low confidence can be identified and post-processed for improvement. Further, assuming unbiased measurements, these error bounds can be used for system planning, both in the geographic arrangement of nodes, as well in evaluating observing scenarios in near real-time.

Figure 24:
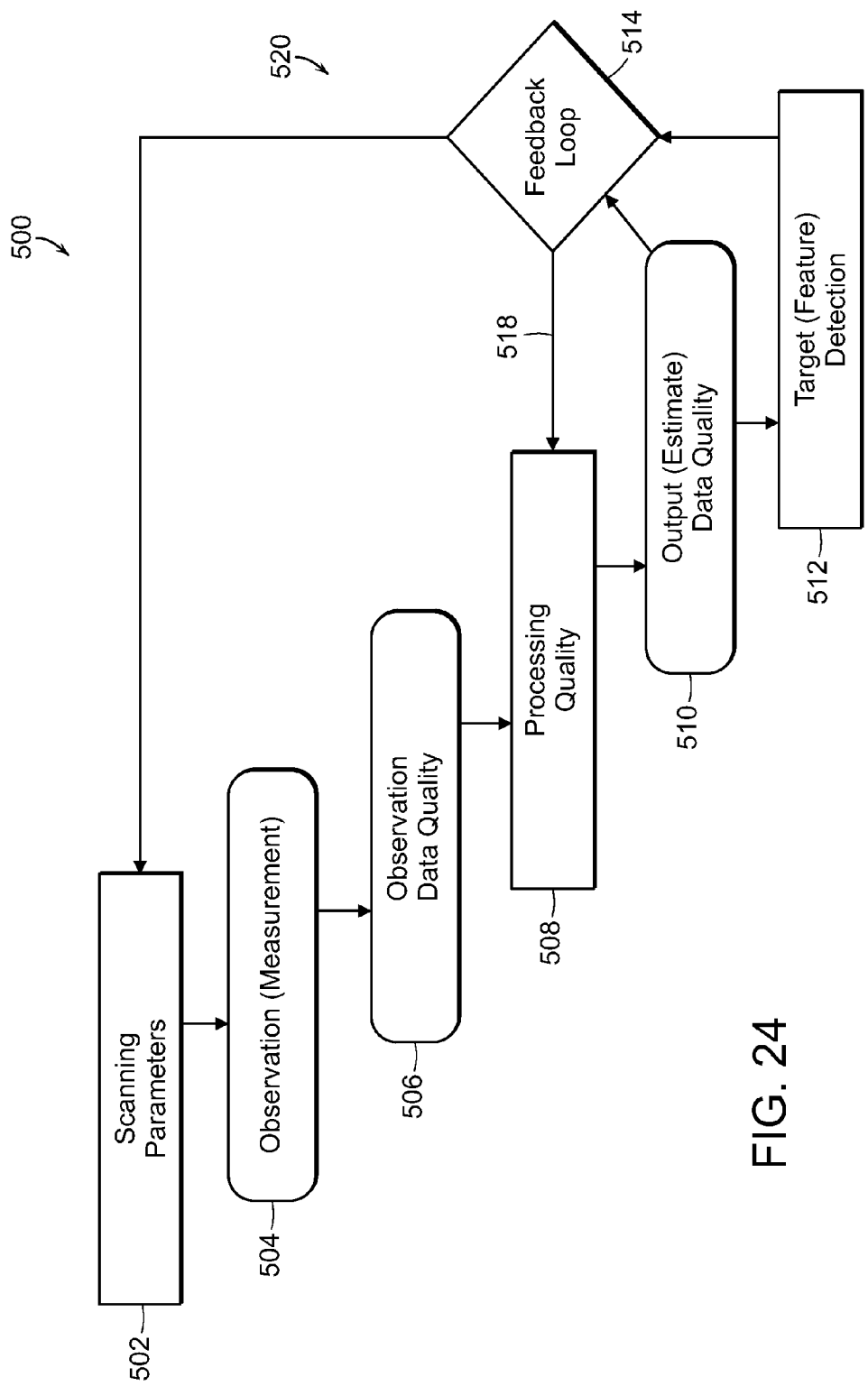
FIG. 24 illustrates a process for feedback control of scanning parameters in accordance with preferred embodiments of the invention.

Signal processing techniques can be used to capture statistics of the measured signals, such as those that estimate the spectrum itself. Additionally, as illustrated in FIG. 24, the system uses a scanning sequence 500 that can include a feedback procedure 520 for adjusting scan parameters. After the scan parameters, as described herein, are determined 502 for a given scan interval, the scan is performed and the data collected 504. The data is processed and metrics are quantitatively measured to determine data quality 506. The processing sequence can also be evaluated to indicate processing quality 508 and the output data, such as the velocity data for a particular event can be analyzed 510. The data can be reprocessed 518 through feedback sequence 514 and/or the target can be indicated 512 to the end user. The feedback process 514 can then be used to reset the scan parameters within the scan interval or a selected plurality of intervals. After initial data is retrieved and processed, the data quality can be analyzed and adjustments to one or more scan parameters can be selected for new data acquisition.

While the invention has been described in connection with specific methods and apparatus, those skilled in the art will recognize other equivalents to the specific embodiments herein. It is to be understood that the description is by way of example and not as a limitation to the scope of the invention and these equivalents are intended to be encompassed by the claims set forth below.

What is claimed is:

1. A networked radar system for measuring velocity of atmospheric events comprising:
   a networked radar system having a plurality of radar nodes, each radar node sensing velocity data within a volume region during a scan interval;
   a velocity processor connected to the networked radar system, the velocity processor receiving velocity data from each of the radar nodes for each scan interval and that processes the velocity data to measure an event velocity within the volume region for the scan interval, the velocity processor being programmed to iteratively compute a velocity metric with the received velocity data; and
   a communication link that transmits at least one adjusted scan parameter in a subsequent scan interval to at least one of the plurality of radar nodes, the adjusted scan parameter being generated using the iteratively computed velocity metric.

2. The system of claim 1 further comprising a control system connected to the radar nodes, the control system generating a plurality of scan parameters to control operation of the radar nodes.

3. The system of claim 1 wherein the scan interval is 2 minutes or less.

4. The system of claim 1 wherein the scan interval is 1 minute or less.

5. The system of claim 2 wherein the scan parameters include pulse repetition frequency and pulse length.

6. The system of claim 1 wherein the system comprises a plurality of velocity processors.

7. The system of claim 1 wherein the velocity processor generates an error metric of event velocity data.

8. The system of claim 1 wherein the control system generates adjusted scan parameters for a group of participating nodes for a subsequent scan interval.

9. The system of claim 1 wherein the nodes are positioned less than 60 km from adjacent nodes.

10. The system of claim 1 wherein the event comprises an object moving within a three dimensional volume of an atmosphere region.

11. The system of claim 10 wherein the object comprises an aircraft.

12. The system of claim 10 wherein the scan interval is 5 minutes or less.

13. The system of claim 1 wherein the networked radar system comprises at least 3 radar nodes having an overlapping scan pattern of an atmosphere region.

14. The system of claim 1 wherein the radar nodes generate reflectivity data.

15. The system of claim 14 further comprising a data processor that processes reflectivity data.

16. The system of claim 1 wherein the velocity processor computes velocities using a spherical coordinate system located relative to a network location.

17. The system of claim 16 wherein the coordinate system has an equator and a reference meridian at a center of the network.

18. The system of claim 16 wherein the network has a constant voxel volume across an overlapping region of the network region.

19. The system of claim 16 further comprising a synthesized spherical coordinate system.

20. A method of measuring atmospheric wind velocity to control a networked radar system comprising:
   sensing velocity data at a plurality of radar nodes in a radar network, the radar nodes including a plurality of adjacent pairs of nodes that are spaced less than 60 km apart;
   transmitting the sensed velocity data using a communication network to a velocity processor;
   determining a velocity metric for a scanned region using the sensed velocity data from the plurality of radar nodes in a scan interval, the determining step including an iterative computational process performed with a data processor; and
   automatically generating at least one adjusted radar node scan parameter in a subsequent scan interval using the velocity metric.

* * * * *